United States Patent [19]

Cress et al.

[11] 4,453,998
[45] Jun. 12, 1984

[54] METHOD AND APPARATUS FOR PRODUCING FINISHED FOAM PLASTIC CONTAINERS

[75] Inventors: Allan K. Cress, Baltimore; Charles E. Busse, Jarrettsville, both of Md.

[73] Assignee: Maryland Cup Corporation, Owings Mills, Md.

[21] Appl. No.: 413,871

[22] Filed: Sep. 1, 1982

Related U.S. Application Data

[63] Continuation-in-part of Ser. No. 219,520, Dec. 23, 1980, which is a continuation-in-part of Ser. No. 953,620, Oct. 23, 1978, abandoned, which is a continuation-in-part of Ser. No. 665,617, Mar. 10, 1976, Pat. No. 4,121,402.

[51] Int. Cl.³ .............................................. B32B 1/00
[52] U.S. Cl. ..................................... 156/350; 156/368
[58] Field of Search .......... 156/86, 218, 446, 457–458, 156/464, 203, 350–352, 368, 362; 493/305, 306

[56] References Cited

U.S. PATENT DOCUMENTS

| | | | |
|---|---|---|---|
| 3,969,173 | 7/1976 | Amberg | 156/218 |
| 3,970,492 | 7/1976 | Amberg et al. | 156/218 X |
| 4,072,549 | 2/1978 | Amberg et al. | 156/218 X |

*Primary Examiner*—David A. Simmons
*Attorney, Agent, or Firm*—Birch, Stewart, Kolasch & Birch

[57] ABSTRACT

The present invention is directed to an improved apparatus and method for manufacturing completed foam plastic containers. An endless mandrel chain continuously carries cup forming mandrels along a manufacturing path. Cylindrical blanks are formed and transferred to the mandrels along the endless mandrel carrier chain. As the endless mandrel carrier chain passes the cylindrical blanks and associated bottom blanks through a heat shrink oven, it is important for the endless mandrel carrier chain to continuously travel in order to prevent the heat damage which would be present if the cup blanks were halted in the oven. Consequently, the present invention is directed to a system for synchronizing the cylindrical blank forming and transferring mechanism and the bottom blank forming and transferring mechanisms to the endless mandrel carrier chain such that the blank forming and transferring stations may be halted from time to time to clear jams or add new sheet stock without the need to halt the endless mandrel carrier chain. The present invention is further directed to a method for synchronizing the cylindrical blank forming and transferring and bottom blank forming and transferring portions of the machine to the endless mandrel carrier chain when the blank forming and transferring stations are restarted.

34 Claims, 59 Drawing Figures

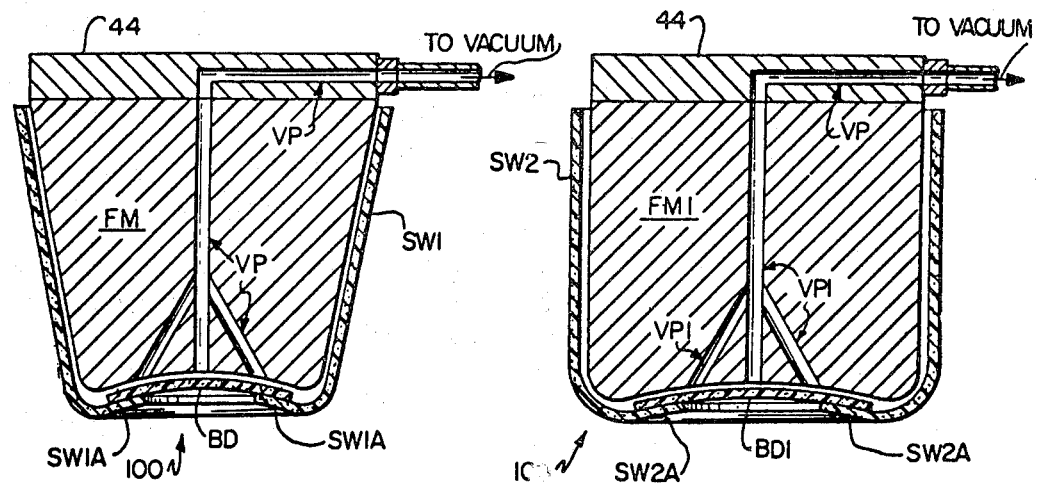
FIG. 6A
FIG. 6B
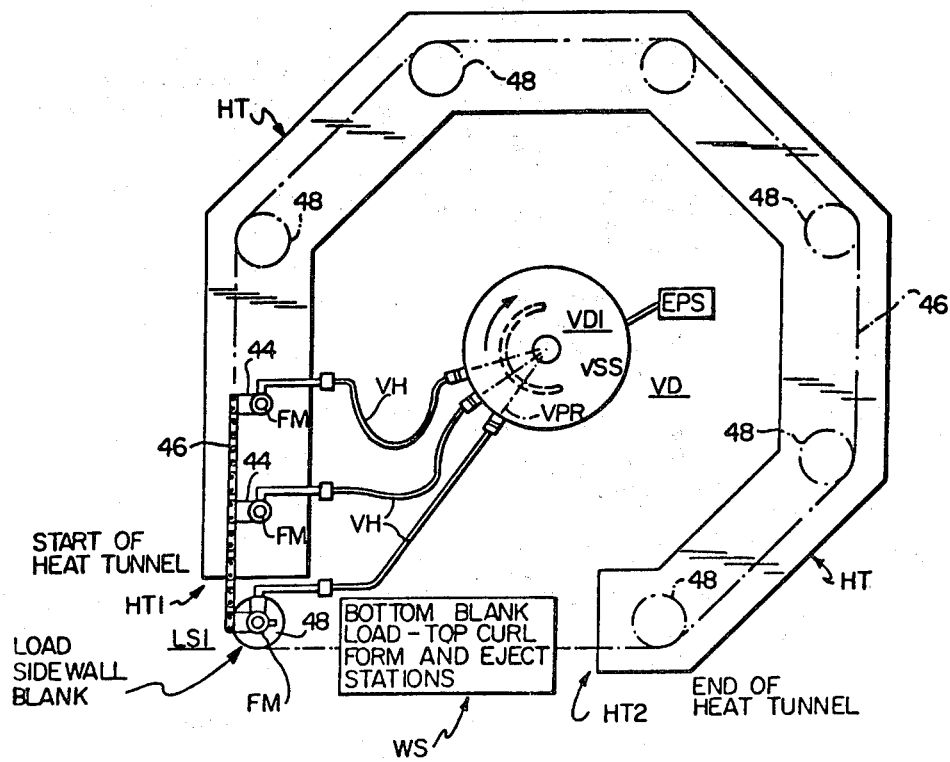
FIG. 7

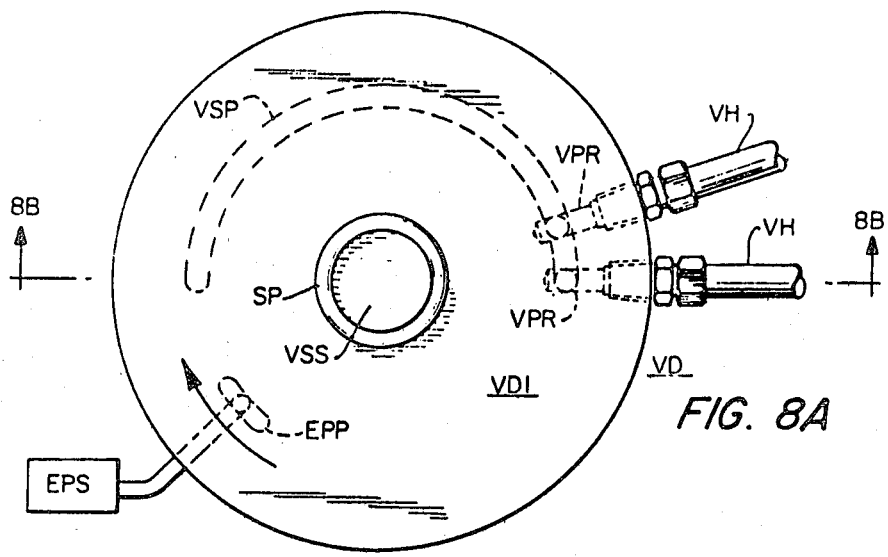
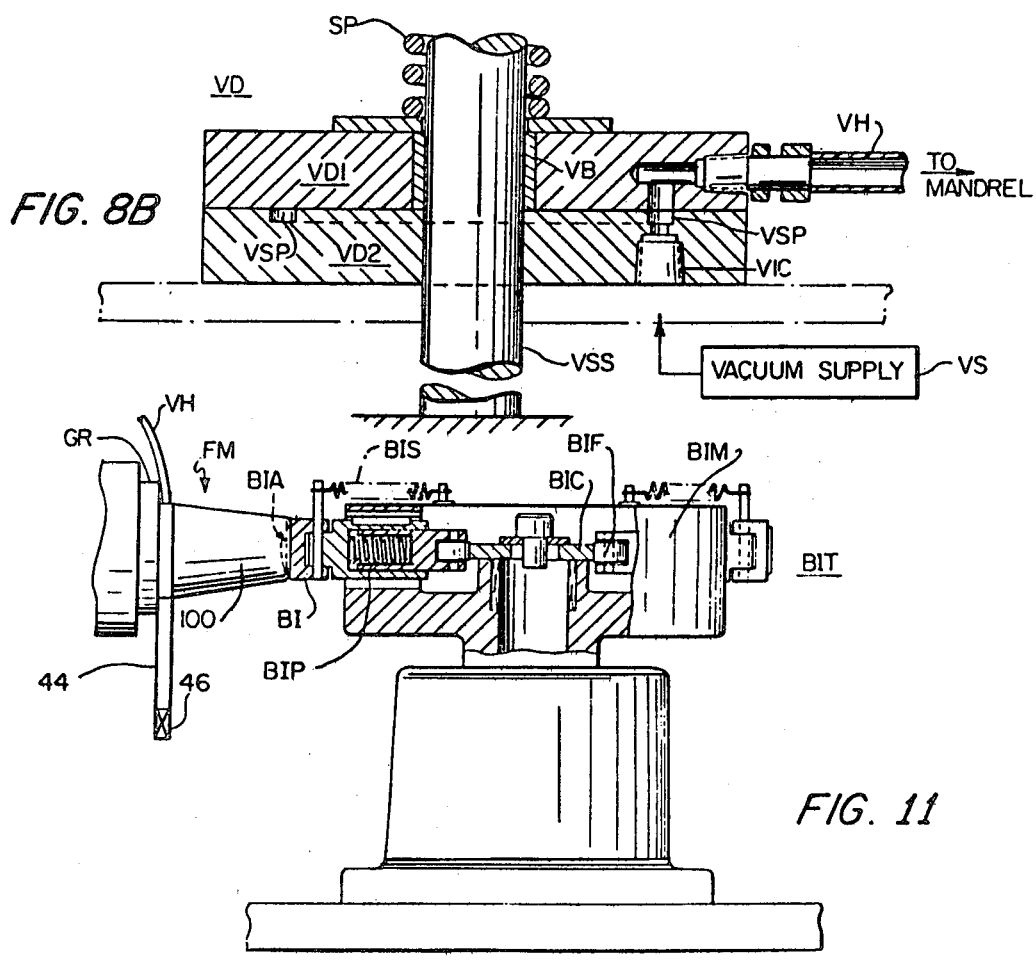

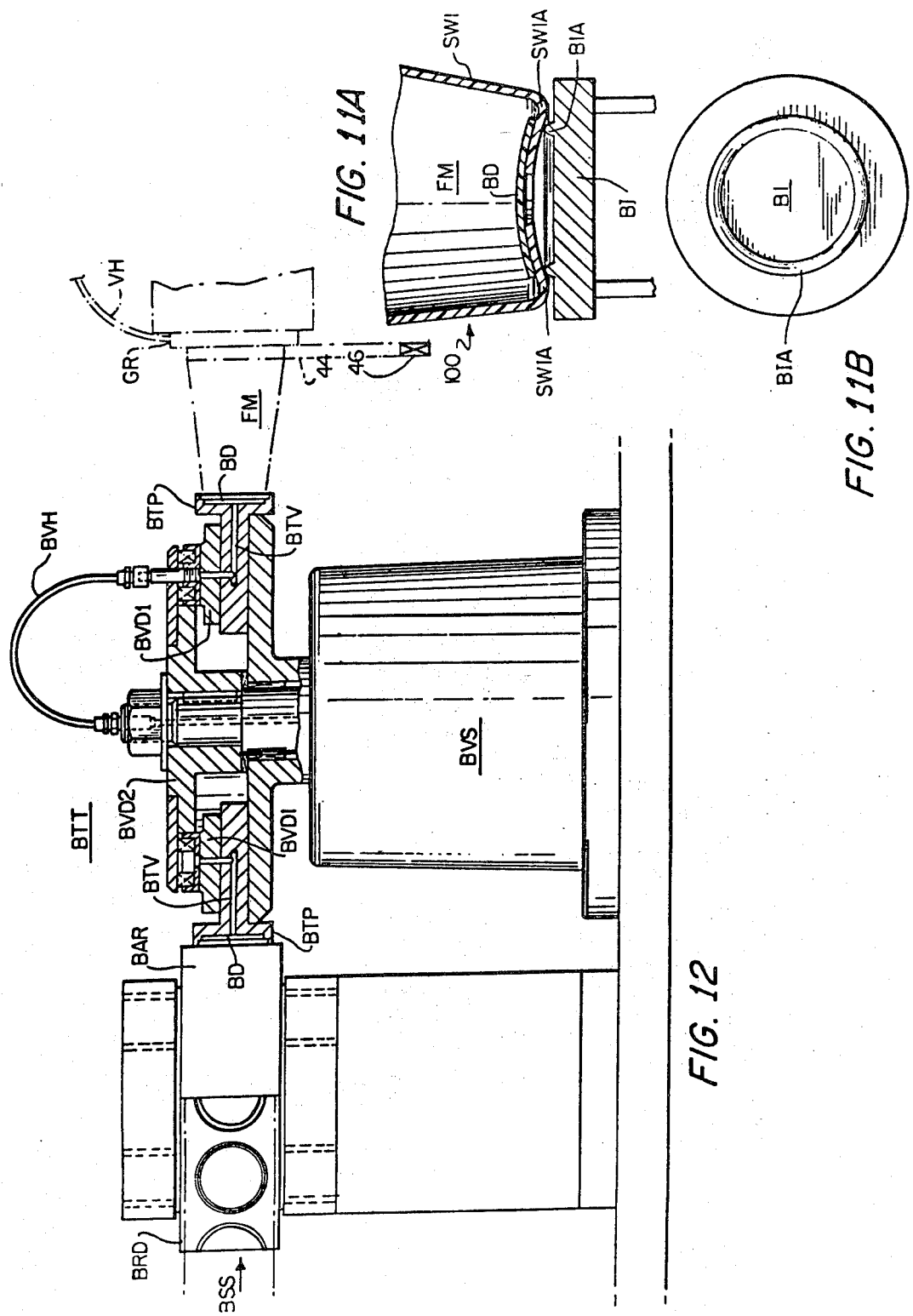

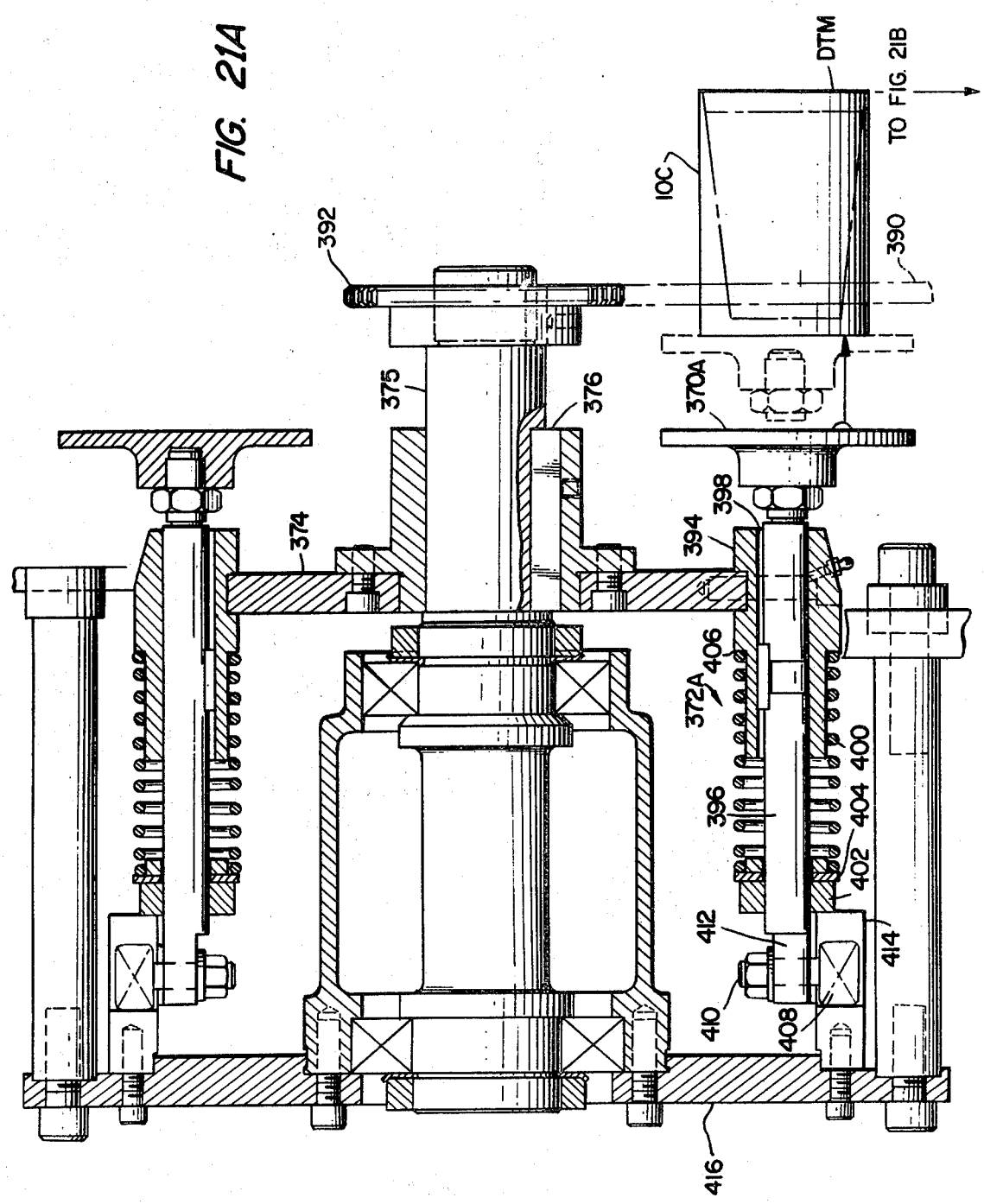

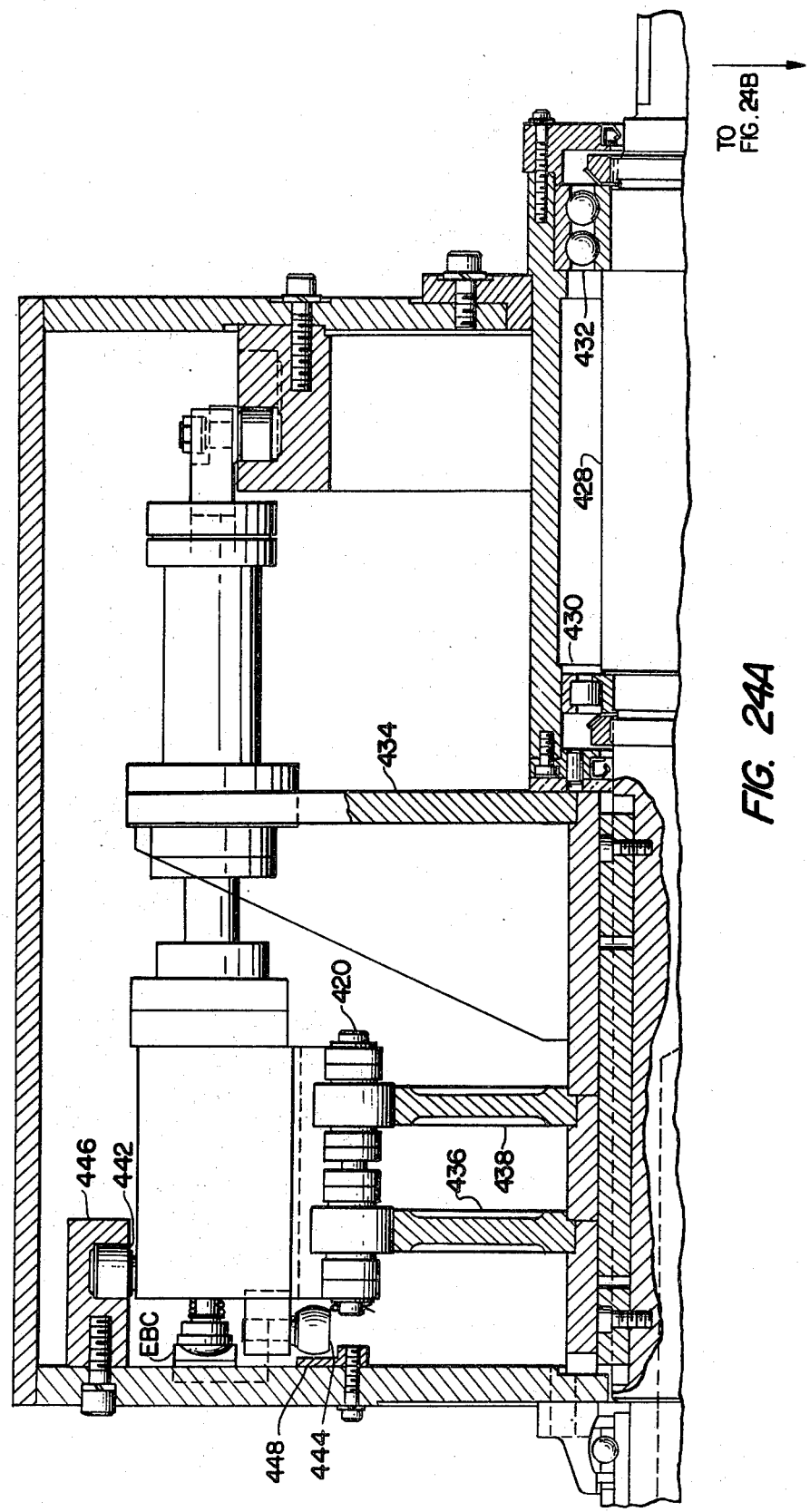

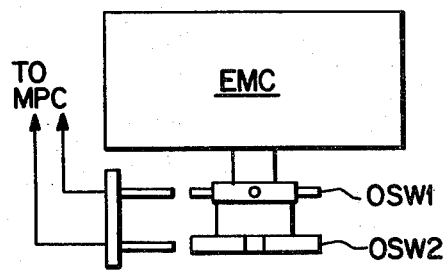
FIG. 33A
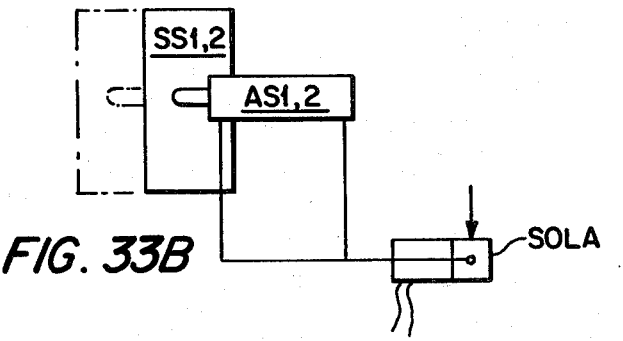
FIG. 33B
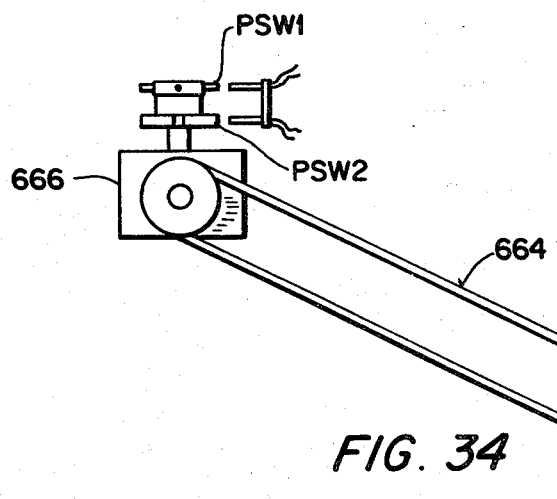
FIG. 34
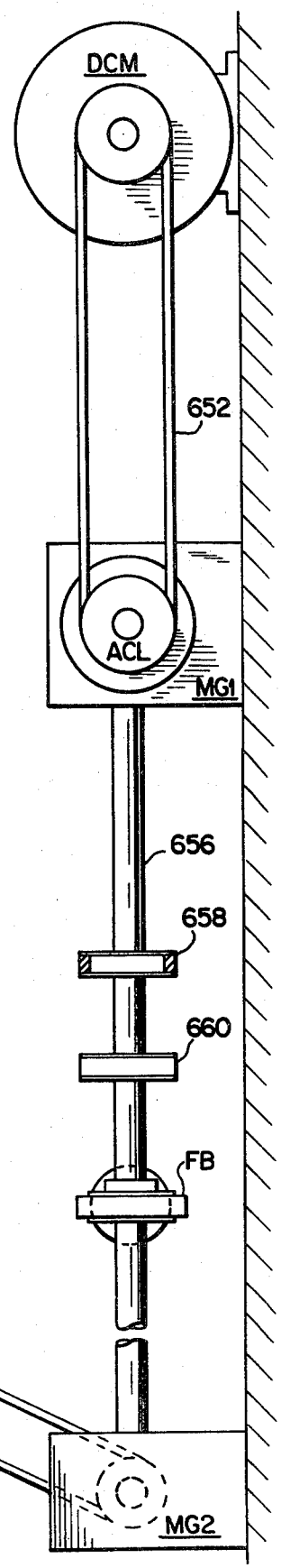

METHOD AND APPARATUS FOR PRODUCING FINISHED FOAM PLASTIC CONTAINERS

The present invention is a continuation in part of application Ser. No. 219,520, filed Dec. 23, 1980, which is a continuation in part of application Ser. No. 953,620, filed Oct. 23, 1978, now abandoned, which is a continuation in part of application Ser. No. 665,617, filed Mar. 10, 1976, and now U.S. Pat. No. 4,121,402.

FIELD OF INVENTION

This invention relates to a synchronization and control system for an apparatus for forming finished containers from heat shrinkable material such as foam plastic sheets or the like.

BACKGROUND OF THE INVENTION

It is known in the art to shrink form containers such as drinking cups from preformed tubular lengths of circumferentially oriented thermoplastic material such as foam polystyrene.

One particularly desirable method of initially forming a tubular length of such circumferentially oriented material is to provide rectangular preprinted blanks and wrap these blanks around a mandrel while a heat sealed seam is effected longitudinally along the circumference of the formed tubular lengths. The use of rectagular blanks facilitates preprinting of patterns, designs, logos, etc. on the blanks such that the tubular blanks and containers formed therefrom will bear the ultimately desired indicia.

A further advantage of the rectangular blank is that it may be cut from an extruded sheet of thermoplastic or thermoplastic foam which is stretched longitudinally, i.e., in the most logical, natural and facile direction of stretch after extrusion, namely, the machine direction, to achieve the necessary circumferential orientation in a tubular length or cylinder formed from the rectangular blank.

Previous efforts to handle these rectangular blanks and form them into cylinders, however, have required relatively elaborate systems of transfer rollers, turrets with multiple mandrels thereon and vacuum systems to properly index leading and/or trailing edges of the rectangular blanks on the transfer rollers or mandrels.

OBJECTS OF THE INVENTION

It is, therefore, an object of the present invention to provide a new and novel improved method and apparatus for manufacturing finished containers from rectangular blanks of heat-shrinkable plastic material such as foamed polystyrene.

Another object of the present invention is to provide a new and improved method and apparatus for converting a cylindrical blank into a finished container.

It is further object of the present invention to allow at least portions of a continuous cup making apparatus to be stopped without damaging partially formed cups by stopping them in the proximity of a heating source.

It is a still further object of the present invention to allow these stopped portions of the apparatus to be easily resynchronized to the remainder of the cup making apparatus.

It is further object of the present invention to continuously rotate an endless mandrel chain or wheel through an oven while the portions of the apparatus which form the cup sidewall and bottom blanks are stopped to facilitate cleaning of jams or providing a new supply of sheet stock.

These and other objects of the present invention will become more fully apparent with reference to the following specification and drawings which related to preferred embodiments of the present invention.

SUMMARY OF THE INVENTION

Finished containers are formed from rectangular blanks and disk shaped bottom blanks. A rectangular blank cutting station forms rectangular blanks from rolls or pre-stretched foam sheet stock. The rectangular blanks are then formed in cylindrical blanks by a cylindrical blank forming station. A plurality of mandrels rotate on an endless mandrel carrier chain. The formed cylindrical blanks and bottom blanks formed by the bottom blank forming station are transferred onto mandrels moving along the endless mandrel carrier chain pass through an oven section, the blanks are shrunk onto the mandrels to form finished container products.

It is occassionally desirable and necessary to stop at least a portion of the machine to clear a jam or to provide a new supply of sheet stock to the rectangular blank cutter or bottom blank forming station. However, if the entire machine is stopped, mandrels having cylindrical and bottom blanks mounted thereon will be stopped in the oven section of the apparatus. Prolonged exposure to the temperatures in the oven section will melt the blanks rather than shrink them, thereby making extraction of the damaged blanks difficult.

Thus, according to the teachings of the present invention, the mandrels are continuously moved via the endless mandrel carrier chain through the oven and the remaining portions of the machine, downstream of the oven, continue to operate. The synchronization system of the present invention allows the rectangular blank cutter, cylindrical blank forming station, and bottom blank forming station to be selectively disconnected from the system drive in order to clear jams or add new sheet stock.

A DC motor continuously rotates the endless mandrel carrier chain and drives the rectangular cutter, cylindrical blank forming station and bottom blank forming station through a single engagement position air clutch which assures that the shaft driven by the DC motor is precisely aligned to the shaft driving the respective forming stations. Sensors associated with the rectangular blank cutter and endless mandrel carrier chain further ensure that the respective forming stations and the endless mandrel carrier chain will be correctly aligned when the air clutch is actuated. In order to resynchronize the respective forming stations to the endless mandrel carrier chain, the drive for the respective forming stations is braked by a friction brake and the air clutch is engaged. Upon engagement, the air clutch and friction brake cooperate with each other to temporarily stall the DC drive motor. This momentary stalling of the DC drive motor does not damage the motor and allows the secure engagement of the air clutch to be sensed before the respective forming stations are moved from their proper positions.

The side seam heaters of the cylindrical blank forming station are also removed from close proximity to any cylindrical blanks which may be in their proximity by air solenoids which are controlled in synchronism with the disconnection of the respective forming stations from the endless mandrel carrier chain.

Thus, the respective forming stations of the present invention may be disconnected and reconnected to the endless mandrel carrier chain and the remainder of the apparatus while retaining full synchronism therewith and without damaging container blanks by stopping them in close proximity to a heat source.

Further scope of applicability of the present invention will become apparent from the detailed description given hereinafter. However, it should be understood that the detailed description and specific examples, while indicating preferred embodiments of the invention are given by way of illustration only, since various changes and modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2A is a top plan schematic illustrating the stretch orientation of cut rectangular blanks as they undergo the right angle transfer from the rotary cutter to the cylinder forming means of the present invention;

FIG. 4 is a schematic side elevation of a forming mandrel drive, transfer station and forming oven of the present invention;

FIG. 5A is a detail of a forming mandrel, mount and drive chain in side elevation;

FIG. 5B is a top elevation of the detail of FIG. 5A with an alternative form of forming mandrel shown in dotted lines therein;

FIG. 6A is a cross section of a frusto-conical mandrel illustrating internal vacuum ports therein and a container formed thereon;

FIG. 6B is a cross section of a substantially cylindrical mandrel illustrating internal vacuum ports therein and a container formed thereon;

FIG. 7 is a schematic of a cup making system of the present invention;

FIG. 8A is a top view of a vacuum distributor of the present invention;

FIG. 8B is a side elevation in a cross section of the vacuum distributor of FIG. 8A taken along line 8B—8B of FIG. 8A;

FIG. 11 is a cross section of the bottom finishing station taken along line 11—11 of FIG. 9;

FIG. 11A is an enlarged cross sectional illustration of a bottom iron engaging a container bottom on a mandrel of the present invention during bottom sealing;

FIG. 11B is a top plan view of the bottom iron of FIGS. 9, 10, 11, and 11A;

FIG. 12 is a cross section taken along line 12—12 of FIG. 9;

FIGS. 21 and 21B collectively illustrate a side plan view of the detailed disclosure of a cylindrical tamper apparatus of the present invention;

FIGS. 24 and 24B collectively illustrate a side cross sectional view of a curling apparatus illustrated in FIG. 23;

FIG. 33A is a diagrammatic view of a portion of the drive and control system not shown in FIG. 34;

FIG. 33B is a more detailed diagramatic side view of the side seam heaters and their retracting air solenoids; and FIG. 34 is a diagrammatic side view of the system for driving the apparatus of the present invention illustrated in FIG. 33.

DETAILED DESCRIPTION OF A PREFERRED EMBODIMENT

Figure 1:
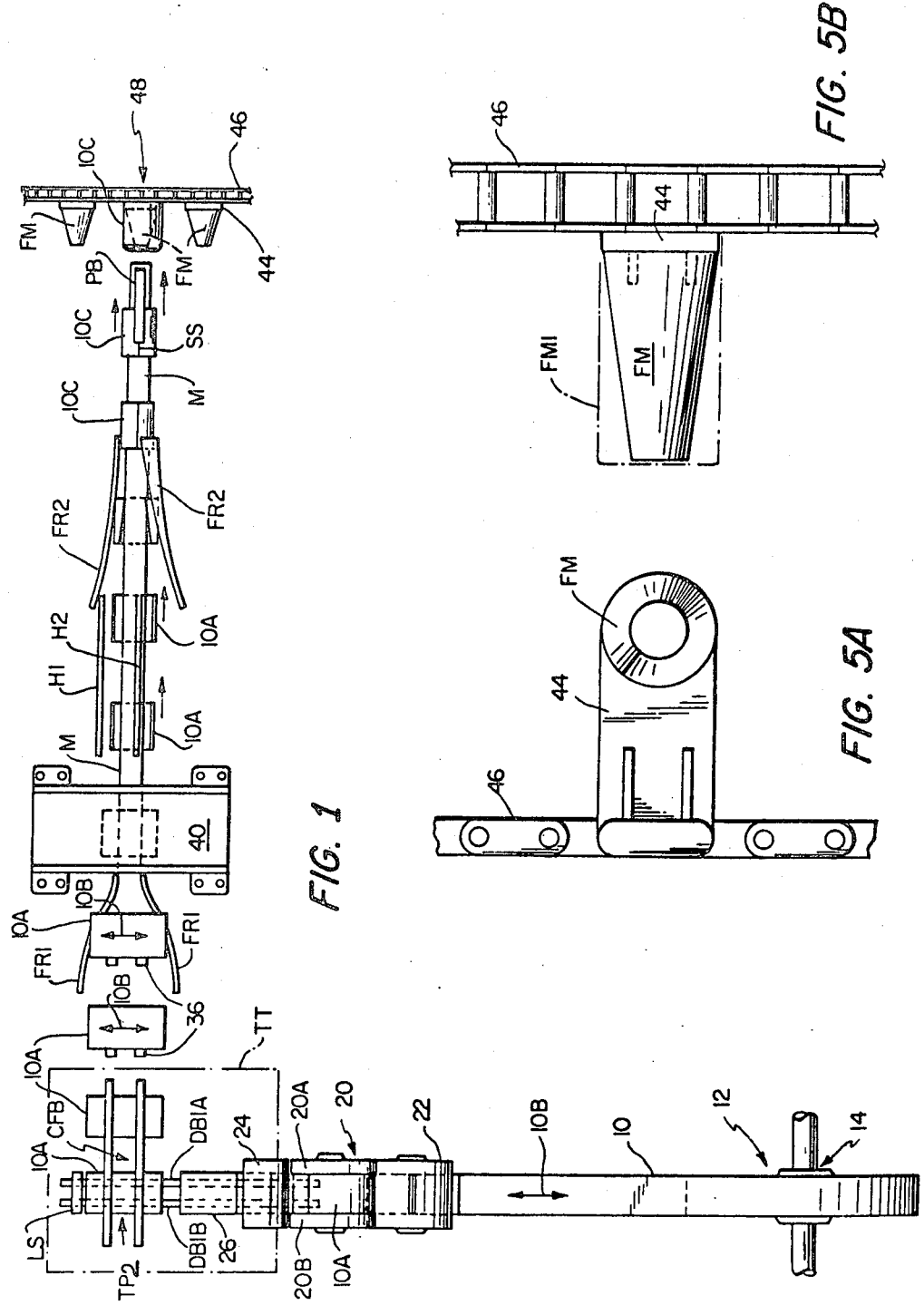
FIG. 1 is a top plan view of a blank handling, cylinder forming and cylinder transferring mechanisms of the present invention.
Figure 2:
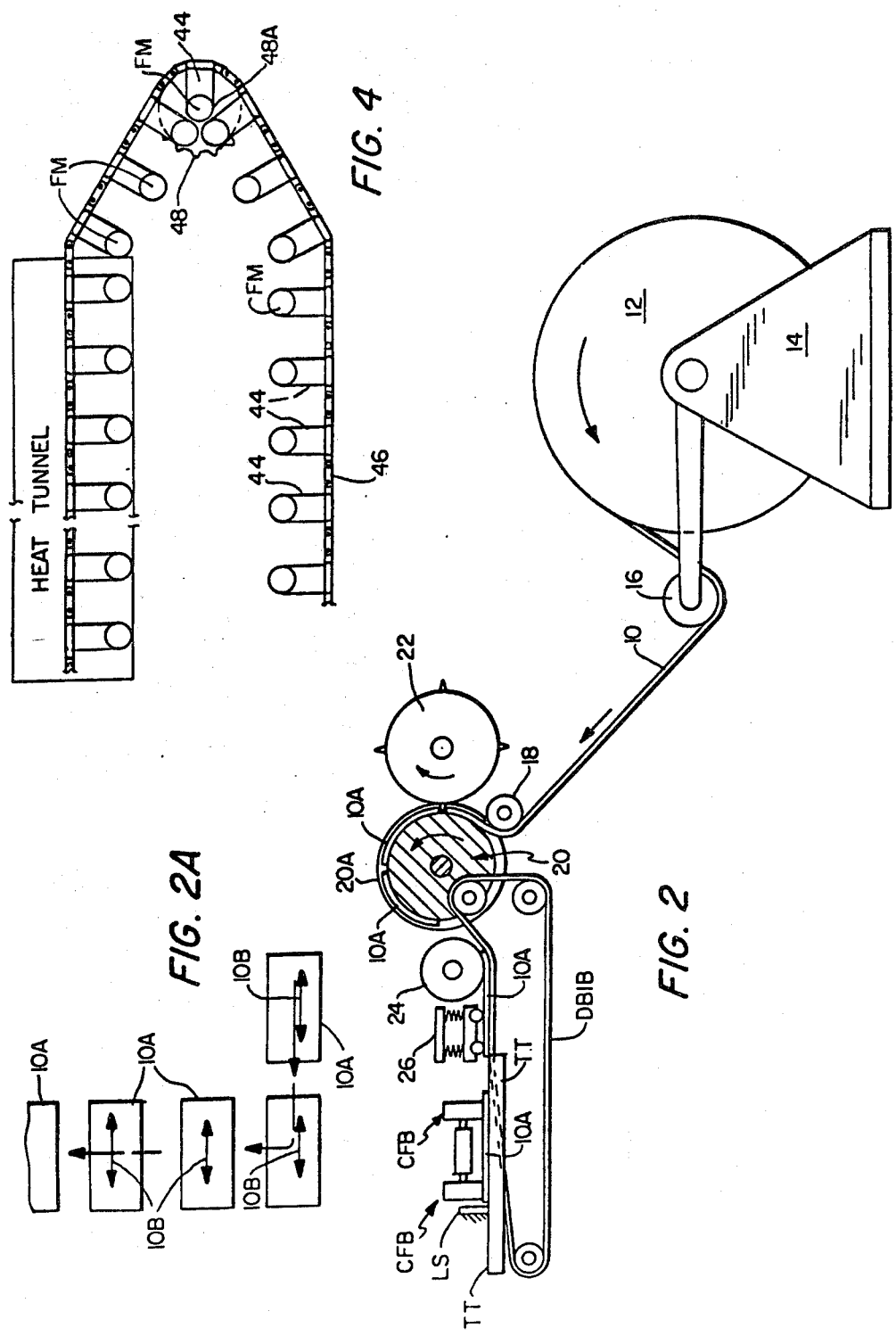
FIG. 2 is a side elevation of the feed roll, rotary cutter and right angle transfer belts of the present invention.

Referring to FIGS. 1 and 2 the material 10 from which the intermediate cylinders and ultimate containers are to made is shown as an elongated strip convolutely wound in the form of a large supply roll 12 rotatably mounted on a suitable stanchion or support 14.

The feed material 10 is unwound from the supply roll 12 and passed beneath a tension roller 16 (FIG. 2) and a guide roller 18 into contact with a vacuum feed drum 20 which cooperates with a synchronized rotary cutter means 22 to sever the end of the feed material 10 into uniform rectangular blanks 10A.

The feed material 10 is stretch oriented for enhanced heat shrink characteristics in the direction 10B which is parallel to the long dimension of the ultimate rectangular blanks 10A.

As the blanks 10A are released from the downstream side of the vacuum drum 20, the latter being flanged at 20A, 20B to contain the narrower width of the feed material 10 between the flanges 20A, 20B as shown in FIGS. 1 and 2, and upper pinch roll 24 and blank bottom engaging pair of drive belts DB1A and DB1B entrain the leading edge of each successive blank 10A. Each blank 10A is fed on its longitudinal axis by the drive belts DB1A, DB1B beneath a biased retaining guide 26 to a right angle transfer point TP2.

At the transfer point TP2 a set of cross feed belts CFB are located adjacent a limit stop means LS which abuts with and positions each rectangular blank 10A for lateral transfer by the said cross feed belts CFB.

The drive belts DB1A and DB1B pass at an angle through suitable slots in the surface of a transfer table TT such that prior to engaging the limit stop LS the blanks 10A have been accelerated by and broken contact with the drive belts DB1A and DB1B.

Figure 3:
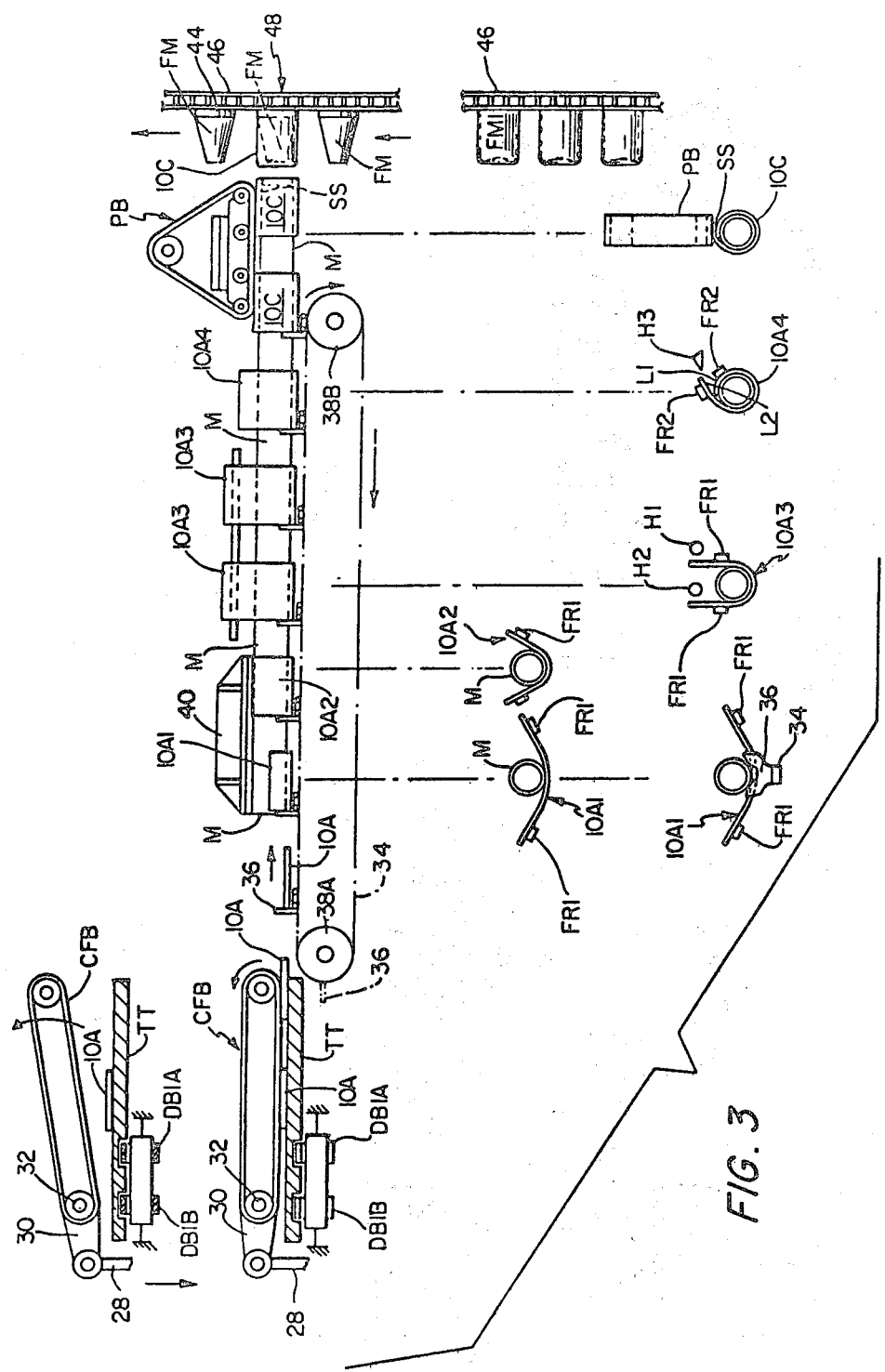
FIG. 3 is an exploded schematic illustrating in correlated cross section the various forming stages of the present invention in converting a rectangular blank into a cylinder by continuous movement of the blank along a fixed mandrel.

As shown in FIG. 3, the cross feed belts CFB are mounted to pivot toward and away from the upper surface of the transfer table TT in synchronism with the forming of the rectangular blanks 10A and their delivery to the transfer point TP2. Thus, each said blank 10A will be transferred laterally of its longitudinal axis substantially instantaneously upon engaging the limit stop LS at the transfer point TP2.

The pivotal motion of the cross feed belt assembly CFB is affected by means of a drag link 28 and crank arm 30 acting about a pivot point 32 as illustrated in FIG. 3.

The cross feed belts DFB drive the blanks 10A off the transfer table TT onto a carrier chain 34 having pushers or dogs 36 thereon which engage the trailing edges of the blanks 10A and propel them along in a direction transverse to their longitudinal stretch orientation direction 10B.

Longitudinally disposed along the upper reach of the carrier chains 34 is a hollow tubular forming mandrel M which is fixed against rotation in a suitable holding bracket 40.

Leading into a bracket 40 and progressively varying in shape along the substantially entire entent of the forming mandrel M are opposed forming rails FR1, the extent of which can best be understood with reference to FIGS. 1 and 3.

As the carrier chain 34 progresses clockwise around the chain drive sprockets 38A, 38B, the pusher dogs 36 move the blanks 10A through the forming rails FR1 to bend the blanks 10A in stages 10A1 into a u-shaped 10A3 about the mandrel M with the legs of the u-shaped blank 10A3 being adjacent to elongated external and internal surface heaters H1 and H2, respectively, the "external" surface being the outer surface of the innermost lap L1 of a side seam and the "internal" surface being the inner surface of the outer lap L2 of the side seam as shown in the substantially cylindrical fold 10A4 of the blank 10A effected by means of folding rails FR2 downstream from the heaters H1, H2.

A heater H3, schematically shown in FIG. 3 can be utilized to provide additional heat such as radiation or force hot air between the nearly juxtaposed laps L1 and L2.

When the cylindrical fold is completed the rectangular blank 10A has been converted into a cylindrical 10C which exists the folding rails FR2 and passes under a pressure belt assembly PB which applied sufficient downward pressure on the laps L1–L2 to form a heat sealed lapped side seam SS in the cylinder 10C while at the same time translating the cylinder 10C off the mandrel M and onto a finishing mandrel FM.

Referring to FIGS. 3, 5A and 5B. the finishing mandrels FM are shown in solid lines as having a frustroconical (drinking cup) shape and in dotted lines as having a substantially cylindrical shape FM1 similar to that of pressurized aluminum beverage cans.

The finishing mandrels FM are mounted on one end of support arms 44 which are mounted at their other ends on a drive chain 46 which passes about a main transfer sprocket 48 adjacent the finished end of the elongated forming mandrel M. As shown in FIGS. 1 and 3, the finished cylinders 10C are stripped from the forming mandrel M onto one of the finishing mandrels FM which is in substantially coaxial registry with the forming mandrel M.

This registry is achieved by proportioning the transfer sprocket 48 such that the arms 44 are radii thereof and place the finishing mandrels FM one by one at the dead center position 48A of the transfer sprocket 48 at the point of coaxial registry with the forming mandrel M. As a result, a time delay during which the finishing mandrel FM remains in such registry is effected, thereby permitting transfer of the cylinder 10C from the forming mandrel M onto the finishing mandrel FM. In another embodiment the registry of the finishing mandrel may be effected by synchronization of the discharge of the cylinder 10C from the forming mandrel M onto the finishing mandrel FM.

Once the cylinders are transferred onto the finishing mandrels FM they are conveyed on those mandrels through a suitable heat tunnel HT, the length of the latter and its temperature being correlated with the speed of the carrier chain 46 to shrink the cylinders to a frustro-conical configuration or a cylindrical configuration depending upon the shape of the finishing mandrel FM or FM1.

The shrinkable sleeves SS are longer than the mandrels FM, FM1 so as to shrink beneath the bottom defining ends of the mandrels (provide the inturned bottom or curl) of a finished container.

For example, as shown in FIG. 6A, a frustro-conical sidewall SW1 is produced by shrinking the sleeves SS on a frustro-conical mandrel FM. A bottom blank BD is provided such that the inturned edges SW1A of the sidewall SW1 will overlap the bottom blank BD after forming the sidewall from the sleeve SS.

The mandrel FM is shown as including internal vacuum ports VP which extend to a vacuum connection VC on the mounting arm 44 of the mandrels as will be more fully described with reference to FIG. 7.

For a container of a more conventional cylindrical shape such as the cross section of an aluminum beverage can or the like, reference is made to FIG. 6B in which a more cylindrical mandrel FM1 having vacuum ports VP1 is shown with a sidewall SW2 shrink formed thereon with inturned edges SW2A overlapping the periphery of a bottom blank BD1, the letter being initially held on the mandrel via the vacuum ports VP1.

Referring now to FIG. 7, the finishing mandrels FM (provided with a bottom blank BD as shown in FIG. 6A and to be more fully described with reference to FIGS. 9-11) are loaded with the shrinkable cylinders at a loading station LS1 in the manner previously defined in FIGS. 1-6, and the mandrels FM bearing the sidewall blanks (SW1) are progressively transported through the heat tunnel HT from the entrance HT1 thereof to the exit HT2 on the carrier chain 46 over the drive sprockets 48.

When the mandrels FM leave the exit HT2 of the heat tunnel HT they are carrying formed cups or containers of the configuration shown in FIG. 6A. These cups or containers are then subjected to bottom sealing and a top curl forming operation will be described with reference to FIGS. 9-11.

The bottom blanks BD (BD1) of FIG. 6A (6B) are held on the mandrels FM (FM1) by means of vacuum applied through vacuum hoses VH. The vacuum hoses VH are in communication with ports VP (VP1) through the support arms 44 and said mandrels.

A vacuum distributor VD is provided centrally of the arcuately disposed heat tunnel HT. All of the vacuum hoses VH are manifold into the vacuum distributor VD.

As further shown in FIGS. 8A and 8B, the vacuum distributor VD includes a top rotor plate VD1 having a plurality of radially disposed vacuum ports VPR. Each of the vacuum hoses VH is connected to a vacuum port VPR which in turn is in communication with a circular locus in the rotor disc VD1 which corresponds in size to the radius of an arcuate vacuum supply port VSP in a fixed portion plate VD2 through which an input coupling VIC is provided to connect the supply port VSP to a vacuum source VS.

As the mandrels FM travel through the heat tunnel HT, the rotor disc VD1 rotates on a bearing VB on a support shaft VSS and is held in sufficient sealed engagement therewith. The vacuum ports BPR in the rotary disc VD1 thus come into and out of registry with the vacuum supply port VSP in the support disc VD2 causing vacuum to be applied through the hoses VH to the vacuum ports VP (VP1) in the mandrels FM (FM1) to provide the suction required to hold the bottom blanks BD (BD1) at the inturned portions SW1A (SW2A) of the said sidewall blanks.

The arcuate length and position of the vacuum supply port VSP are thus correlated with heat shrink process and extent of travel of the mandrels FM (FM1) in the heat tunnel HT from the time the bottom blanks BD (BD1) are loaded on the said mandrels until sufficient shrinkage of the sidewalls SW1 (SW2) has been achieved to hold the said bottom blanks in place.

Also provided in the fixed bottom disc VD2 is an ejection pressure port EPP fed from an ejection pressure supply source EPS. The ejection pressure port EPP is positioned to time the application of positive pressure through vacuum ports VPR, vacuum hoses VH and vacuum ports VP (VP1) in the mandrels FM (FM1) to eject finished containers therefrom at the ejection portion of the word station WS as will be more fully described with reference to FIGS. 9 and 10.

Figure 9:
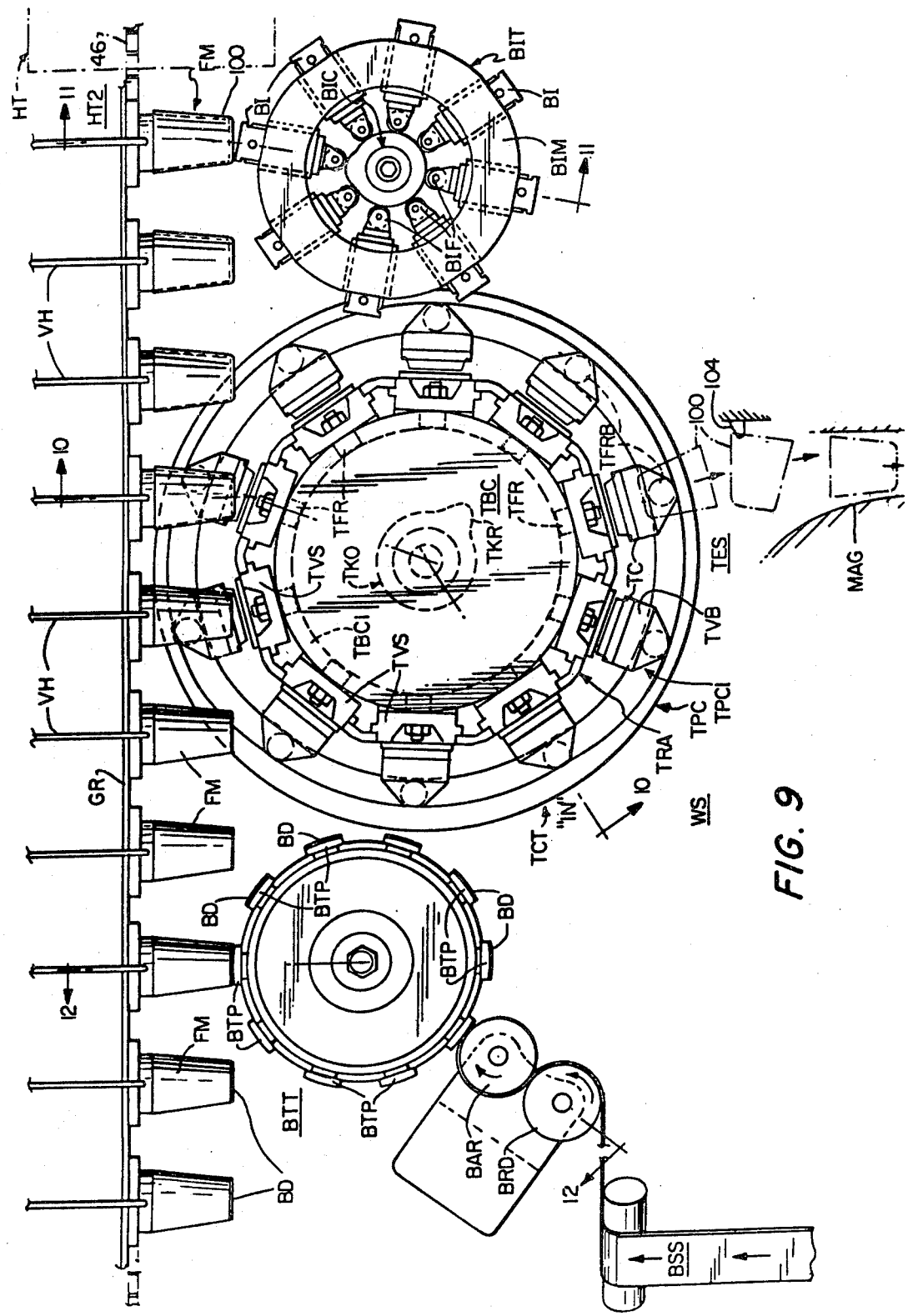
FIG. 9 is a top plan view of bottom finishing, top curl forming and container ejection stations for cup making equipment of the present invention together with a bottom blank feeding station.

Referring to FIGS. 7 and 9, a bank of work stations WS is shown including bottom blank loading, top curl forming, bottom sealing and ejection functions.

As specifically shown in FIGS. 9 and 11, the chain carried mandrels FM are passed along a juxtaposed guide rail GR as they exit the heat tunnel HT at HT2.

The guide rail GR provides a thrust backing to cooperate with a bottom ironing turret BIT having bottom irons BI in a radial array with peripheral spacing therebetween on the said turret corresponding to the spacing between adjacent finishing mandrels FM on the chain 46.

The bottom ironing turret BIT includes a rotating toroidal mounting BIM for the bottom irons BI in which the latter are radially reciprocable. A central cam BIC is provided which constrains the bottom irons BI to engage with the bottom of formed cups or containers 100 on the finishing mandrels FM by means of cam follower wheels BIF and return springs BIS (FIG. 11).

Bottom sealing pressure is regulated by a compression spring BIP mounted in a telescoping section of the bottom iron in opposition to the return spring BIS to prevent the bottom irons BI from engaging the bottoms of the containers 100 on the mandrels FM with more than a predetermined maximum sealing force.

As shown in FIGS. 11A and 11B, the bottom iron BI is configured with a raised annular boss BIA dimensioned to press into the inturned edges SE1A of the sidewalls SW1 of the finished cups of container 100 on the mandrel FM at a point at which the bottom blank BD is overlapped to enhance the seal therebetween and insure a liquid tight container bottom structure.

Depending on the properties of the shrinkable foam material and bottom blank material the heat of the shrinking process may provide sufficient heat to form an annular heat seal on the bottom of the containers 100 or the bottom irons BI can be heated to supply additional sealing heat.

As shown in the art other heating means, adhesives, solvents or the like may also be used to enhance the ultimate bond between the inturned portions SW1A (SW2A) of the sidewalls SW1 (SW2) of the containers 100 and the bottom blanks BD (BD1).

A purely heat sealed bond is the preferred embodiment, however.

Figure 10:
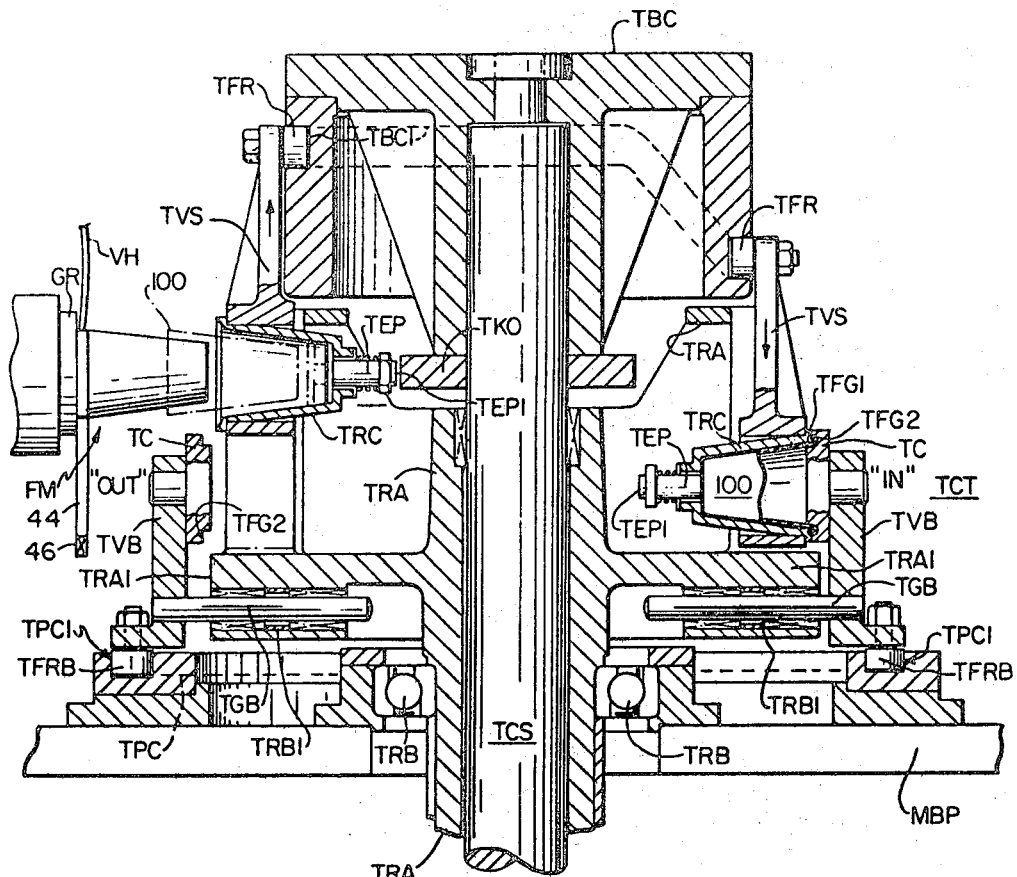
FIG. 10 is a cross sectional view of the top curl forming station taken along line 10—10 of FIG. 9.

Referring to FIG. 10 in addition to FIG. 9, a top curl forming turret TCT is shown adjacent to the bottom ironing turret BIT for receiving finished cups or containers 100 ejected from the finished mandrels FM and forming a top curl thereon, i.e., rolling the top rim outward on itself as is a well known practice in the cup and container art.

The top curl turret TCT is shown as including a centrally located barrel cam TBC having a cam track TBC1 in which a plurality of follower rollers TFR ride to constrain vertical movement to respective ones of a like plurality of vertical slides TVS on which are mounted radially disposed and outwardly opening cups receiving cavities TRC.

The barrel cam TBC is coaxially and fixed mounted on the upper end of a non-rotating central shaft TCS for the turret TCT the said shaft TCS being journaled through a hub assembly TRA which is mounted for relative rotation to the shaft TCS on a machine base plate MBP in bearing means TRB.

The hub assembly TRA provides outboard slots for the vertical slide members TVS and an annular plate TRA1 beneath which a plurality of radially disposed bearing means TRB1 are provided to receive reciprocating guide bars TGB for top curl forming tools TC mounted one in registry with each cup receiving cavity TRC on vertical bars TVB each extending upward from respective guide bar TGB and a cam follower roller TFRB engaging a cam track TPC1 in an annular plate cam TPC fixedly mounted on the machine base plate MBP.

Between the hub assembly TRA and the barrel cam TBC on the central shaft TCS in an annular kick-out cam TKO having a single kick-out rise TKR at a desired ejection station position TES (FIG. 9) to effect ejection of the containers 100 from the cavities TCR.

The kick-out cam TKO is engaged in the uppermost positions of the container cavities TRC and vertical slides TVS by the inboard tops TEP1 of ejection pin assemblies TEP which are spring biased to telescopically reciprocate in and out of the base of the container receiving cavities TRC to eject finished cups or containers 100 therefrom by a plunger action induced by the kick-out cam TKO.

Figure 10A:
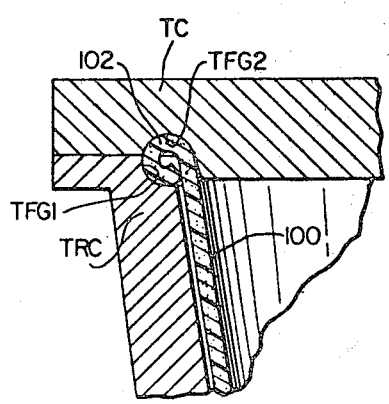
FIG. 10A is an enlarged view of the top curl tool.

Referring additionally to FIG. 10A, the top curl tool TC is shown in the "IN" position as constrained by the plate cam TRC to cause mating top curl forming surfaces TFG1 in the periphery of the cavities TRC and TFG2 in the top curl tool TC to force the top of each container 100 into the curled configuration 102 shown in FIG. 10A and at the "IN" position of the top curl tool TC in FIG. 10.

Thus, in operation, rotation of the hub assembly TRA on the central shaft TCS causes coordination vertical movement of the slides TVS and the receiving cavities. TCR and radial movement of the curling tools TC to maximum height and radially outward positions, respectively, at the "OUT" position in FIG. 10 and minimum height and innermost radial positions, respectively, at the "IN" position of FIG. 10.

This is effected by the coordination shapes of the cam tracks TBC1 and TPC1 on the barrel cam TBC and plate cam TPC, respectively.

In the "OUT" position of the top curl tool TC, the receiving chamber TCR is shown in FIGS. 9 and 10 as being indexed to receive a cup or container 100 from the finishing mandrel FM as ejected therefrom by positive pressure in the vacuum hose VH.

The hub assembly TRA rotates in synchronism with the travel of the mandrels FM on the chain 46 and the receiving chambers TRC bearing a container 100 progress toward the "IN" position of FIGS. 9 and 10 in which the curling tool TC has been brought into juxtaposed registry with the receiving cavity TRC to form the top curl 102 on the container 100 (see FIG. 10A).

Subsequently, the tool TC and the receiving cavity TRC separate rapidly and the latter rapidly rises under control of the barrel cam TBC to engage the inboard and TEP1 of the ejection plunger TEP with the kick-out cam TK0 and the ejection rise TKR thereon at the ejection station TES (See FIG. 9).

This ejects the containers 100 into engagement with an inverting detent 104 in a magazine chute MAG such that the finished containers are magazined in an upright position.

Prior to the placing of the cylinders 10C onto the finishing mandrels FM (FM1) a bottom blank or disc BD must be placed on the outboard end of the said mandrels to be held thereon by vacuum in the vacuum lines VH from the vacuum distributor VD as previously shown in FIGS. 6A, 6B, 8A and 8B.

To accomplish this function, a supply of bottom blanks BD and a means for transferring them from the supply to the finishing mandrels FM (FM1) must be provided.

To this end, referring jointly to FIGS. 9 and 12, bottom strip stock BSS is fed to a rotary die roller BRD and anvil roll BAR to cause the die roller to cut discs BD from the strip stock BSS and present it to a bottom transfer plate BTP on a bottom transfer turret BTT adjacent to the anvil roll BAR and indexed therewith to pick up each bottom disc BD as it is cut.

The bottom transfer plate BTP bearing the bottom disc BD is eventually indexed into registry with a passing finishing mandrel FM (FM1) and transferred thereto.

The initial pick up of the bottom disc BD by the transfer plate BTP is made by vacuum applied via a vacuum port BTV through vacuum distributors BVD1 and BVD2.

The distributor BVD1 rotates with the bottom transfer plates BTP on the turret BTT while the distributor BVD2 remains stationary.

Vacuum is supplied through a vacuum hose BVH from a vacuum supply source BVS in the base of the turret BTT. The fitting of the hose BVH to the fixed distributor BVD2 acts as a valve to provide vacuum to the ports BTV at all locations via the distributors BVD1, BVD2 except at the right hand position shown in FIG. 12 for the bottom transfer plates BTP. In this position, there is no vacuum in the line BTV and the vacuum from the hose VH in the finished mandrel FM, now coaxially indexed with the bottom transfer plate BTP will act to strip the bottom disc BD from the plate BTP and onto the base of the mandrel FM.

IN-LINE FILLING OF CONTAINERS AS THEY ARE MADE

As the finished containers 100 enter the magazine MAG at the ejection station TES of the top curl turret TCT, the containers can be fed, one by one, as known in the art to dial-like feeder discs 104 which are indexed by a shaft 106 to feed the containers 100, one by one to a container filling station 110 where food produce 112 in a measured amount is discharged into the container 100. The container 100 is elevated by a pedestal 108 to the filling station 110, which pedestal withdraws to return the container to rest in the dial 104 on its top curl 102.

The container 100 with food 112 is then transferred to another station where a lid 114 is pressed onto the top curl 102 of the container 100 by a seating jig 116 as will now be described with reference to FIG. 14.

The jig 116 is provided with an ejection plunger 118 to eject the lid and container from the jig 116 after seating is completed. An air gap 120 is maintained between the plunger 118 and the lid 114 in the event that vacuum is needed to initially retain the lid 114 in the jig 116.

A plurality of shaped pressure rollers 122 such as schematically illustrated, are spaced around the top curl 102 and produce a curved seam 114R between the top curl 102 and the lid 114.

A pedestal 108A is utilized to transfer the tilled container 100 from the dial 104 to the lid seating jig 116.

In an alternate embodiment for seating a lid 114A on a container 100A, having an uncurled top edge 102A, a top edge overlap 114RA on the lid 114A is clinched in place by segmented jaws 124 in cooperation with a seating jig 116A. This embodiment is shown shcematically in FIG. 15.

Figures 13, 14, 15:
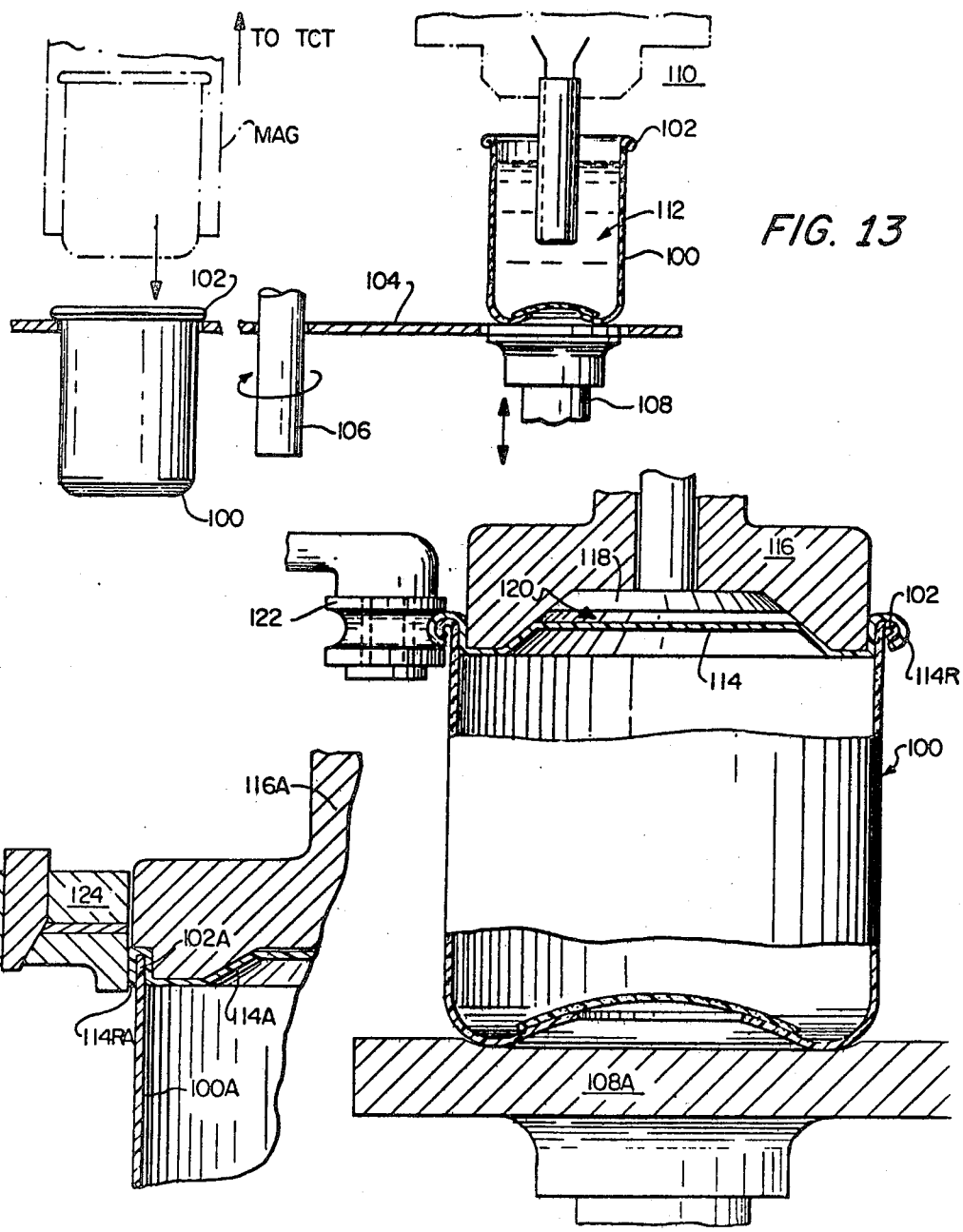
FIG. 13 is a schematic of a container filling station.
FIG. 14 is a schematic of a filled container capping station.
FIG. 15 is a schematic of a filled container capping station illustrating a different cap or lid from that illustrated in FIG. 14.

Rotary transfer dials 104 and pedestals 108 and filling stations 110 such as those shown in FIG. 13 are known in the art.

For example, U.S. Pat. No. 3,225,899 for Machine For Packaging Food Products of J. B. West issued Dec. 28, 1965 and U.S. Pat. No. 3,345,801 for Auxiliary Unit For Packaging Machine to J. B. West, issued Oct. 10, 1967 illustrate container filling, capping and handling machines of the type generally described with reference to FIGS. 13, 14 and 15.

With the present invention, cans and containers can be made as needed and no storage of completed containers is necessary in conjunction with a given canning or packaging run.

Only rolls of sidewall and bottom blank material need be stored to effect a supply of containers for holding a given volume of food product.

This also permits the use of non-nestable container shapes which heretofore have been undesirable because of their bulk in an unfilled condition. Once filled, of course, even nestable containers assume such bulk in storage.

Thus, with the continuous container manufacturing method and means of FIGS. 1-12, feeding the continuous filling and capping equipment typified by FIGS. 13-15, an extremely efficient operation is provided with requires only a minimum of warehouse space for the containers required.

SUMMARY OF CONTAINER MAKING OPERATION

As illustrated in FIGS. 1-3, foam plastic strip stock, stretch oriented on its length 10B, is cut into rectangular blanks 10A and transferred transversely of its length 10B through continuous folding means M, H1, H2, FR1, FR2 and a heat seaming means PB to form seamed cylinders 10C circumferentially stretch oriented.

The cylinders 10C are placed over finishing mandrels FM (FMl) having bottom blanks BD already in place from a bottom transfer turret BTT (FIGS. 9, 12).

A chain drive 46 (FIGS. 1, 3, 7, 9) carries the mandrels FM (FM1) through a heat shrink tunnel causing the cylinders 10C to shrink and assume the shape of the mandrels FM (FM1) as shown in FIGS. 6A/6B. The sidewalls SW1 (SW2) shrink beneath the mandrels FM (FM1) to place annular overlapping portions SW1A (SW2A) over the outer edges of the bottom disc BD (BD1) as further shown in FIGS. 6A (6B).

As the mandrels FM (FM1) bearing shrink formed containers 100 leave the heat tunnel HT (FIGS. 7, 9, 10, 11) bottom seams are formed in the overlap by bottom irons BI on a bottom ironing turret BIT in a manner most specifically illustrated in FIGS. 11A, 11B.

The top curl 102 is then formed on the containers 100 by discharging them from the mandrels FM (FM1) into the receiving chambers TRC of the top curl forming turret TCT which, as shown in FIG. 10A, places a top curl 102 in each container 100 with top curl tool TC.

Subsequent to the forming of the top curl 102, the container 100 is ejected from the top curl turret TCT at an ejection station TES, inverted to proceed bottom first into a magazine MAG and thus placed in readiness for either packaging or for processing in filling equipment.

THE BOTTOM BLANK APPARATUS AND METHOD

Figure 16A:
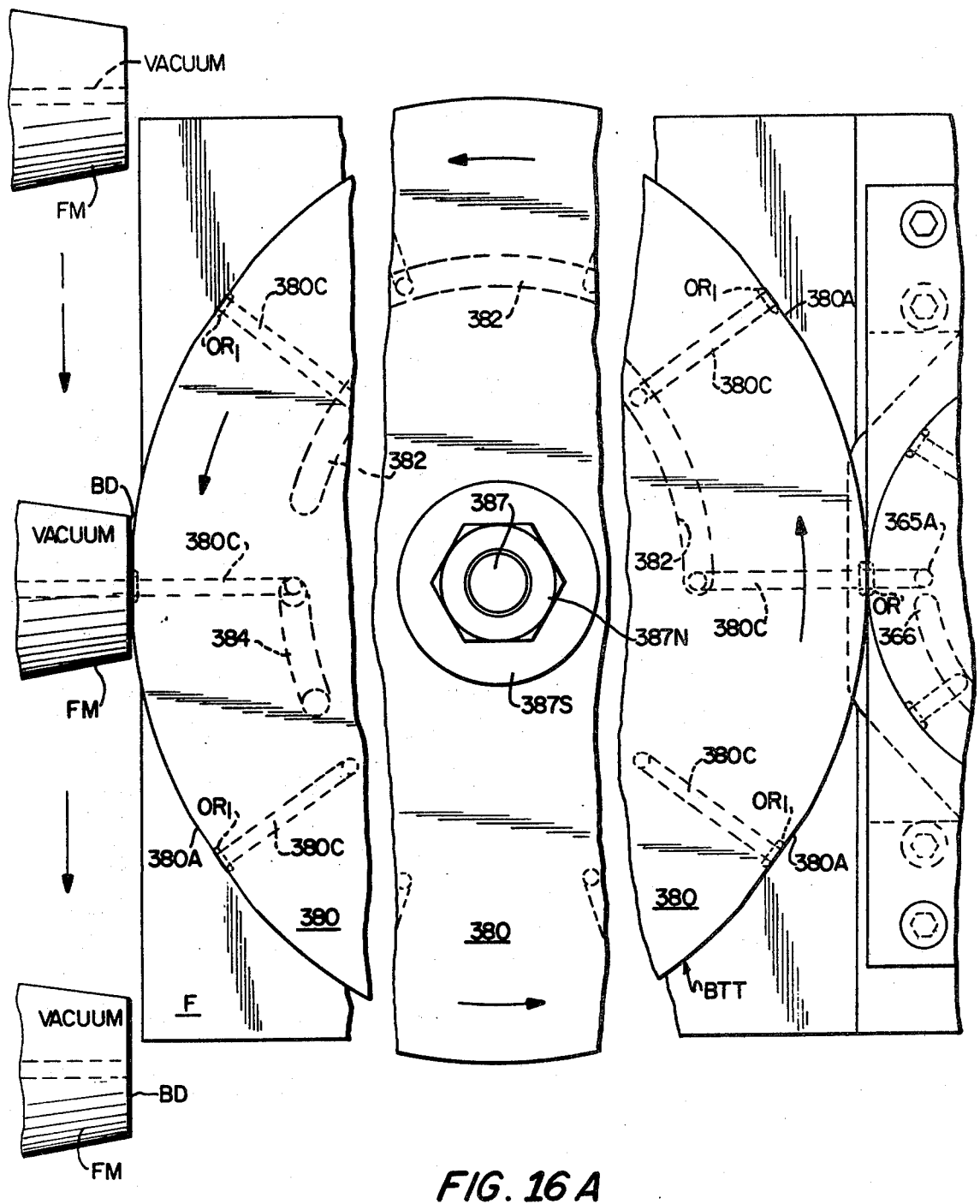
FIG. 16A is a top plan view of a bottom blank handling apparatus according to the present invention.
Figure 18:
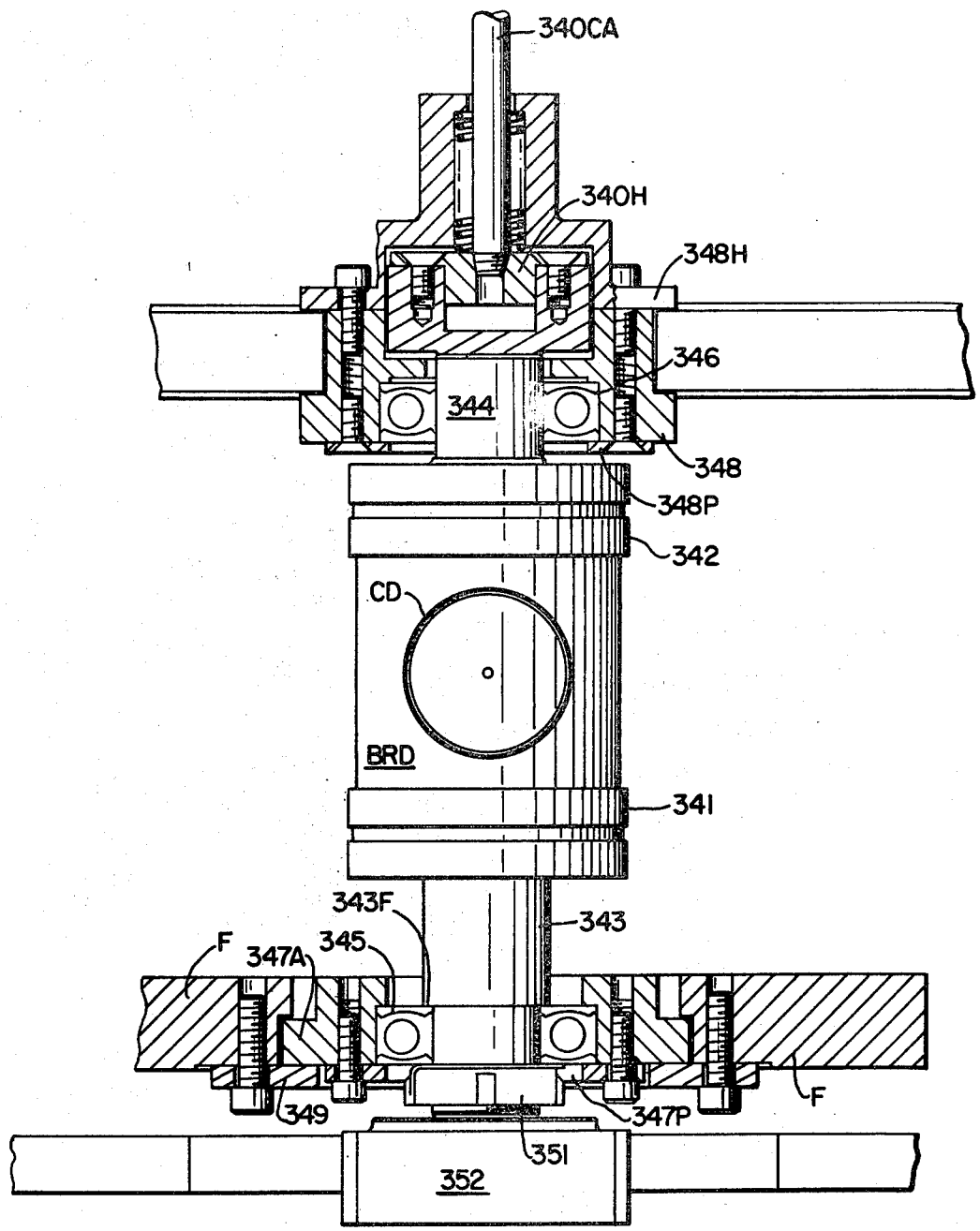
FIG. 18 is a side view of the rotary die and illustrating a partial cross section view of the framework.

FIGS. 16A and 18 illustrate a more detailed preferred embodiment of a bottom blank handling apparatus for severing bottom blanks from a web feed roll and tangentially transferring the bottom blanks to final forming mandrels at a compatible velocity and spacing.

Figure 16B:
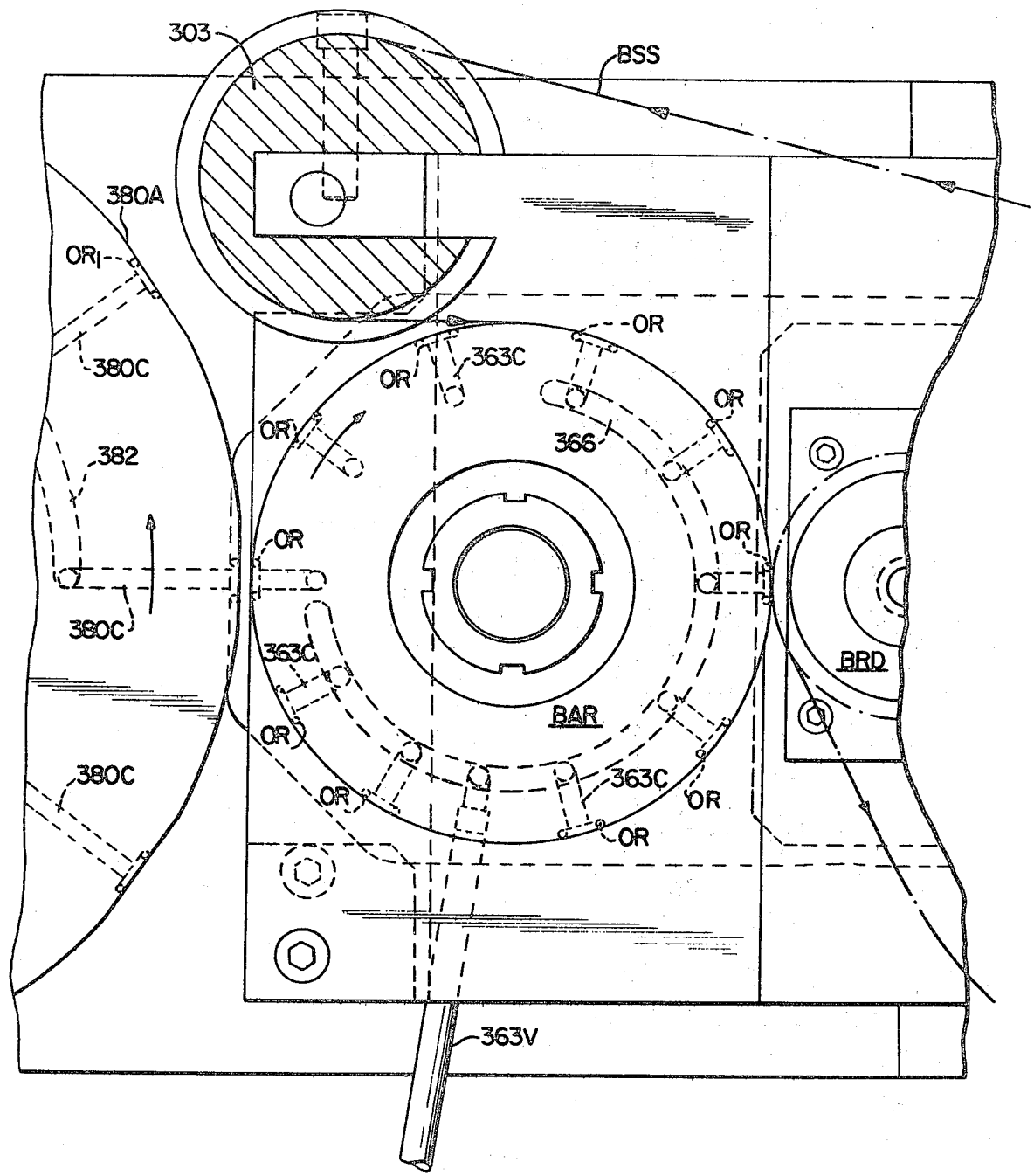
FIG. 16B is a continuation of the top plan view of a bottom blank handling apparatus as illustrated in FIG. 16A.
Figure 16C:
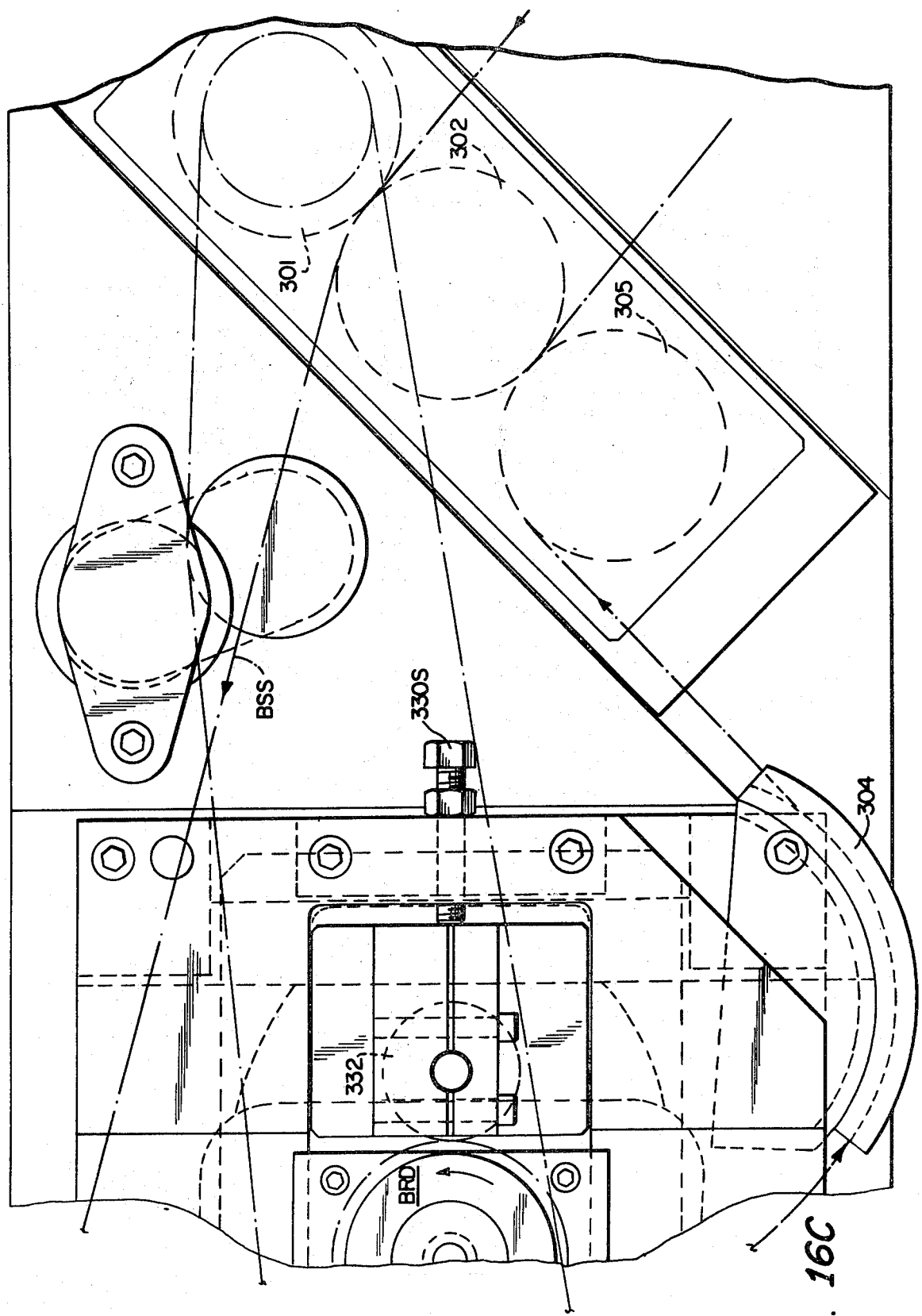
FIG. 16C is a continuation of a bottom blank handling apparatus as illustrated in FIGS. 16A and 16B and further illustrating the bottom blank web feed mechanism.

FIGS. 16A through 16C illustrate a top plan view of the detailed disclosure of a bottom blank handling apparatus of the present invention. FIG. 16A illustrates a top plan view of the left hand portion of the apparatus. FIG. 16B illustrates a top plan view of the center portion of the apparatus. FIG. 16C illustrates a top plan view of the right hand portion of the apparatus.

As illustrated in FIGS. 16A through 16C, a bottom strip stock BSS is fed between the pinch rollers 201 and 202, around the stationary guide 203 and is held against the outer surface of the anvil roll BAR. Thereafter, the bottom strip stock BSS passes between the rotary die roller BRD and the anvil roll BAR where the bottom blanks BD are severed from the bottom strip stock. As illustrated in FIG. 16B, after the bottom blanks BD are severed from the bottom strip stock BSS the remaining scrap portion of the bottom strip stock is conveyed around the stationary guide 204 and between the pinch rollers 202 and 205 to discharge the scrap material. In a preferred embodiment of the present invention, the pinch rollers 201, 202 and 205 are covered with a polyurethane material. The pinch rollers 201 and 202 pull the bottom strip stock from a roll of material to feed the web. Similarly, the pinch rollers 202 and 205 pull the scrap bottom strip stock from between the rotary die BRD and the anvil roll BAR to discharge the scrap material.

The rotary die roller BRD is mounted in sliding bearing blocks so that the jack screws 230S may accurately position the rotary die adjacent the first transfer turret or anvil BAR. Referring additionally to FIGS. 17A, 17B, 17C and 18, the rotary die BRD includes five cutters CD positioned around the circumference thereof. Further, the rotary die includes two bearing portions 241, 242 which are designed to engage cam followers 231, 232 respectively. The cam followers 231, 232 are mounted on a shaft 233 positioned in cam housing 234. Further, the rotary die BRD includes outwardly projecting portions 243, 244 which are mounted in bearings 245, 246, respectively. The bearings 245, 246 are mounted on the slidable bearing blocks 247, 248 which enable the rotary die to be precisely positioned adjacent the first transfer turret or anvil BAR.

Figure 17A:
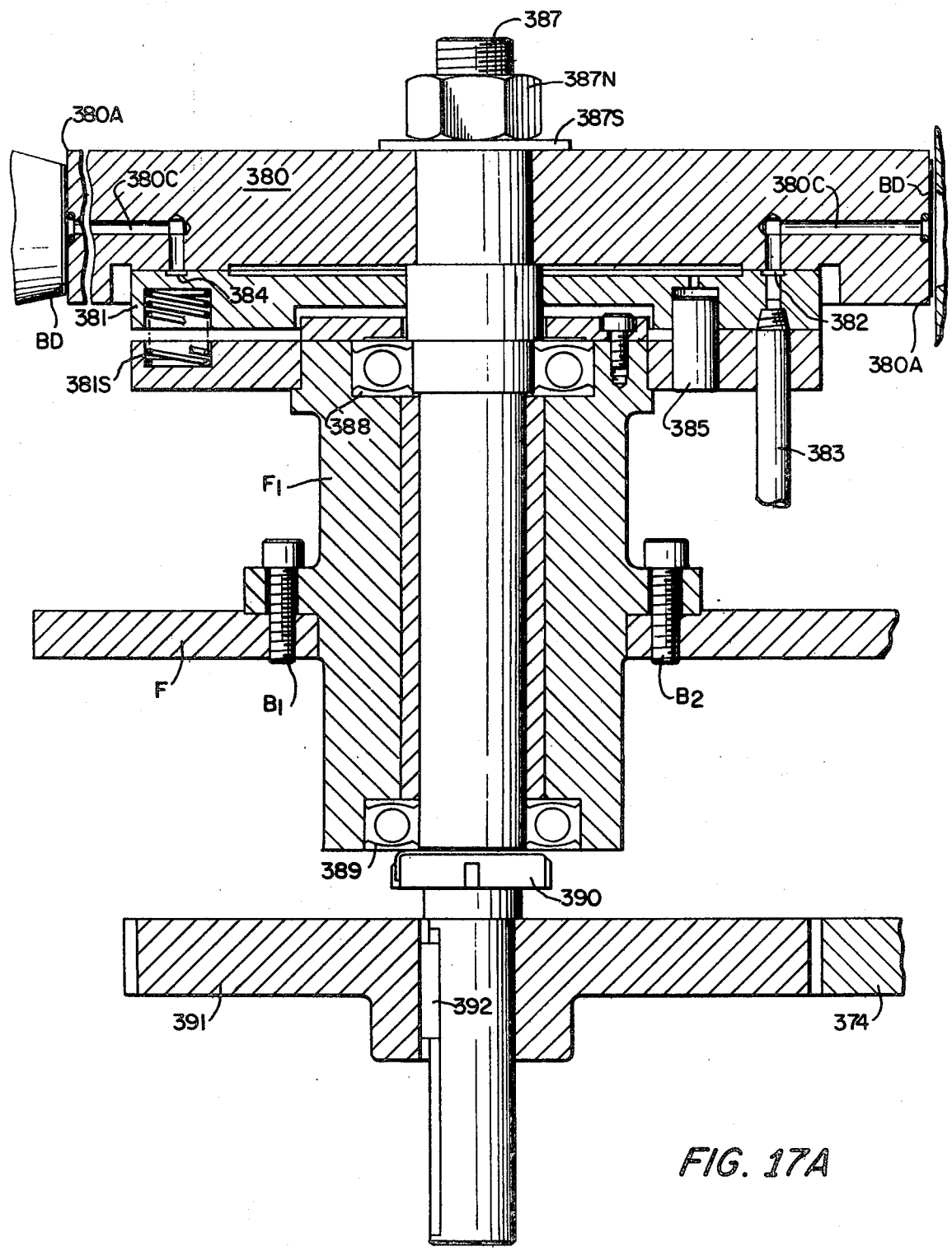
FIG. 17A is a side elevation of the bottom blank handling apparatus as illustrated in FIG. 16A.

The sliding bearing block 247 includes an outwardly projecting portion 247A which is slidably received between a flange of the framework F and a plate 249 which is secured to the framework F. As illustrated in FIG. 18, the outer portion of the bearing 245 is securely positioned within an opening in the sliding bearing block 247. The inner portion of the bearing 245 mates with the outwardly projecting portion 243 and is precluded from axial movement by engagements with the flange 243F. Further, the bearing 245 is held in place by means of the plate 247P which is secured to the sliding bearing block 247. To ensure the positioning of the bearing 245 relative to the outwardly projecting portion 243 of the rotary die BRD a threaded nut 251 is positioned adjacent the lower end of the outwardly projecting portion 243. Further, as illustrated in FIGS. 17A and 18, a gear 252 is positioned adjacent the lowermost portion of the outwardly projecting member 243 and is secured thereto by means of a key 252K and a bolt 252B.

The sliding bearing block 248 together with the housing portion 248H slidably mates with the framework F at the uppermost portion of the rotary die BRD. The outermost portion of bearing 246 is securely positioned within the sliding bearing block 248. The innermost portion of the bearing 246 mates with the outwardly projecting portion 244 of the rotary die BRD. To ensure the positioning of the bearing 246 relative to the rotary die BRD, a plate 248P is secured to the sliding bearing block 248. The plate 248P prevents axial movement of the bearing 246.

Figure 17B:
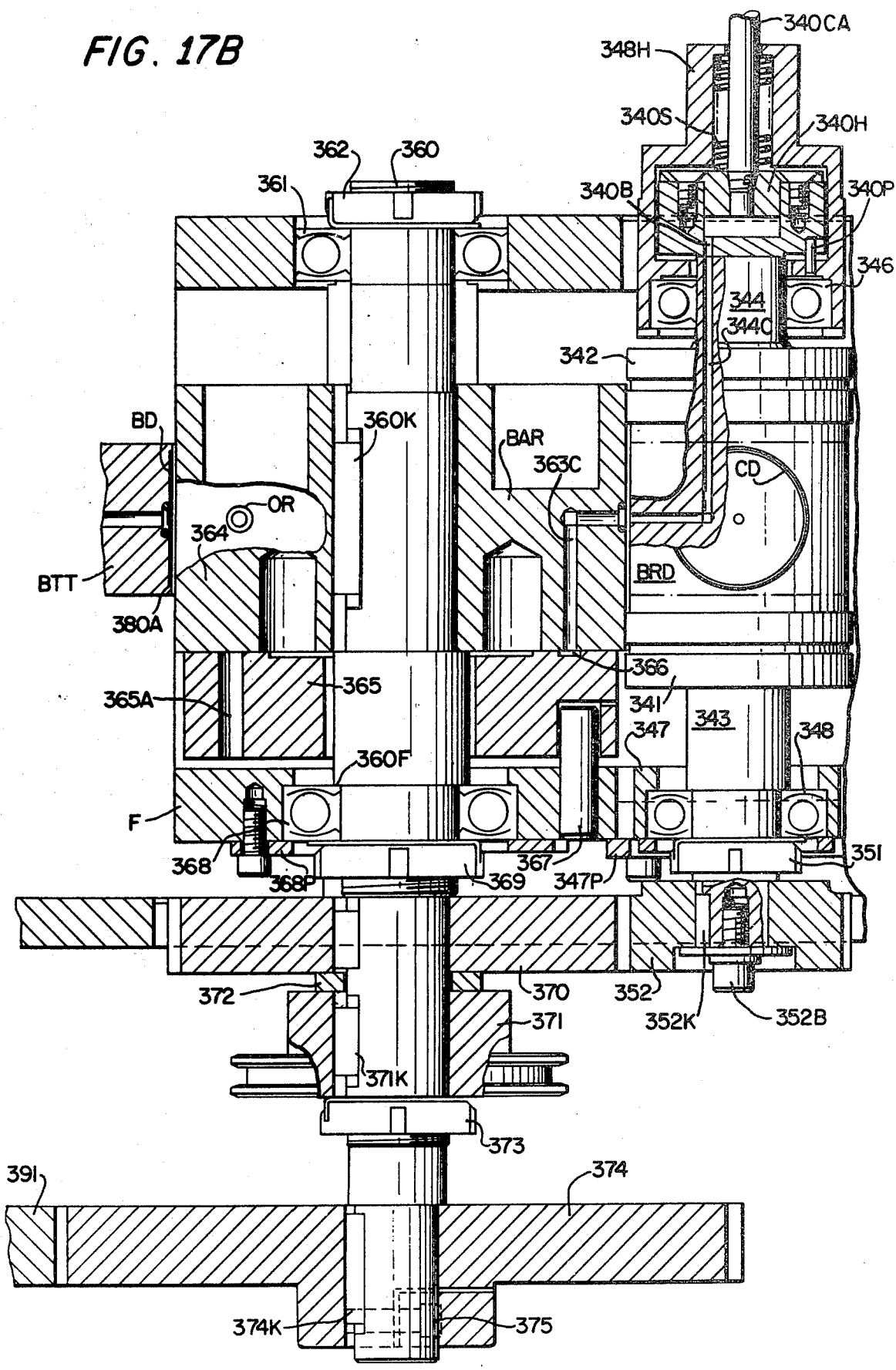
FIG. 17B is a side elevation of the bottom blank handling apparatus as illustrated in FIG. 16B.
Figure 17C:
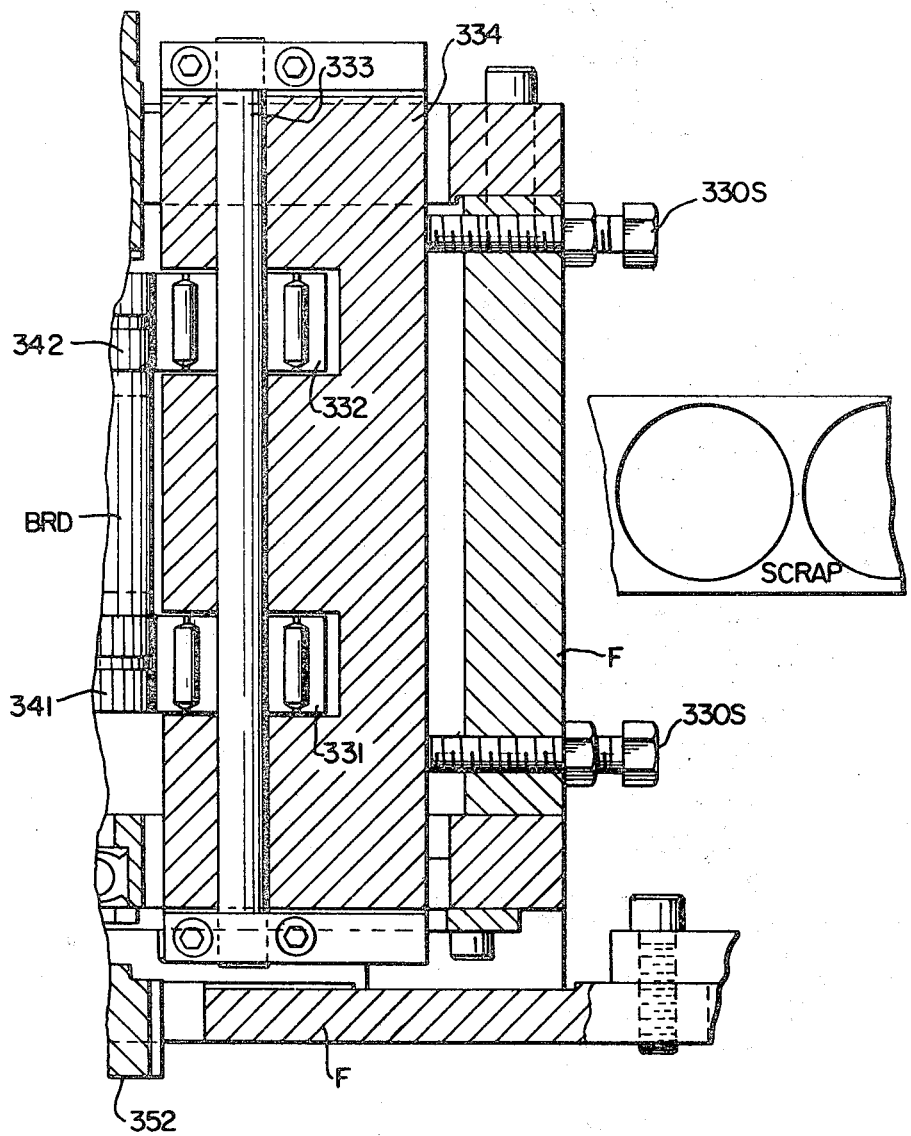
FIG. 17C is a side elevation of the bottom blank handling apparatus as illustrated in FIG. 16C.

Referring to FIGS. 17B and 18, in one embodiment of the present invention a compressed air supply 240CA may be supplied to the upper portion of the housing 248H of the sliding bearing block to facilitate the transfer of a severed bottom blank BD from the bottom strip stock BSS and cutter CD to the peripheral surface of the first transfer turret or anvil BAR. The compressed air supply 240CA is securely threaded into the upper surface of a compressed air housing 240H. The upper surface of the compressed air housing is firmly secured to the lower portion of the housing. In this embodiment of the present invention, the lower portion of the housing is constructed of nylatron.

As illustrated in FIG. 17B, the compressed air housing is prevented from rotation by means of a pin 240P. Further, the compressed air housing is spring biased downwardly by means of the spring 240S positioned within the upper portion of the housing 248H. The compressed air housing 240H includes an opening 240B disposed in the lowermost portion thereof which communicates compressed air from the compressed air supply 240CA to a conduit 244C of the rotary die BDR. It should be noted, that the outwardly projecting portion 244 includes five conduits 244C disposed longitudinally therein which communicate compressed air to each of the cutting dies disposed around the circumference of the rotary die BRD. Since the compressed air housing 240H includes only one opening 240B disposed in the bottom portion thereof, compressed air is transmitted to one of the longitudinally disposed conduits 244C only when the die positioned on the circumference of the rotary die BRD is in the process of severing a bottom blank BD from the bottom strip stock BSS. In other words, the compressed air is supplied to the rotary die to facilitate the discharge of a bottom blank BD to the anvil BAR only after the bottom blank has been severed from the bottom strip stock BSS. Since the compressed air housing 240H is keyed to the sliding bearing housing 248 by means of a pin 240P, rotation of the compressed air housing is prohibited. Therefore, compressed air is only supplied when the opening 240B and the longitudinally disposed conduit 244C are aligned as illustrated in FIG. 17B.

Although in one embodiment of the present invention compressed air may be supplied to a compressed air housing 240H to facilitate the discharge of a bottom blank BD to the anvil BAR, it should be understood that the present invention is not limited to this particular means of aiding the discharge of the severed bottom blanks BD. For example, in the preferred embodiment of the present invention, illustrated in FIG. 16B, as the bottom strip stock BSS wraps around the rotary die BDR after the bottom blanks BD are severed therefrom, the resiliency of the bottom strip stock BSS actually pops the bottom blanks BD from the bottom strip stock to the anvil BAR.

Accurate positioning of the rotary die BRD adjacent the hardened anvil BAR is achieved by the cam followers 231, 232 mounted on the shaft 233 within the cam housing 234. The cam housing 234 is slidably mounted adjacent the rotary die BRD. As previously discussed, the jack screws 230S are threaded within openings in the framework F and engage the cam followers housing 234. By rotating the jack screws 230S the cam followers housing 234 is displaced towards the rotary die BRD. The cam followers 231, 232 are likewise displaced against the bearings 241, 242 to press the rotary die against the anvil BAR. Therefore, adjusting the jack screws 230S regulates the relative contact of the rotary die BRD against the anvil BAR to ensure proper die penetration of the bottom strip stock BSS.

REferring to FIGS. 16B and 17B the first transfer turret or anvil BAR is illustrated as being mounted on an axle 260 being keyed thereto by the member 260K. The upper portion of the axle 260 is mounted in a bearing 261 which is positioned in the framework F. The outermost end of the axle 260 is secured to the bearing 261 by means of a screw nut 262.

The first transfer turret or anvil BAR has ten bottom blank stations positioned around the circumference thereof. As illustrated in FIG. 17B, each station for receiving a bottom blank BD includes an "O" ring OR positioned adjacent to the circumferential portion of the anvil BAR to effect a better seal and permit a more accurate transfer. The "O" rings are positioned adjacent to and concentric with the ends of the vacuum conduits 263C which are supplied with a source of vacuum by means of a manifold 266 from a point prior to the severing of the bottom blanks BD from the bottom strip stock BSS by the rotary die BRD to a point immediately prior to the tangential transfer to the second transfer turret BTT. The "O" rings OR are preferrably positioned in grooves by means of cement or the like and project slightly outwardly from the peripheral circumferential surface of the anvil BAR. As illustrated in FIG. 16B, the vacuum conduits 263C are supplied with a source of vacuum from a point prior to the severing of the bottom blanks BD by the rotary die BRD through an arc of approximately 180° until just prior to the transfer of the bottom blanks BD to the second transfer turret BTT.

In a preferred embodiment of the present invention, the anvil BAR includes an upper portion 264 which may be constructed from steel. Further, the anvil includes a lower portion 265 which may be cnstructed of nylatron. The upper portion of the anvil 264 is keyed to rotate with the axle 260. The lower portion of the anvil 265 is prevented from rotating by means of the pin 267 which is inserted in the framework F. The lower portion of anvil 265 includes a manifold 266 positioned in the upper surface thereof so as to communicate the supply of vacuum to the conduits 263C between the pick-up point of the severed bottom blank BD adjacent the rotary die BRD to the tangential transfer of the bottom blank BD to the second transfer turret BTT. The lower portion of the anvil 265 includes a through opening 265A for venting the conduit 263C to atmosphere at the time of tangential transfer of the bottom blank BD from the anvil turret BAR to the second transfer turret BTT.

A bearing 268 is secured to the framework F and mounted on tha axle 260 in a position beneath the anvil turret BAR. The bearing 268 is prevented from axial movement along the axle 260 because of the flange 260F. Further, a plate 260P is secured to the framework F and locks the bearing 268 in place relative to the axle 260 and the framework F. Further, a screw nut 269 is mounted on the axle 260 and ensures the proper positioning of the bearing 268 and the first transfer turret or anvil BAR.

A gear 270 is positioned on the axle 260 and keyed thereto by member 270K. Further, a pulley take-off 271 is positioned on the axle 260 and keyed thereto by member 271K. Further, the pulley 271 is accurately positioned relative to the gear 270 by means of a threaded nut 273. It should be understood that the pulley 271 is connected to the gear drive for the pinch rollers 201, 202 and 205.

A gear 274 is mounted on the axle 260 and is keyed thereto by the element 274K. The gear is further secured to the axle 260 by the locking screw 275.

Referring to FIGS. 16A and 17A, the second transfer turret BTT is shown as including ten bottom blank holding stations positioned around the circumference thereof and further includes an upper portion 280 and a lower portion 281. The lower portion 281 is spring biased by element 281S into engagement with the upper portion 280. In a preferred embodiment of the present invention the upper portion 280 may be constructed of nylatron and the lower portion 281 may be constructed of steel.

The upper portion 280 of the second transfer turret BTT includes a plurality of conduits 280C which project upwardly and radially outwardly. An "O" ring $OR_1$ is positioned adjacent to and concentric with the ends of each conduit 280C to effect a better seal and permit a more accurate transfer. As illustrated in FIG. 16A, the conduits 280C are in communication with a manifold or distributor 282 from the initial tangential pick up of a bottom blank BD from the anvil BAR to a point just prior to the tangential discharge of the bottom blank. The manifold or distributor 282 is connected to a vacuum line 283 which supplies a source of vacuum to hold the bottom blank BD adjacent the second transfer turret BTT during a portion of its rotation.

As illustrated in FIG. 16A, the upper portion 280 of the second transfer turret BTT includes a substantially flat peripheral area 280A on which a bottom blank BD may be positioned. The "O" rings $OR_1$ are positioned one at each of the areas 280A located around the circumference of the second transfer turret BTT adjacent to and concentrically with the ends of the conduits 280C to provide positive seals for enhancing the transfer of the blanks between turrets and ultimately to the mandrels FM. The "O" rings $OR_1$ are positioned by cementing or the like in annular surface grooves formed in the surface of the peripheral areas 280A and project slightly outwardly therefrom. The peripheral areas 280A and the "O" rings $OR_1$ comprise the holding stations for the bottom blanks BD on the turret BTT.

The lower portion 281 of the second transfer turret includes a manifold or distributor 282 positioned on a portion of the upper surface thereof. Further, the lower portion 281 includes a second manifold or distributor 284 which is in communication with the conduits 280C at the tangential discharge point of the bottom blanks BD. The manifold 284 is thus vented to atmosphere at the time of transfer to assure the transfer of the bottom blank BD from the second transfer turret to the final forming mandrel FM the letter being provided with a similar vacuum holding means as illustrated in FIG. 16A.

The lower portion 281 is prevented from rotation relative to the framework F by means of a pin 285. Therefore, since the lower portion 281 is held stationary and the upper portion 280 rotates about the axle 287. The manifold or distributor 282 is accurately positioned to communicate the source of vacuum to the blank BD from the anvil BAR to a point adjacent to the discharge of the bottom blanks. Further, holding the lower portion 281 stationary relative to the upper portion 280 ensures the accurate alignment of the manifold or distributor 284 to vent the conduits 280C to atmosphere at the discharge point of the bottom blank BD from the second transfer turret BTT.

As illustrated in FIG. 17A, the upper portion of the manifold 280 is mounted on the axle 287 and is held stationary thereto by means of a washer 287S and threaded nut 287N. Further, the upper portion 280 of the second transfer turret BTT is positioned on a flange 287F which accurately positions the upper portion 280 relative to anvil BAR and the final forming mandrels FM.

The lower portion 281 of the second transfer turret BTT is mounted adjacent the axle 287 but is held stationary with respect thereto by means of the pin 285 which is positioned in a portion of the framework F. In addition, the axle 287 is mounted in bearing units 288 and 289 which are securely positioned in the framework housing $F_1$. The framework housing $F_1$ is secured to the framework F by a plurality of bolts $B_1$ and $B_2$ which prevent rotation of the framework housing $F_1$. A threaded nut 290 is positioned on the axle 287 and accurately positions the axial displacement of the second transfer turret BTT relative to the framework F.

Positioned adjacent the lowermost portion of the axle 287 is a gear 291 which is keyed to the axle by member 292. It should be noted, that the gear 291 is constructed to be the same size as the gear 274 and is in meshing engagement therewith. Further, the lowermost end of the axle 287 is coupled to a gear reducer which in turn may be coupled to a common drive element which may supply power to the entire container forming machine.

OPERATION OF THE PREFERRED EMBODIMENT

In the preferred embodiment of the apparatus and method for severing and transferring bottom blanks from a web feed roll to a work station the bottom strip stock BSS is fed between the pinch rollers 201, 202, which may be covered with polyurethane, and tend to pull the bottom strip stock BSS (web) from the web roll. The bottom strip stock BSS is fed around a stationary guide 203 and thereafter passes between an anvil turret BAR and a rotary die BRD where the cutter die CD severs a bottom blank BD from the bottom strip stock. The stationary guide 203 is positioned so that the bottom strip stock BSS engages the peripheral surface of the anvil BAR substantially before a bottom blank BD is severed therefrom. The manifold 266 is positioned so that the conduits 263C are supplied with vacuum prior to the severing of the bottom blanks BD by the rotary die BRD. As the bottom strip stock BSS passes between the anvil BAR and the rotary die BRD and begins to wrap around the rotary die BRD after the bottom blanks BD are severed therefrom, the resiliency of the bottom strip stock BSS actually pops the bottom blanks BD from the bottom strip stock to the anvil bar, in conjunction with the vacuum in the latter.

Thereafter, the scrap material is fed around the stationary guide 204 and between the pinch roller 202, 205 which tend to pull the scrap material from the bottom blank severing apparatus.

The rotary die BRD includes five cutters CD positioned around the circumference thereof. Positioned adjacent the rotary die are two bearings 241, 242 which are engaged by cam followers 231, 232. The cam followers are positioned in a cam follower housing 234 which is engaged by jack screws 230S. The jack screws are threaded in the framework F of the bottom blank cutting apparatus and may be tightened to axially displace the cam follower housing 234 thereby exerting a force through the cam followers 231, 232 to the bearings 241, 242 to ensure proper die penetration of the bottom strip stock. As discussed hereinabove, the rotary die BRD and the cam follower housing 234 are slidably mounted on the framework F. Therefore, tightening or loosening the jack screws 230S actually displaces the cam follower housing 234 and the rotary disc BRD with respect to the fixed anvil BAR.

The bottom blank BD is severed from the bottom strip stock BSS and transferred from the rotary die BRD to the anvil turret BAR. Vacuum is supplied to the anvil turret BAR to aid in the positioning of the bottom strip stock BSS on the anvil BAR to aid in the transfer of the bottom blank BD and to retain the bottom blank on the circumferential surface of the anvil turret BAR through an arc of approximately 180°. An "O" ring OR is positioned adjacent to and concentric with the ends of each conduit 263C to effect a better seal and permit a more accurate transfer.

The bottom blanks BD are tangentially transferred from the anvil turret BAR to the second transfer turret BTT. At the point and time of tangential transfer the vacuum supplied to the conduit 263 is vented to the atmosphere by means of the opening 265A. The venting of the conduits 263C permits the transfer of the bottom blanks BD from the anvil to the second transfer turret where the bottom blanks are retained on substantially flat peripheral areas 280A by means of a vacuum supplied through conduits 280C. The bottom blanks BD are held on the circumferential surface of the second transfer turret BTT through an arc of approximately 180° by means of the vacuum supplied through the vacuum line 283, the manifold or distributor 282 and the conduits 280C. The vacuum supplied to the conduits 280C is terminated just prior to the tangential transfer of the bottom blanks BD from the second transfer turret BTT to the final forming mandrels FM. At the point and time of transfer of the bottom blank BD to the final forming mandrels FM the conduits 280C are vented to atmosphere to ensure the tangential transfer of the bottom blanks BD to the final forming mandrels FM by means of the vacuum present in the latter which thereafter retains the bottom blanks on the said mandrels.

Rotational power is supplied to the bottom blank severing apparatus through a gear reducer which is coupled to the axle 287. The gear 291 is keyed to the axle 287 and rotates therewith. Further, the gear 274 is keyed to the axle 260 and is in meshing engagement with the gear 291. Since the gear 274 is equal in size to the gear 291, the rotational speed of the anvil BAR is equal to the rotational speed of the second transfer turret BTT. However, since the anvil BAR is approximately one-half the size of the second transfer turret BTT, the peripheral speed of anvil turret BAR is less than the peripheral speed of the second transfer turret BTT. This permits the narrow spacing requirements between the bottom blanks BD occasioned by the low scrap configuration of the rotary cutter BRD to be amplified to a compatible spacing with the bottom blank holding stations on the circumferential surface of the second transfer turrett BTT. This ultimate spacing between the blanks BD and the peripheral velocity thereof on the circumferential surface of the second transfer turret BTT is selected to be completely compatible with the spacing between and transitory velocity of the final forming mandrels FM. Thus, the cut blanks BD are fed continuously and accurately from a closely spaced, low scrap condition at a first velocity to an increased spacing and second velocity compatible with the spacing and velocity of the transitory finishing mandrels.

The gear 270 is keyed to the axle 260 and is in meshing engagement with the gear 252. The size of the gear 252 and 270 are designed so that the rotational speed of the rotary die BRD is approximately twice the rotational speed of the anvil turret BAR and the second transfer turret BTT. As previously discussed, the rotary die BRD includes five cutter dies CD positioned around the circumference thereof while the anvil turret BAR has ten blank holding positions about its circumference. The diameter of the rotary die is approximately one-half the diameter of the anvil and approximately one-fourth the diameter of the second transfer turret, respectively. Therefore, since the rotational speed of the anvil BAR the cutter dies CD align with the greater number of bottom blank positions spaced around the circumference of the anvil turret BAR and accurately and tangentially transfer a bottom blank from the rotary die to the anvil.

In summary, the bottom blank severing apparatus and method disclosed in the present invention continuously supplies a bottom strip stock to a rotary cutting die and effects a tangential transfer to a rotary anvil. Thereafter, the bottom blanks are tangentially transferred from the anvil to a second transfer turret. Subsequently, the bottom blanks are continuously tangentially transferred from the second transfer turret to a final forming mandrel FM which is supplied with vacuum to retain the bottom blanks thereon. The peripheral speed of the second transfer turret BTT and spacing of the holding positions thereon are correllated with the transitory speed and spacing, respectively, of the final forming mandrels FM which are positioned on a chain and are continuously moved past the transfer point for bottom blanks BD carried on the transfer turret BTT. The mandrels subsequently and continuously translate through a cylindrical blank transfer point, a bottom banger assembly, a shrink oven, and a bottom iron.

Thereafter the finished containers on the mandrels FM are removed from the mandrels and may be processed through a top curl assembly and thence out though a discharge chute to complete the container making process.

THE MANDREL ASSEMBLY

FIGS. 19, 19A, 19B and 20 illustrate a more detailed preferred embodiment of the mandrel assembly of the present invention. This mandrel assembly is adapted to receive the cylindrical blanks delivered to the mandrel from the cylindrical blank forming assembly of FIGS. 1 and 3. The cylindrical blank is later securely positioned upon the mandrel assembly by a cylindrical blank tamper assembly to be later described in connection with FIGS. 21 and 22.

As illustrated in FIGS. 19, 19A, 19B and FIG. 20, a dual tapered frustro-conical mandrel DTM is rotatably fixed to a mandrel support shaft 302. The mandrel support shaft 302 is rigidly mounted on a mandrel carrier 304. The mandrel carrier 304 is transferred between work stations by a pair of endless link chains 306, 308. A pair of stablilzer bars 307A, 307B are mounted on each mandrel DTM at the respective mounting points of the pair of endless link chains 306, 308. These stabilizer bars 307A, 307B ride on the rollers of the endless link chains 306, 308 to stabilize the movement of the respective mandrels DTM. The mandrel DTM has an axial direction extending along the axis of the mandrel support shaft 302. Some of the operations performed on the blanks carried by the mandrel DTM require a force to be applied to the mandrel in this axial direction. For example, a cylindrical tamper assembly (to be hereinafter described) applies an axial force on the mandrel DTM to securely push the cylindrical blank onto the mandrel. The mandrel DTM is ridigly held against this force through the use of a force restraining roller 310 rotatably mounted in a force restraining roller bracket 312. This force restraining roller 310 is generally restrained by a metal guide track 314 shown by phantom lines. A metal track such as that exemplified by the metal guide track 314 is placed in those areas of travel of the mandrel assembly where an axial force is to be applied to the mandrel.

To further stabilize the mandrel during the transfer of a bottom blank BD from the bottom blank forming station BBF and the transfer of a cylindrical blank 10C from the cylindrical blank forming station CBF a stabilizer blade 309 is provided. During these critical transfers, the stabilizer blade 309 rides in guides (not shown) to further support and stabilize the mandrels DTM.

The dual tapered frustro-conical mandrel DTM is attached to a mandrel collar 318. This mandrel collar 318 is supported by a mandrel support bearing 316 which allows the mandrel DTM to freely rotate on the mandrel support shaft 302. The mandrel collar includes a mandrel rotation surface 320 which rotates the mandrel DTM when the mandrel DTM is moved along a mandrel rotation track 322 shown in phantom lines. During certain steps of the cup making process it is desirable to rotate the mandrel in order to, for example, achieve even heating across the mandrel surface. When this rotation of the mandrel is desired, a rotation track such as the exemplary mandrel rotation track 322 is placed in a corresponding position along the mandrel assembly path in order to rotate the mandrel. This mandrel rotation track 322 is made of any desired material, in the preferred embodiment heat resistant silicone rubber is used to provide the mandrel with sufficient traction for rotation. The mandrel collar may be made by any appropriate material, aluminum is used in the preferred embodiment.

One important feature of the dual tapered frustro-conical mandrel DTM of the present invention is the mandrel's dual taper. In the preferred embodiment, an upper two-thirds 324 of the mandrel DTM is formed with an approximate taper of 7° while a lower one-third or smaller end 326 of the mandrel DTM is formed with an approximate taper of 9° 30''. This dual taper is an advantageous feature of the mandrel of the present invention. The dual taper also prevents the stacked cups from sticking together. Thus the dual tapered cups formed using the mandrel DTM of the present invention may be more easily used in applications where a smooth separation of stacked cups is necessary, such as in a cup dispenser of a vending machine.

Another important feature of the dual tapered frustro-conical mandrel DTM of the present invention is the ability of this mandrel to form scallop details along the lower edge of a cup's sidewall. FIG. 19A shows a detail of the end surface of the frustro-conical mandrel which shows a set of ten equally spaced scalloped indentations 328 formed along the lower edge of the lower one-third 326 of the mandrel DTM. During the shrinkage of the cylindrical blank into a cup, a vacuum is applied to the equally spaced scalloped indentations 328 through a set of scallop vacuum holes 330 to apply vacuum to the scalloped indentations 328 during the shrinkage process in a manner which will be explained below.

A cylindrical blank is positively attached to the mandrel DTM of the preferred embodiment through the use of a cylindrical blank securing clamp 332. This securing clamp includes a securing clamp cover 334, a plurality of arcuate shoe segments 336 and a garter spring 338. Upon the insertion of a cylindrical blank the garter spring 338 allows the flanged arcuate shoe segments 336 to expand and thereby resiliently secure the edge of the cylindrical blank. The cylindrical blank tamper assembly discussed below loads the cylindrical blanks onto the frustro-conical mandrel DTM. This operation seats the cylindrical blank fully into the spring loaded flanged arcuate shoe segments 336. These segments 336 retain the cylindrical blank on the mandrel DTM during the shrinking process. The shape and location of the flanged arcuate shoe segments in combination with the positioning of the radiant heaters as later discussed cause the post expansion of the top portion of the cup to be uniform in thickness. This improves the ability of the curler assembly to form a good top curl as will be later discussed.

The mandrel assembly of the preferred embodiment includes both internal vacuum and pressure lines. The mandrel carrier 304 has provided therein a vacuum fitting 355 for connection to a vacuum distributor VD of FIGS. 8A, 8B by the hose VH. Vacuum is applied to the dual tapered frustro-conical mandrel DTM through the vacuum distributor VD of FIGS. 8A, 8B, and internal passages within the mandrel assembly. A plurality of primary vacuum passages 356, 358, 360 are provided in the mandrel carrier 304 and mandrel support shaft 302 for supplying main vacuum from the vacuum fitting 355. A plurality of passage plugs 340, 341, 355 seal the primary vacuum passages 356, 358, 360 which provide vacuum to a plurality of cup bottom passages 348 located on a mandrel bottom vacuum 350. These cup bottom vacuum passages 348 retain the bottom blank BD on the flush planar surface of the mandrel bottom 350.

A secondary vacuum passage 346 supplies vacuum to the scallop vacuum holes 330 provided to pass vacuum to the equally spaced scalloped indentations formed on the frustro-conical mandrel DTM. A mandrel vacuum value MMV shown in FIGS. 19 and 19B, supplies vacuum to the secondary vacuum passage 346 and thereby to the scallop vacuum holes 330 when desired. The details of this vacuum valve are of any suitable construction known in the art and this will not be further described. The vacuum valve MMV is actuated through the use of a vacuum valve lever 342 and a vacuum valve roller 344. When the vacuum valve roller 344 is depressed by a cam (not shown), vacuum is applied to the scallop vacuum holes 330 and thus to the equally spaced scalloped indentations 328 formed on the frustro-conical mandrel DTM. The cam used to operate the mandrel vacuum valve, MMV is positioned to actuate this valve only after the cylindrical blank 10C is shrunk to form a finished container (not shown here). If the scalloped indentations were to be formed before the cylindrical blank 10C was shrunk, the blank would wrinkle preventing proper shrinkage of the blank. Thus, secondary vacuum is applied to the equally spaced scalloped indentations 328 after the shrinkage process is substantially completed and in the preferred embodiment, just before the bottom sealing operation is performed.

A compressed air system is also provided in the mandrel assembly of this preferred embodiment. Compressed air is provided to the vacuum fitting 355 from the vacuum distributor VD of FIGS. 8A, 8B. This compressed air is passed along the primary vacuum passages 356, 358, 360 to the cup bottom vacuum passages 348. To remove a cup from the mandrel DTM, compressed air is applied to the mandrel through the vacuum fitting 355 and the primary vacuum passages 356, 358 and 360. This compressed air is passed through the cup bottom vacuum passages 348 in the mandrel bottom 350 to eject the cup from the mandrel DTM.

THE CYLINDRICAL TAMPER APPARATUS AND METHOD

Figure 19:
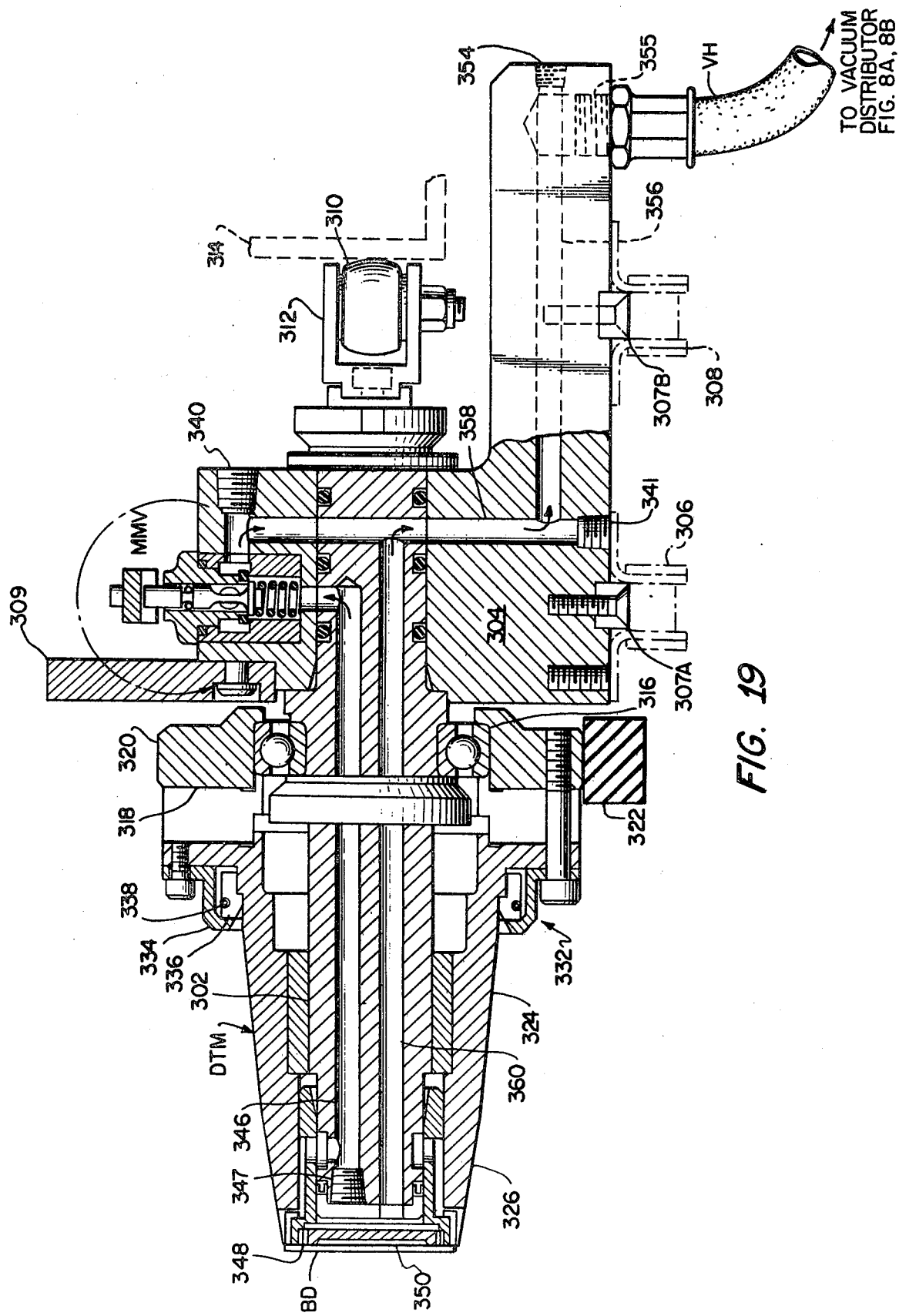
FIG. 19 illustrates a side cross sectional view of the mandrel assembly of the present invention.
Figure 19A:
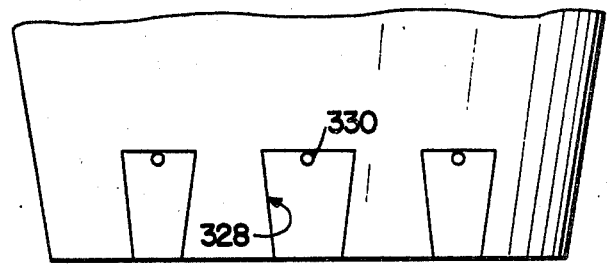
FIG. 19A illustrates the scallop detail formed in the mandrel of FIG. 19.
Figure 21B:
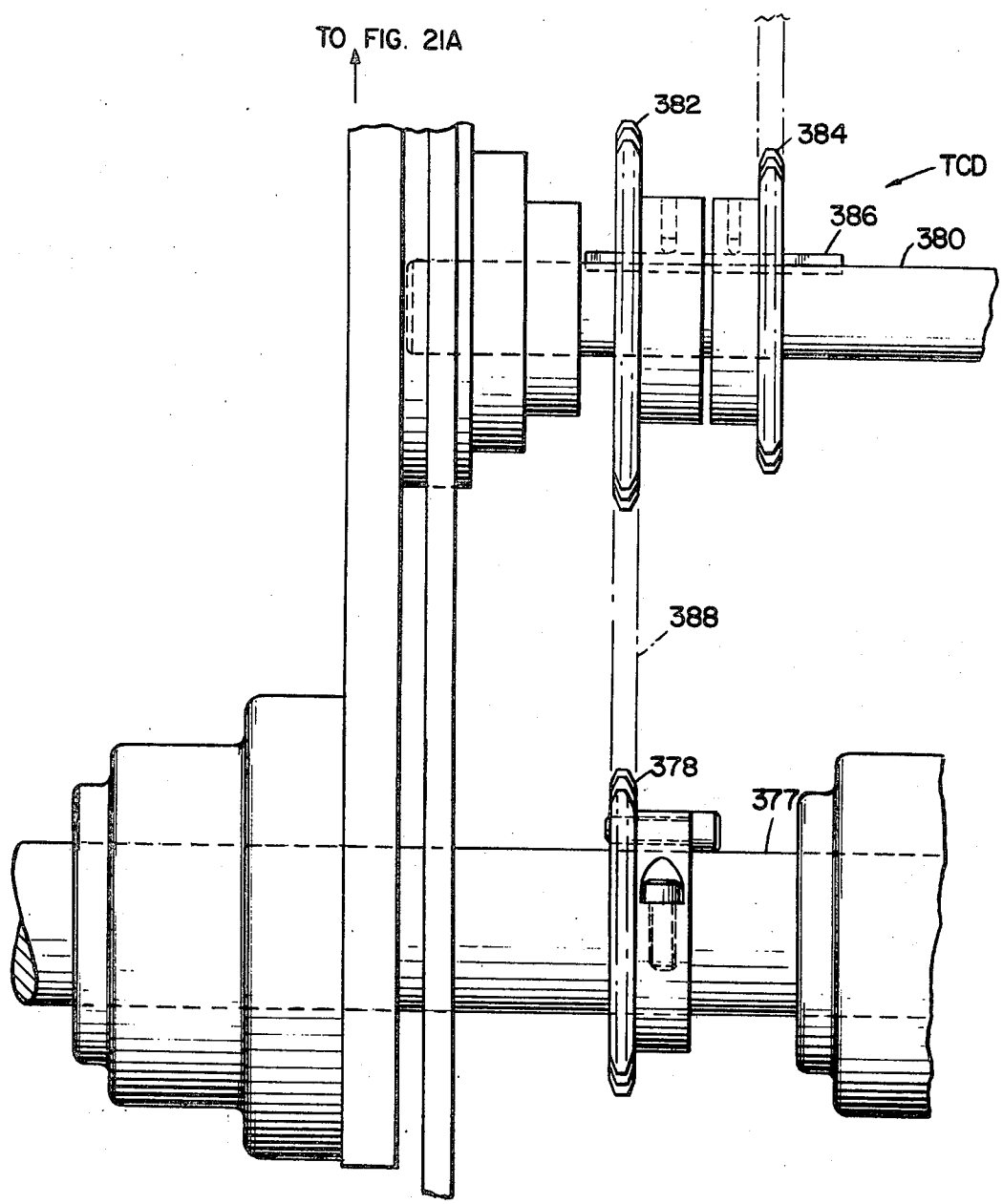
Figure 22:
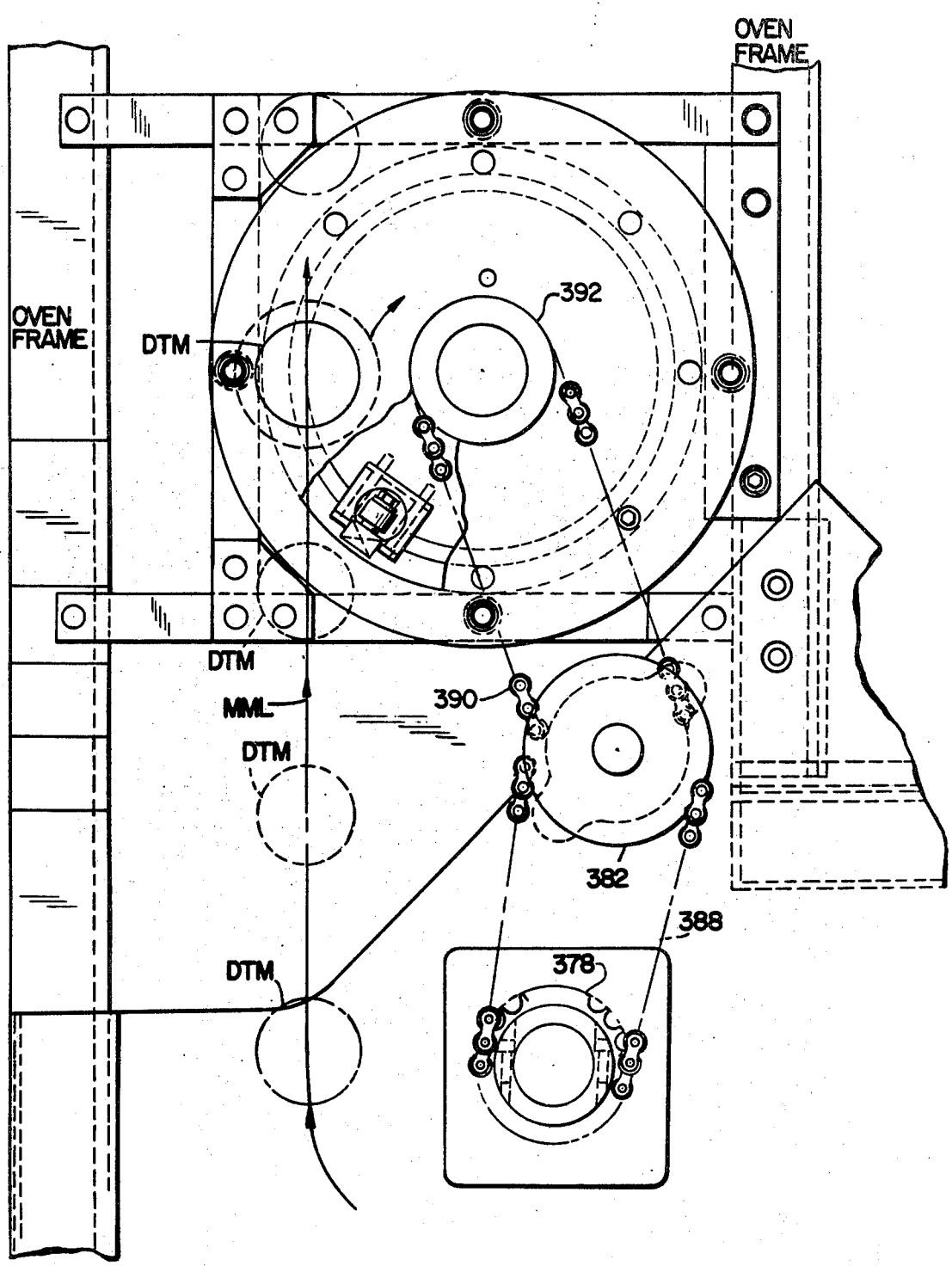
FIG. 22 illustrates a top plan view of the cylindrical tamper apparatus illustrated in FIG. 21.

FIGS. 21A, 21B and 22 illustrate a more detailed preferred embodiment of a cylindrical tamper apparatus for securely positioning cylindrical blanks on the mandrel assembly of FIG. 19.

Prior to its arrival at the location of the cylindrical tamper apparatus, the mandrel DTM receives a cylindrical blank 10C from the cylinder forming apparatus of FIG. 1 of the present application. While the pressure belt assembly PB translates the cylindrical blank 10C forward onto the mandrel DTM, the cylindrical blank 10C is not usually securely mounted by this operation. In order for the cylindrical blank 10C to be securely fastened by the cylindrical blank securing clamp 332 of the frustro-conical mandrel DTM, the cylindrical blank must be securely seated into the spring loaded arcuate shoe segments 336 of the frustro-conical mandrel DTM. The cylindrical blank must be securely seated in order to keep the cylindrical blank from moving off the mandrel DTM during the shrinking cycle.

The cylindrical tamper apparatus secures the cylindrical blank 10C onto the frustro-conical mandrel DTM by pushing the cylindrical blank 10C with a tamper pad 370A. The tamper pad 370A is a thrust against the cylindrical blank 10C by a tamper actuation assembly 372A. A plurality of tamper actuation assemblies 327A-F with their associated tamper pads 370A-F are provided on a revolving tamper turret 374. For the said of clarity, only one tamper pad 370A and its associated tamper actuation assembly 372A will be described, although other tamper pads 370B-F and their associated tamper actuation assemblies 372B-F are formed in an identical manner. In a preferred embodiment of the present invention, five tamper pads and their associated actuation assemblies are used. While any number of tamper pads may be used, the circumferential distance between tamper pads should be approximately equal to the distance between adjacent frustro-conical mandrels DTM as shown in FIG. 22. These adjacent frustro-conical mandrels DTM are driven by the set of endless link chains 306, 308 which move the mandrels along a mandrel movement line MML.

A revolving tamper turret 374 is securely attached to a tamper turret shaft 375 by a tamper turret securing key 376. The tamper turret shaft 375 is rotatably driven by a tamper chain drive generally indicated as TCD. The tamper chain drive drives the tamper assembly at a speed which synchronizes the circumferential speed of the plurality of tamper pads 370A-F with the speed with which the frustro-conical mandrels DTM move along the mandrel movement line MML. In a preferred embodiment, the frustro-conical mandrels DTM move along the mandrel movement line MML at a speed of approximately 320 ft/min. Thus, the center of each of the tamper pads 370A-F also travels at a speed of approximately 320 ft/min.

The tamper chain drive TCD derives its power from a lower left hand oven shaft 377. A tamper oven sprocket 378 is fastened to the lower left hand oven shaft 377 for positive rotation therewith. A tamper idler shaft 380 is provided with a first intermediate drive sprocket 382 and a second intermediate drive sprocket 384. The first and second intermediate drive sprockets 382, 384 are positively fastened onto the tamper idler shaft 380 through the use of an idler shaft key 386. This idler shaft key 386 insures that there is no slippage between the first and second intermediate drive sprockets 382, 384. A drive reduction chain 388 transfers power from the tamper oven sprocket 378 positively connected to the lower left hand oven shaft 377 to the first intermediate drive sprocket 382 on the tamper idler shaft 380. The relative sizes of the tamper oven sprocket 387 and the first intermediate drive sprocket 382 are determined by the desired final speed of the revolving tamper turret 374 as discussed above. The idler shaft key 386 and the tamper idler shaft 380 serve to transfer the power supplied by drive reduction chain 388 to the second intermediate drive sprocket 384. The second intermediate drive sprocket 384 and the final drive chain 390 supply power to a final drive sprocket 392 to rotate the revolving tamper turret 374 in synchronism with the passing of the frustro-conical mandrels DTM along the mandrel movement line MML. Thus, the cylindrical tamper apparatus of this preferred embodiment is chain driven in synchronism with the movement of the frustro-conical mandrels DTM along the mandrel movement line MML.

The tamper actuation assembly 372A includes a tamper actuator sleeve 394 securely fastened to the revolving tamper turret 374. A tamper push rod 396 is slidably mounted within a cylindrical sleeve bore 398 formed in the tamper actuator sleeve 394. The axis of the tamper push rod 396 is aligned so as to be parallel to the axis of the dual tapered frustro-conical mandrel DTM and its mandrel support shaft 302. The tamper pad 370A is mounted onto the end of the tamper push rod 396 nearest the mandrel movement line MML.

A cup tamper spring 400 maintains the tamper pad 370A in its retracted position as shown in FIG. 21A. A cup tamper spring is concentrically positioned around the tamper push rod 396 and is supported by an actuator sleeve spring seat 406 formed on a tamper actuated sleeve 394. A biased force is applied to the tamper push rod 396 through a tamper split collar 402 and a tamper spring retainer ring 404. The tamper push rod 396 remains in its retracted position as biased by the cup tamper spring 400 unless a force is applied to the end of the tamper push rod 396 opposite the tamper pad 370A through a tamper cam roller 408 rotatably mounted on a tamper cam roller shaft 410. The tamper cam roller 408 is affixed to an enlarged and flattened portion 412 of the tamper push rod 396 through which the tamper cam roller shaft 410 is fastened.

As the revolving tamper turret 374 rotates, the tamper actuator assembly 372 also rotates. A stationary cam ring 414 is provided to create an axial movement of the tamper pad 370. This stationary cam ring 414 is mounted on a stationary frame 416 and maintains the tamper actuation assembly 372A and its associated tamper 370A in a retracted state during approximately 270° of each tamper assembly's rotation. As the tamper assembly 372A approaches the mandrel movement line MML, the stationary cam ring 414 depresses the tamper push rod 396 by placing a force on the tamper cam roller 408I. This movement of the tamper push rod 396 displaces the tamper pad 370A in a gradual manner. As the circumferential direction of travel of each tamper assembly 372A-F and its associated tamper pad 370A-F approaches the direction of travel of the mandrels DTM along the mandrel movement line MML, the tamper pad 370 becomes fully displaced by the stationary cam ring 414. In a preferred embodiment, the mandrel movement line is a tangent to a circle described by the rotation of the center of each tamper pad 370 around the tamper turret shaft 375. At the point of tangency, each tamper pad 370A-F is fully depressed by its associated tamper actuation assembly 372A-F and the stationary cam ring 414. The stationary cam ring 414 begins its depression of each tamper pad 370A-F when the tamper pad 370 is at an angle of approximately 45° before the point of tangency. The stationary cam ring 414 continues to depress the tamper pad 370 until it is fully depressed at the point of tangency. The stationary cam ring 414 next allows the tamper pad 370 to retract during the next approximate 45° of the rotation of revolving tamper turret 374 is synchronized to the speed of the mandrels DTM along the mandrel movement line MML. The tamper pads 370 are positioned in such a way that the tamper pad 370 is fully depressed at the point of tangency at the moment when one of the mandrels DTM is also at the point of tangency.

As shown in FIG. 21A, the cylindrical tamper apparatus of the present invention seats the cylindrical blank onto the mandrel DTM.

In operation, the lower left hand oven shaft 377 supplies power to the tamper chain drive TCD which has a ratio which allows the synchronization of the speed of the tamper pads 370A-F with the movement of the mandrels DTM along mandrel movement line MML. As the revolving tamper turret 374 rotates on the tamper turret shaft 375, each tamper actuation assembly 372A-F controls the displacement of its associated tamper pad 370A-F as directed by the stationary cam ring 414. Since the movement of each tamper actuation assembly 372A-F is synchronized to the movement of the frustro-conical mandrels DTM, at the point of tangency, between the mandrel movement line MML and the circle described by the revolution of the center of each tamper pad 370A-F these assemblies are coaxially aligned. At this point of tangency, the stationary cam ring causes the tamper pad 370A to be depressed by the tamper actuation assembly 372A. This places an axial force on a cylindrical blank already placed upon the frustro-conical mandrel DTM. This axial force securely places the cylindrical blank onto the frustro-conical mandrel by forcing the edge of the cylindrical blank already in contact with the frustro-conical mandrel DTM into the cylindrical blank securing clamp 332 as already described. This securely fastens the cylindrical blank to the frustro-conical mandrel DTM and allows a uniform post expansion of approximately the top ⅜ inch of the cup.

The Curling Apparatus and Method

FIGS. 23, 24A, 24B and 25 illustrate a more preferred embodiment of the curler apparatus of the present invention. This curler apparatus is a modification of the top curl forming station as illustrated in FIGS. 9 and 10. Because of the similarity between this curling apparatus and the top curl forming station of FIGS. 9 and 10, like elements will be described using like identification descriptors.

Figure 23:
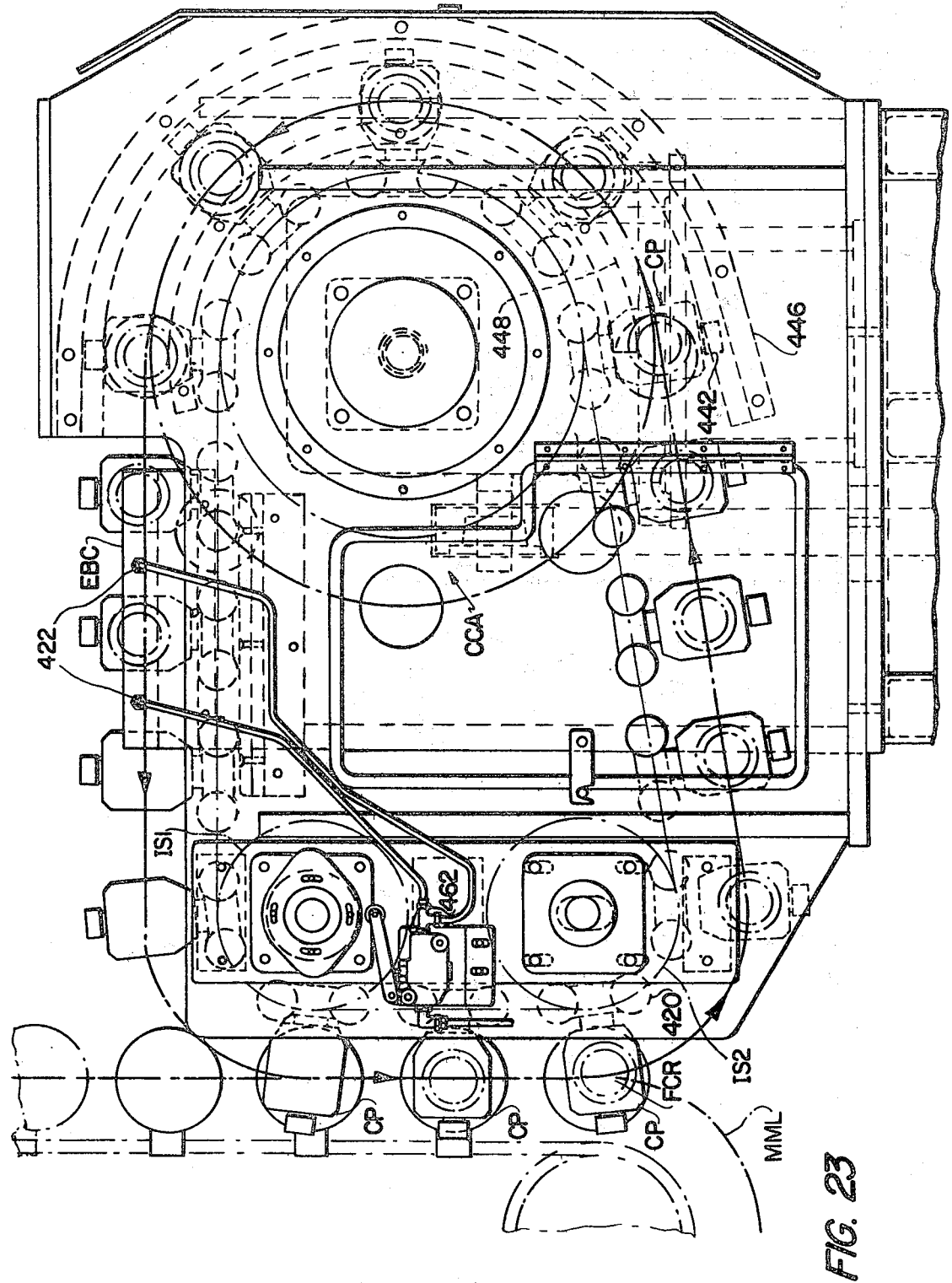
FIG. 23 illustrates a front view of a curler frame and drive assembly.
Figure 24B:
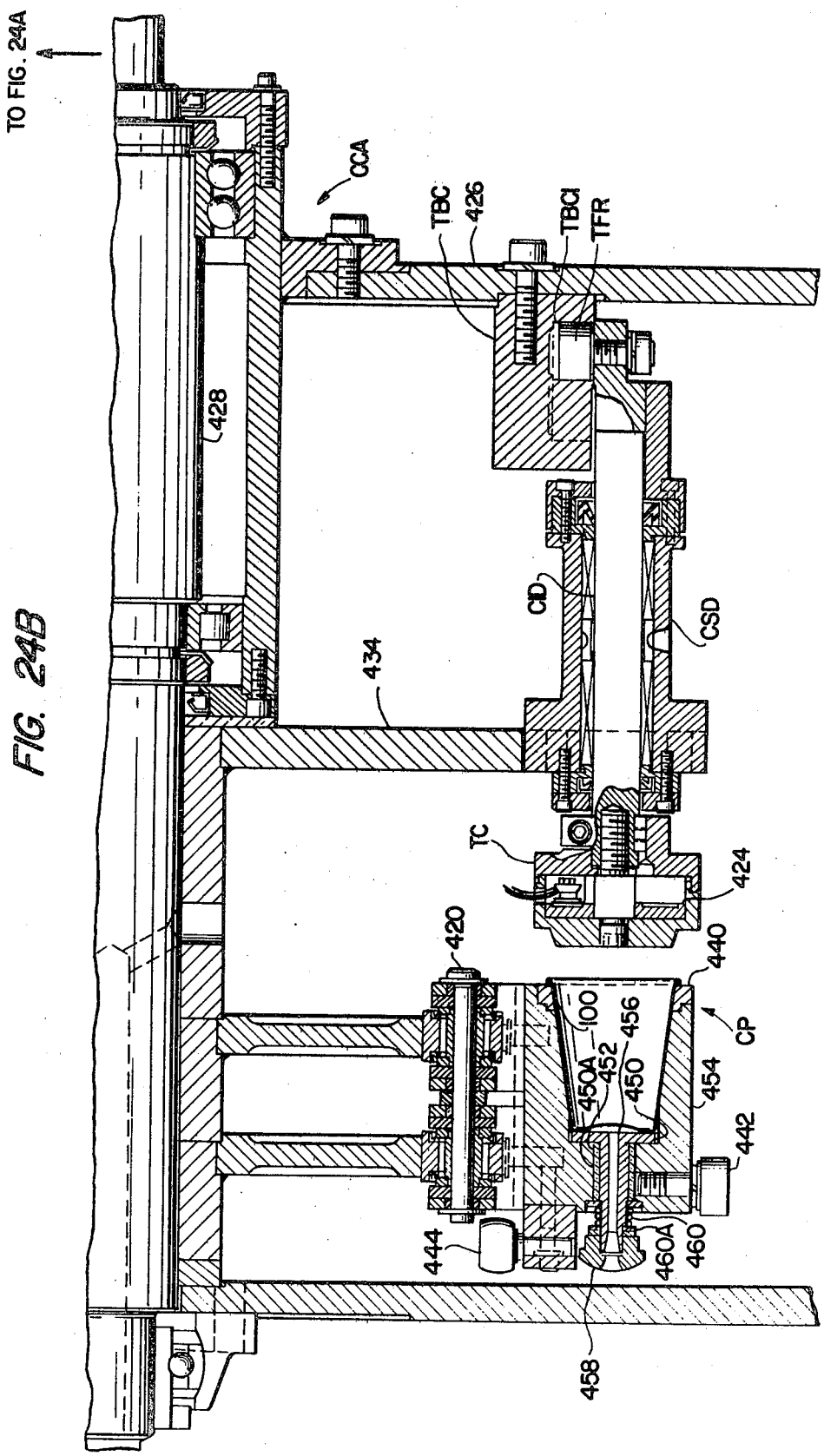

In the preferred embodiment of FIG. 23, the curling apparatus is physically removed from the chain drive 46 carrying the mandrels FM as shown in FIGS. 1, 3, 7 and 9. The containers 100 are transferred from the mandrels FM or DTM to a set of curling pots CP traveling along a curling pot drive chain 420. This curling pot drive chain 420 transmits the curling pots CP from a position from which these curling pots can accept the finished containers 100 to a curling apparatus CCA. The curling pot drive chain 420 moves in synchronism with the movement of the mandrels FM or DTM on the chain 46 allowing each curling pot CP to accept a finished container 100 ejected from the mandrel FM or DTM. The curling pots CP bearing containers 100 progress toward the curling apparatus CCA. As each container 100 advances toward the curling apparatus CCA, the upper edge of each container 100 is lubricated by a curling oil applicator apparatus as to be discussed later in relation to FIGS. 26 and 27 and 28. The curling apparatus CCA forms the top curl on the containers 100 and these containers are ejected by timed air jets provided to the curling pots through a pair of dual cup blowoff lines 422. Alternatively, only one single blow off line of sufficient capacity need be used.

As illustrated in FIGS. 24A and B, a modified top curl forming turret is shown including a centrally located barrel cam TBC having a cam track TBC1 in which a plurality of follower rollers TFR ride to constrain vertical movement to respective ones of a plurality of vertical curling iron drive slides CID which are slidably mounted in a plurality of curling iron drive slide sleeves CSD. A plurality of driven curl forming irons or heated tools TC are each downwardly mounted on respective curling iron drive slides CID. In the preferred embodiment, each driven curl forming iron TC is provided with a respective driven curling iron heater 424.

The barrel cam TBC is fixably mounted on a curling apparatus frame 426. A rotating central shaft 428 is coaxially mounted on a first and second bearings 430, 432. A curling drive slide turret 434 is coaxially and fixably mounted on the rotating central shaft 428. The curling iron drive slide sleeves CSD are fixably mounted at equispaced distances around the periphery of the curling drive slide turret 434. Thus, in this embodiment of the present invention, the curling iron drive slides CID rotate around the barrel cam TBC which is stationary.

A first and second curling pot drive chain sprockets 436, 438 are coaxially and fixably mounted on the rotating central shaft 428. These drive chain sprockets 436, 438 serve to guide the curling pot drive chain 420 around the periphery of the curling apparatus CCA and rigidly locate the curling pots CP in their respective desired positions to allow precise interaction between a plurality of fixed curling anvils or die 440, each integrally formed on a part of their respective curling pot CP, and their associated driven curl forming irons TC.

Each of the curling pots CP located on the curling pot drive chain 420 are provided with first and second curling pot positioning rollers 442, 444. As each curling pot approaches the curling apparatus CCA, the first curling pot positioning roller 442 enters an outside curling pot restraining track 446 which is channel shaped in cross section and is positioned along the arc described by the travel of the curling pots CP about the curling apparatus CCA. The second curling pot positioning roller 444 is likewise guided along an inside curling pot restraining track 448 upon which the second curling pot positioning roller 444 tracks as each curling pot CP is rotated around the curling apparatus CCA.

Each curling pot CP of the present invention includes a cup ejector plunger 450 which is slidably mounted in an axial sleeve 452 provided in a curling pot body 454. A cup ejector plunger shaft 450A of each curling pot CP is axially aligned with its associated curling iron drive slide CID. An axial air jet passage 456 is coaxially provided in the cup ejector plunger shaft 450A. A cup ejector button 458 is provided at an end of the cup ejector plunger shaft 450A opposite the cup ejector plunger 450. This cup ejector button has a hole provided therein which forms a continuation of the axial air jet passage 456. The cup ejector plunger 450 is spring biased by a cup ejector bias spring 460. This cup ejector bias spring 460 and its associated spring seat 460A bias the cup ejector plunger 450 in a retracted position.

A ramplike ejector button cam EBC serves to depress the cup ejector button 458 and thus depress the cup ejector plunger 450 to loosen the finished container 100 disposed within the curling pot body 454. As the curling pots CP pass the dual cup blowoff lines 422, a blast of air is provided by these lines through the axial air jet passage 456 within the cup ejector plunger 450 to eject the finished container 100 using a blast of air.

This blast of air is controlled by a cup eject air valve 462. The emptied curling pots CP then continue around a large radius cam surface RCS which directs the curling pots towards the mandrel movement line MML and then directs the curling pots along this mandrel movement line to allow acceptance of the finished containers 100 from the forming mandrels FM or DTM. A pair of idler sprockets IS1 and IS2 then direct the curling pot drive chain 420 and the curling pots CP attached thereto back towards the curling apparatus CCA. A large radius cam surface RCS may be used instead of the pair of idler sprockets IS1, IS2 in order to reduce excessive vibrations which may result from the use of the idler sprockets during the high speed manufacturing process. An embodiment of the large radius cam surface is shown in FIG. 25.

Figure 25:
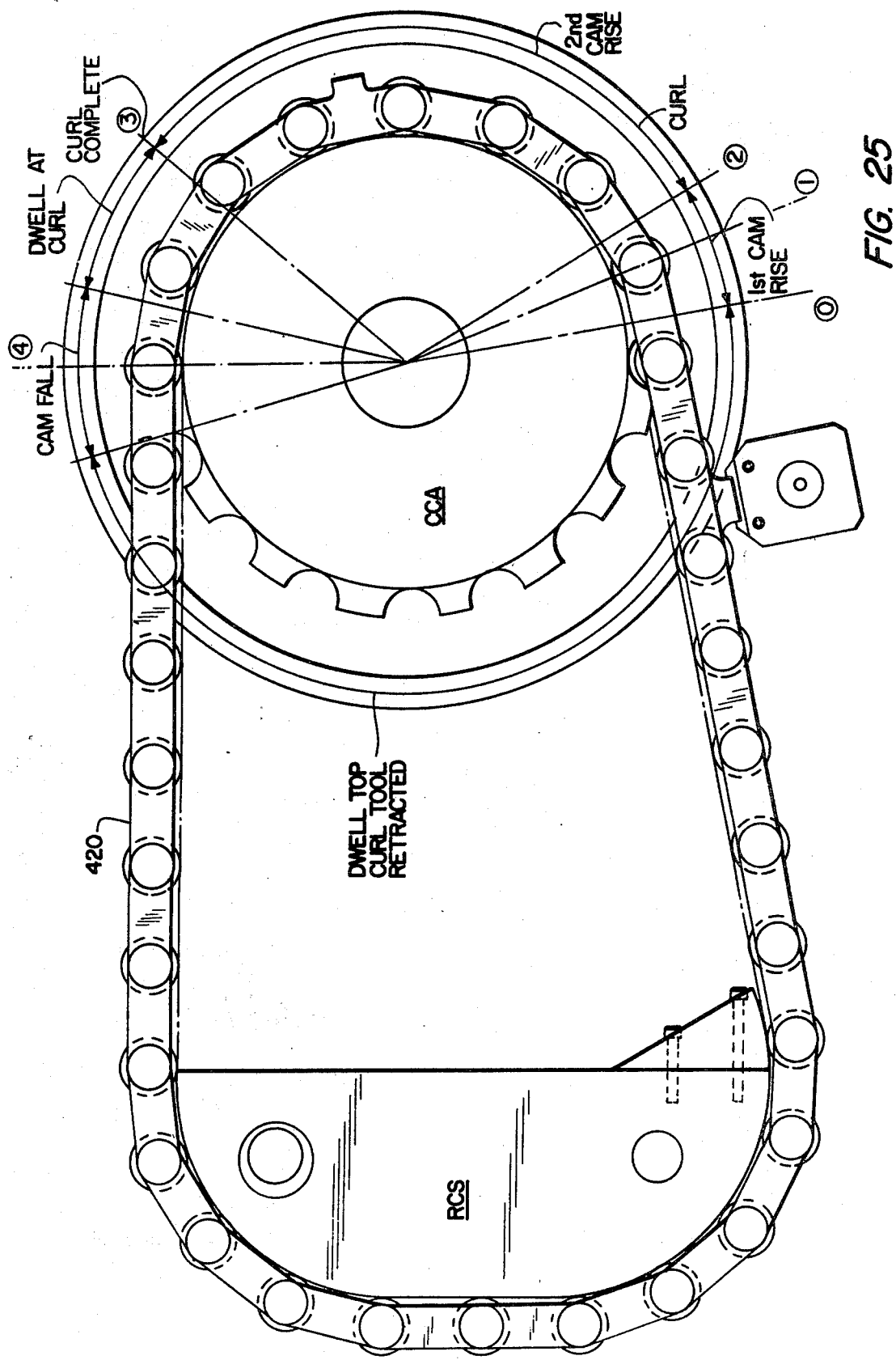
FIG. 25 is a diagrammatic view of the curler drive assembly including curler cam timing information.
Figure 25A:
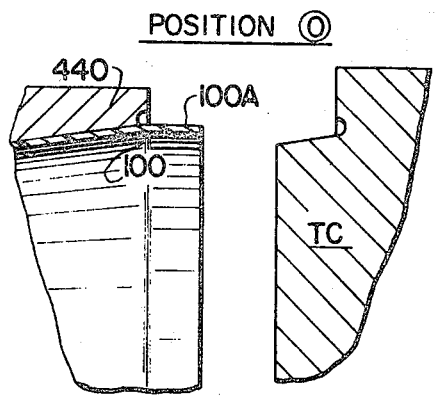
FIGS. 25A–E illustrate diagrammatic details of the relationship between a driven curl forming iron, TC a fixed curling anvil 440 and a container formed according to the present invention.
Figure 25B:
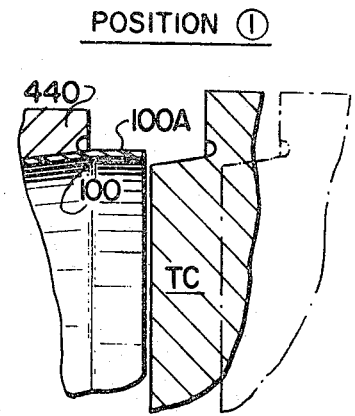
Figure 25C:
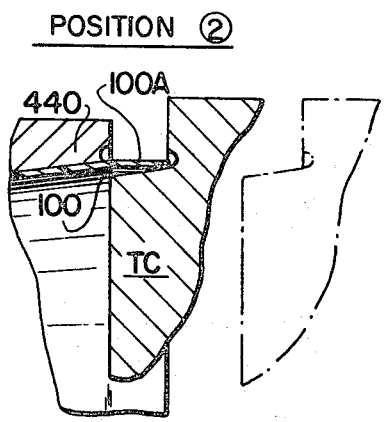
Figure 25D:
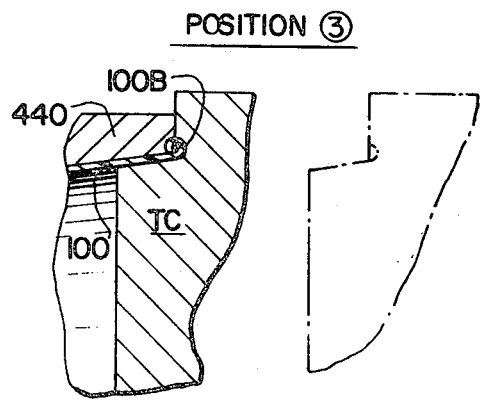
Figure 25E:
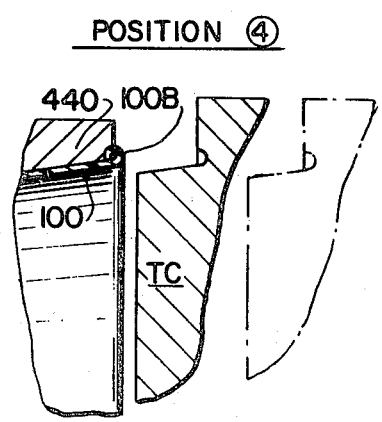

FIG. 25 is a diagrammatic view of the curling apparatus CCA and also shows the large radius cam surface RCS and its redirection of the curling pot drive chain 420. FIGS. 25A-D each show a diagrammatic detail of the fixed curling anvil 440, the driven curl forming iron TC, and the finished container 100. Approximately ⅜" of the top rim of the finished container 100 is a finished container edge portion 100A which has been securely held by the cylindrical blank securing clamp 332 of the frustro-conical mandrel DTM of the present invention. Because of the construction of the mandrel assembly, a uniform post expansion of this top edge portion 100A of finished container 100 aids in the formation of the top curl 100B as shown in FIGS. 25C-D.

In operation, as the mandrels FM or DTM pass the curling apparatus station, the curling pots CP are synchronized therewith. The axes of the mandrels DTM and the curling pots CP are desirably colinear along this portion of the mandrel movement line MML. While the axes of the mandrel DTM and the curling pots CP are colinear, compressed air is provided to the compressed air filling 354 of the dual tapered frustro-conical mandrel DTM through the ejection pressure port EPP as shown in FIG. 8A. This compressed air is passed through the cup bottom vacuum passages 348 in the mandrel bottom 350 to eject the cup from the mandrel DTM. This cup is ejected into a female cup receiving cavity FCR of the curling pot CP. As the curling pot drive chain 420 passes the curling pot CP along a lower chain run between the large radius cam surface RCS and the curling apparatus CCA, the finished container 100 is securely pressed into the cup receiving cavity of the curling pot CP and a top edge portion 100A of the finished container 100 has a thin coating of the mineral oil applied thereto by the curling oil applicator apparatus as discussed in FIGS. 26 and 27.

As the curling pot drive chain 420 moves the curling pot CP onto the curling apparatus CCA, the first and second curling pot positioning rollers 442, 444 are guided by the inside and outside curling pot restraining tracks 446, 448 to securely mount the curling pot on the first and second curling pot drive chain sprockets 436, 438 to allow the curling operation to be performed. At this time, the cylindrical blank 100 is securely placed in the cup receiving cavity FCR of the curling pot CP. As the curling pot rotates around the curling apparatus CCP, the driven curl forming irons TC with their associated curling iron drive slides CID and curling iron drive slide sleeves CSD rotate in synchronism therewith on the curling drive slide turret 434. As the curling iron drive slides CID rotate, the follower rollers TFR ride in the stationary barrel cam TBC controls the axial displacement of each driven curl forming iron TC as shown in FIGS. 25A-25D.

FIG. 25 shows the operation of the curling apparatus CCA in diagrammatic form. The curling pot CP becomes securely mounted on the curling apparatus CCA at position zero as shown in FIG. 25. Position zero is approximately at the point where the lower chain run of the curling pot drive chain 420 becomes approximately tangent to a circle described by the first and second curling pot drive sprockets 436, 438. As shown in FIG. 25A, the driven curl forming iron TC is retracted at position 0 of FIG. 25. By the time the curling pot has reached position 1, the driven curl forming iron TC has been advanced by the barrel cam TBC and the curling iron drive slide CID to the position shown in FIG. 25B. Approximately 10° later, at position 2 of FIG. 25, the driven curl forming iron TC initially engages the upper edge of the top edge portion 100A of the finished container 100. At this point curling begins as shown in FIG. 25C. This driven curl forming iron TC continues to advance towards the fixed curling anvil until the curl is completed at position 3 as shown in FIG. 25D. Thus, the curling operation continues for approximately 108° of the rotation of the curling apparatus CCA and the barrel cam TBC gradually advances the driven curl forming iron TC towards the fixed curling anvil 440. The driven curl forming iron remains in position 3 for a rotational duration of approximately 27°. This curl dwell ensures that the curl is completely and properly made. The driven curl forming iron TC is then retracted by the curling iron drive slide CID and the barrel cam TBC. At position 4, where the upper chain run is approximately tangent to the circle described by the first and second curling pot drive sprockets 436, 438, the driven curl forming iron is sufficiently retracted to allow chain clearance for the exit of the finished cup in its associated curling pot CP. The drive curl forming iron TC continues to retract to its fully retracted position where it remains until it again reaches position 0.

As the curling pot drive chain 420 guides the curling pot CP away from the curling apparatus CCA, the ejector button cam EBC applies a force to the cup ejector button 458 to axially depress the cup ejector plunger 450. This cup ejector cam EBC serves to break the seal between the finished container 100 and the fixed curling anvil 440 created by the curling process. The cups are then removed from the curling pots by the application of a jet of air applied to the axial air jet passage 456. As shown in FIG. 23, the dual cup blowoff lines 422 apply a jet of air to the axial air jet passages of adjacently disposed curling pots CP. Alternatively, a single blowoff line could be used. Packaging speed limitations, may render it necessary to eject the cups two at a time, each to its own separate delivery system and to a packager (not shown). If packaging speed limitations are not a problem, a single blowoff line and packaging system may be used. The timing of the air jet is accomplished by the cup eject air valve 462 which synchronizes the application of the air jet to the positioning of the curling pots CP.

Curling Oil Applicator Apparatus and Method

Figure 26:
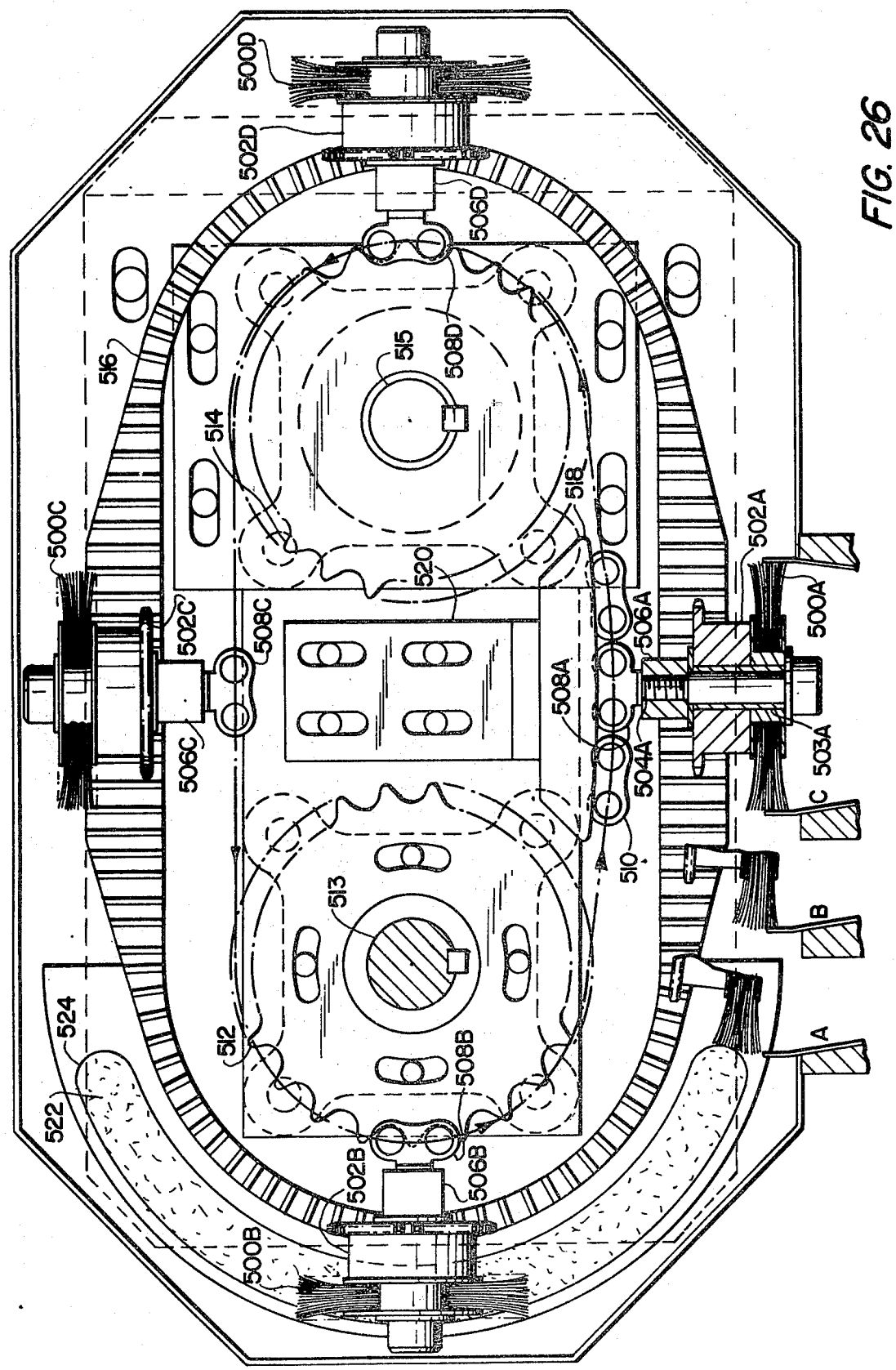
FIG. 26 is a top plan view of a detailed embodiment of a curling oil applicator apparatus according to the present invention.
Figure 27:
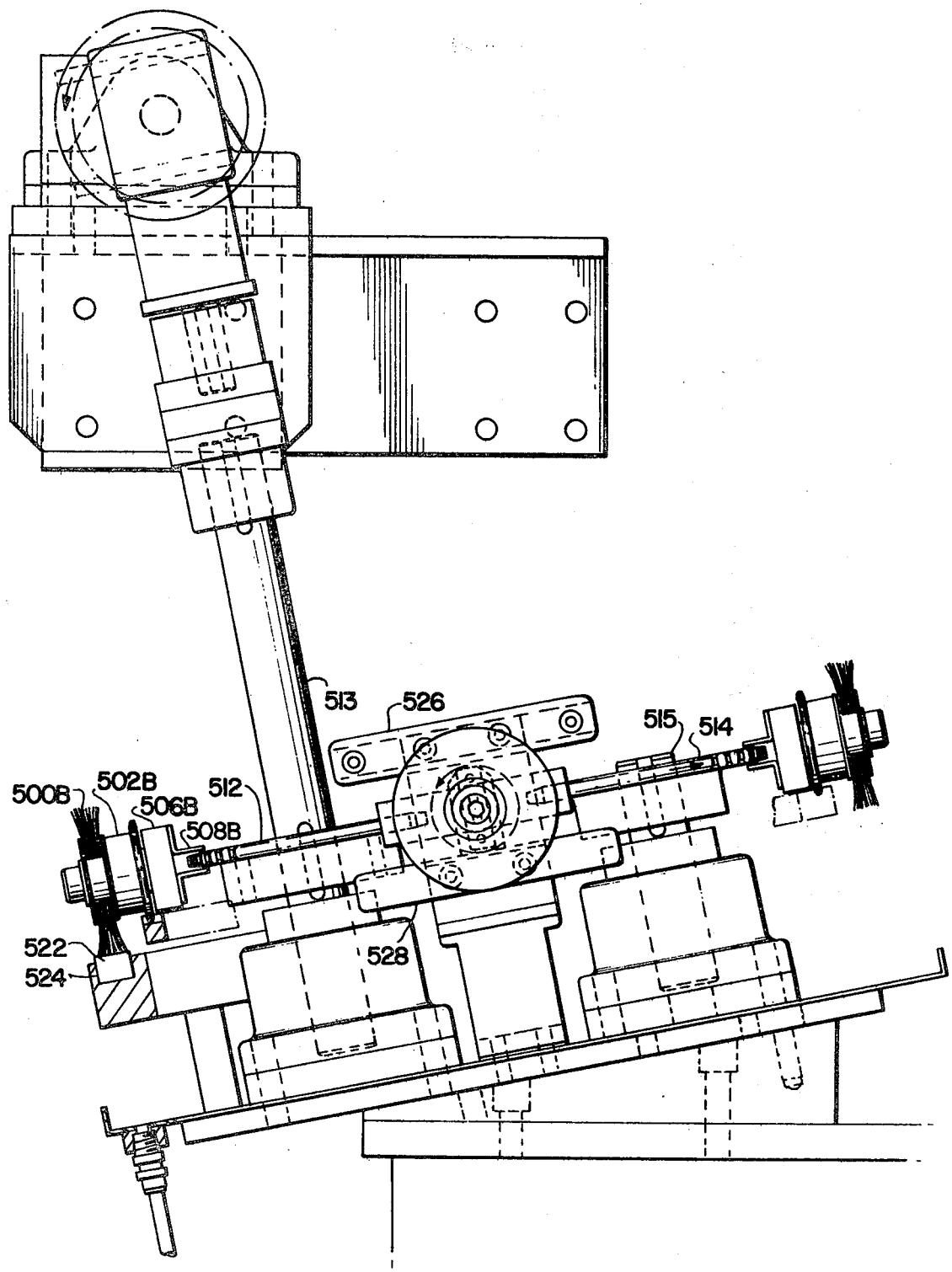
FIG. 27 is a front plan view of a detailed embodiment of the curling oil applicator apparatus illustrated in FIG. 26.
Figure 28:
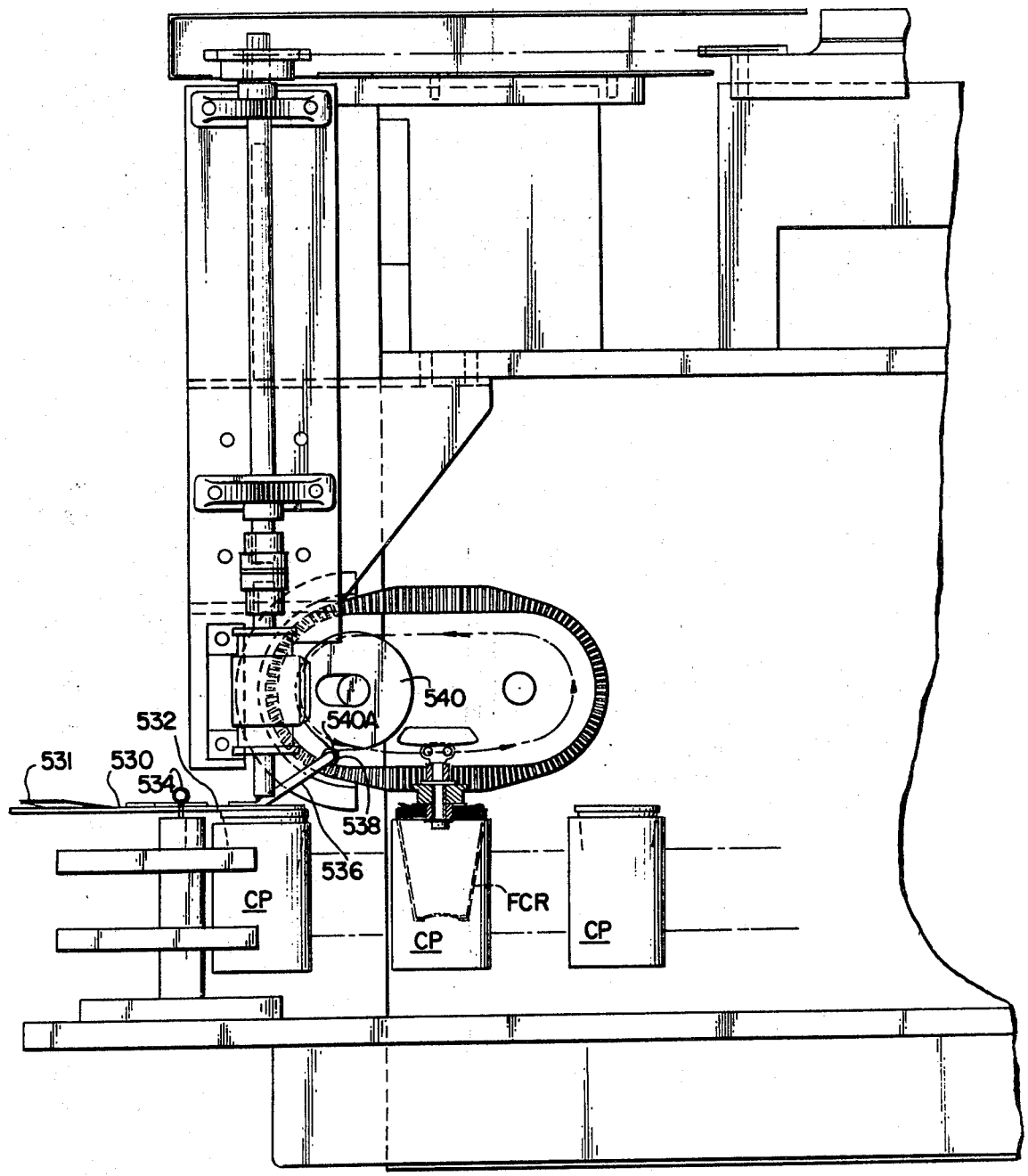
FIG. 28 illustrates a top plan schematic illustrating the curling oil applicator apparatus of the present invention including a cup feeder and its associated cam.

Referring to FIGS. 26, 27 and 28, a detailed embodiment of a curling oil applicator apparatus is disclosed according to the present invention.

The curling oil applicator apparatus is designed to lubricate the formed container 100 which are each located in a respective curling pot CP. As each formed container 100 located in its respective curling pot CP passes the curling oil applicator, one of a set of rotating lube brushes 500, driven in synchronism with the curling pot CP, places a coating of mineral oil onto the inside of the top edge of the formed container 100.

The curling oil applicator apparatus of the present invention includes, in the preferred embodiment, four (4) rotating lube brushes 500A-D. Each of these rotating lube brushes 500A-D is fixably mounted to a respective lube brush sprocket 502A-D. Each rotating lube brush 500A-D and its associated toothed lube brush sprocket 502A-D is lined with a lube brush brushing 503A-D which rotates on a respective lube brush shaft 504A-D fixed in an associated lube brush shaft mount 506A-D. Each lube brush shaft mount 506A-D is attached to a respective lube brush retaining link 508A which forms a part of an endless roller chain 510.

The endless roller chain 510 is driven by a drive sprocket 512. An idler sprocket 514 is also provided to guide the endless roller chain 510 along a desired path. The endless roller chain 510 resembles an oval having its longitudinal axis parallel to the direction of travel of the curling pots CP. The drive sprocket 512 is driven by a drive shaft 513 keyed to the drive sprocket 512. The idler sprocket 514 rotates about an idler sprocket shaft 515 which is keyed to the idler sprocket 514. This stationary cam allows this run of the rotating lube brushes 500A-D to be slightly arcuate, thereby aiding the entry of each rotating lube brush 500 into the inner surfaces of the top edge portion 100A of each finished container 100.

A lube applicator pad 522 is disposed within a lube applicator well 524. In the preferred embodiment, the lube applicator pad is advantageously made from an open cell foam rubber. The lube applicator pad 522 receives oil automatically from an overhead gravity feeder. The oil automatically stops flowing from this overhead gravity feeder if the machinery stops.

A first and second lube brush restraining guides 526, 528 are spaced in a parallel number on both sides of the endless roller chain 510. These restraining guides 526, 528 prevent the lube brush 500 and its associated tooth lube brush sprocket 502 from drifting away from the endless spur gear rack 516 due to forces placed upon the rotating lube brush 500 by its contact with the top edge portion 100A of the finished container 100. The first and second lube brush restraining guides 526 and 528 restrain the rotating lube brush 500 by closely constraining the lube brush shaft mount 506 which is formed with a substantially rectangular shape.

FIG. 28 is a plan view of the curling oil application apparatus of the present invention illustrating the details of a cup feeder wiper blade and its associated wiper blade cam. A cup feeder plate 530 is positioned along the line of travel of the curling pot CP. This cup feeder plate 530 is placed at a distance from the position of each curling pot CP as it passes this cup feeder plate 530. The cup feeder plate 530 is provided with an initial cup feeder ramp 531 which serves to initially guide the finished container 100 into the curling pot CP. The cup feeder plate 530 is placed to allow the finished container 100 to be gradually pushed into the cup receiving cavity FCR of the curling pot CP. A cup feeder wiper blade 532 is hingedly mounted on the cup feeder plate 530. A wiper blade bias spring 534 applies a bias force to the cup feeder wiper blade 532. This bias force attempts to maintain this wiper blade out of contact with the finished containers 100 as they pass. A wiper blade push rod 536 is connected to the cup feeder wiper blade 532. A wiper blade push rod cam roller 538 is affixed to the end of the wiper blade push rod 536 opposite to its point of connection on the cup feeder wiper blade 532. A wiper blade cam 540 is affixed to the drive shaft 513 for rotation therewith. In the preferred embodiment, this drive shaft 513 rotates one revolution during the passing of each curling pot CP. A cam lobe 540A is provided on the periphery of the wiper blade cam 540. This cam lobe is positioned so as to depress the wiper blade push rod 536 at the moment when one of the curling pots CP with its associated finished container 100 is directly under the cup feeder wiper blade 532.

The curling oil applicator apparatus of drawing FIGS. 26–28 is designed to be placed in the curler apparatus assembly along the lower run of the curling pot drive chain 420 between the large radius cam surface RCS and the curling apparatus CCA. In the preferred embodiment, the cup seater plate 530 and the cup seater wiper blade 532 are positioned over the upstream edge portion of the large radius cam surface RCS.

In operation, the finished containers are removed from the mandrel FM or DTM by the application of a compressed air jet applied through the cup bottom vacuum passages 348 of the mandrel DTM. This jet of compressed air forces the finished container 100 off of the mandrel DTM and into the curling pot CP. However, the finished container is not securely seated at this point. As the curling pot CP containing the finished container 100 passes around the large radius cam surface RCS, the top edge portion 100A of the finished container 100 contacts the initial cup seater ramp 531 which insures that the cup is at least partially seated within the cup receiving cavity of the curling pot CP by the force provided by this cup seating ramp 531. As the curling pot continues to move, the contact between the cup seater plate 530 and the top edge portion 100A is aligned with the cup receiving cavity FCS of the curling pot CP. At the moment the curling pot CP nears the downstream end of the cup seater wiper blade 532, the wiper blade cam 540 and its associated wiper blade cam lobe 540A depresses the wiper blade push rod 536 to thereby displace the cup seater wiper blade 532 to securely seat the finished container 100 into the cup receiving cavity FCR in the curling pot CP. The finished container 100 is then ready for the curling oil lubing process. Thus, the wiper blade assembly used in FIG. 28 securely seats the finished container 100 into the curling pot CP to allow the curling oil applicator to apply an even coat of mineral oil around the inner edge of the top edge portion 100A of each finished container 100 as it passes. The finished container 100 is also securely seated in order to allow an accurate curling operation to be performed on the cup.

The rotating lube brushes 500A–D of the curling oil applicator apparatus of the present invention are synchronized with the movement of the curling pots CP past the curling oil applicator. As the curling pot CP approaches the curling oil applicator, a rotating lube brush 500 approaches the curling pot CP in synchronism therewith. Just prior to the contact of the rotating lube brush 500 with the top edge portion 100A of the finished container 100, a coating of mineral oil is applied to the rotating lube brush 500 while this rotating lube brush 500 is in contact with the lube applicator pad 522. As the curling pot CP approaches position A of FIG. 26, the rotating lube brush 500 begins to enter the top edge portion 100A of the finished container 100. The depth of insertion of the rotating lube brush 500 into the finished container 100 may be controlled by adjusting the stationary cam 518 using adjustable stationary cam bracket 520. It is this stationary cam 518 which controls the movement of the rotating lube brush 500 into the top edge portion 100A of the finished container 100. As can be seen by positions B and C, the endless roller chain 510 is guided along the stationary cam 518 to gradually insert the lube brush 500 into the top edge portion 100A of the finished container 100 until this lube brush is fully inserted. Because this lube brush is connected to the lube brush sprocket 502 which rotates on the endless spur gear rack 516, the lube brush 500 continuously rotates as it moves in synchronism with the movement of the curling pot CP. After the curling pot CP and rotating lube brush 500 move past the position of the stationary cam 518, the lube brush 500 is gradually removed from the finished container 100 in a manner similar to its entry into this container.

Thus, the inner surface of the top edge portion 100A of the finished container is coated with a light coating of mineral oil. This coating of mineral oil aids in the curling process and results in an improved finished top curl around the upper edge of the finished container 100. The use of this curling oil applicator apparatus noticeably improves the quality of the top curl of each of the finished containers.

The Complete Cup Making Machine and Method

Figure 30A:
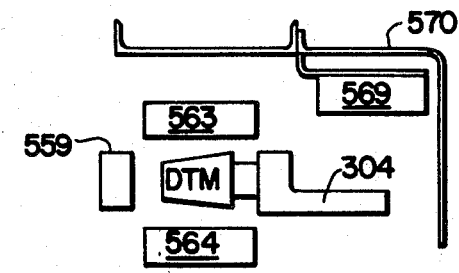
FIGS. 30A–C are sections of the schematic of FIG. 30 showing the relative placement of the radiant panel heaters in relation to a forming mandrel.
Figure 30B:
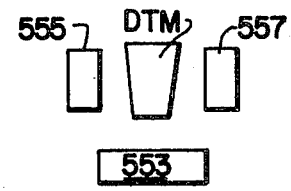
Figure 30C:
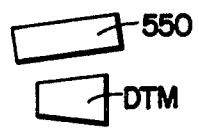
Figure 19B:
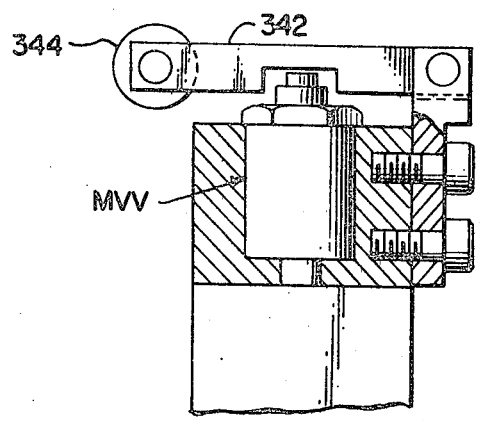
FIG. 19B discloses a 180° rotation (counter clockwise) of a detail of a vacuum valve shown in FIG. 19.
Figure 20:
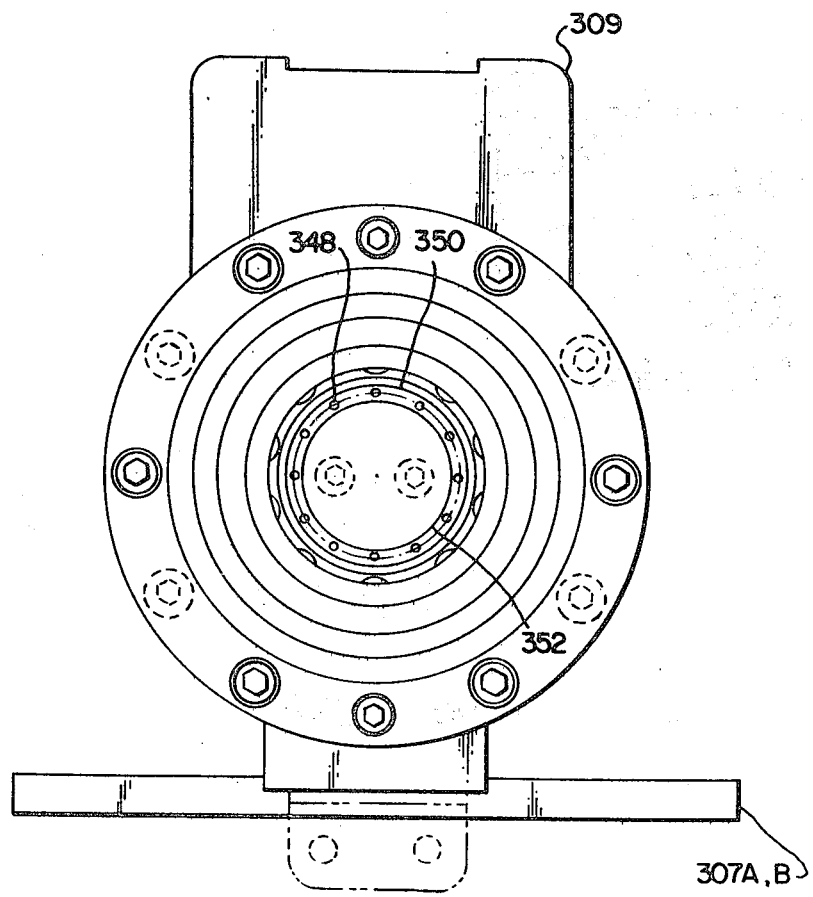
FIG. 20 shows an end view of the mandrel assembly of FIG. 19.
Figure 29:
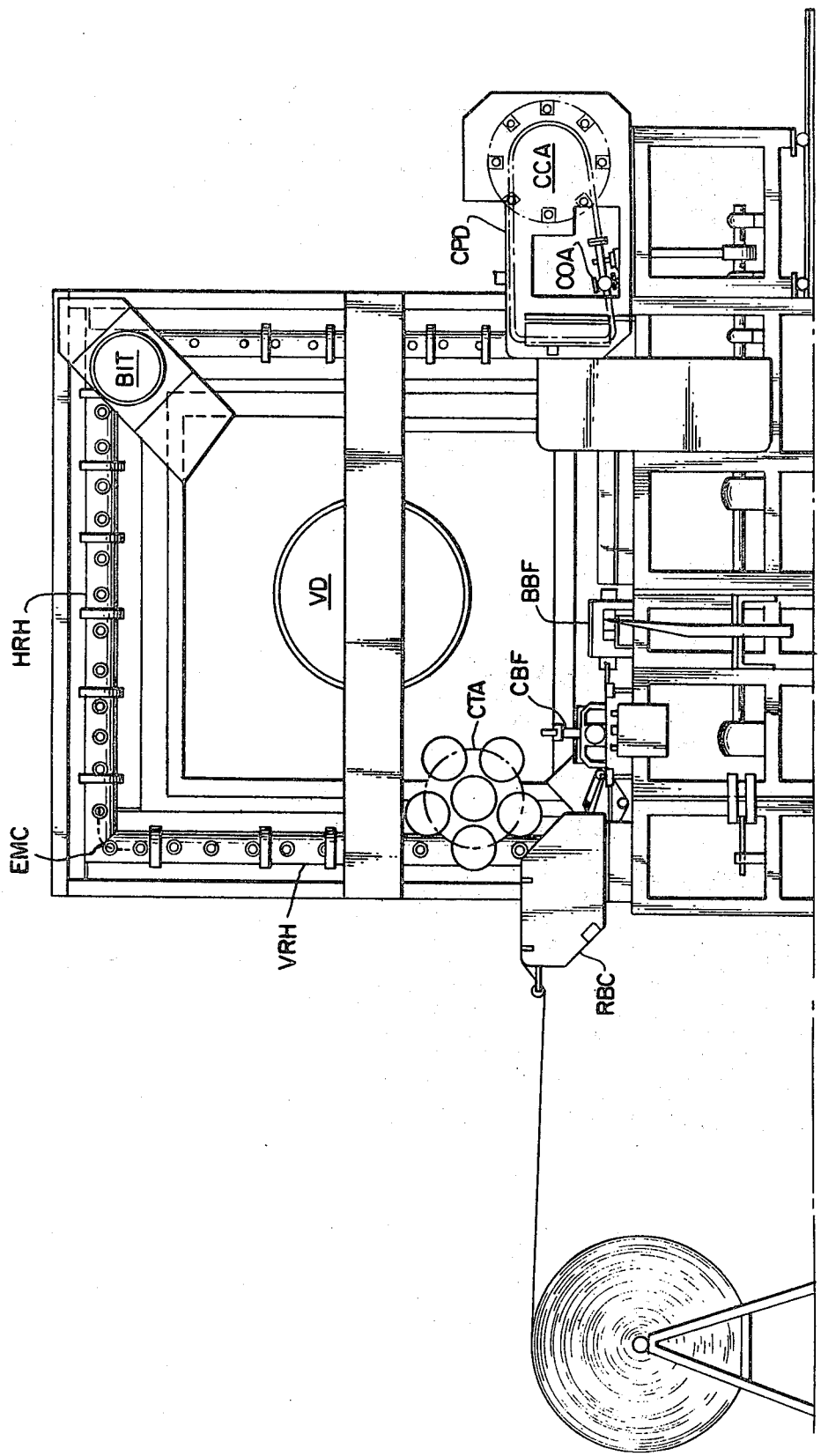
FIG. 29 is a plan view of a detailed preferred embodiment of a complete cup making apparatus for producing completed foam plastic containers from rectangular blanks according to the present invention.
Figure 30:
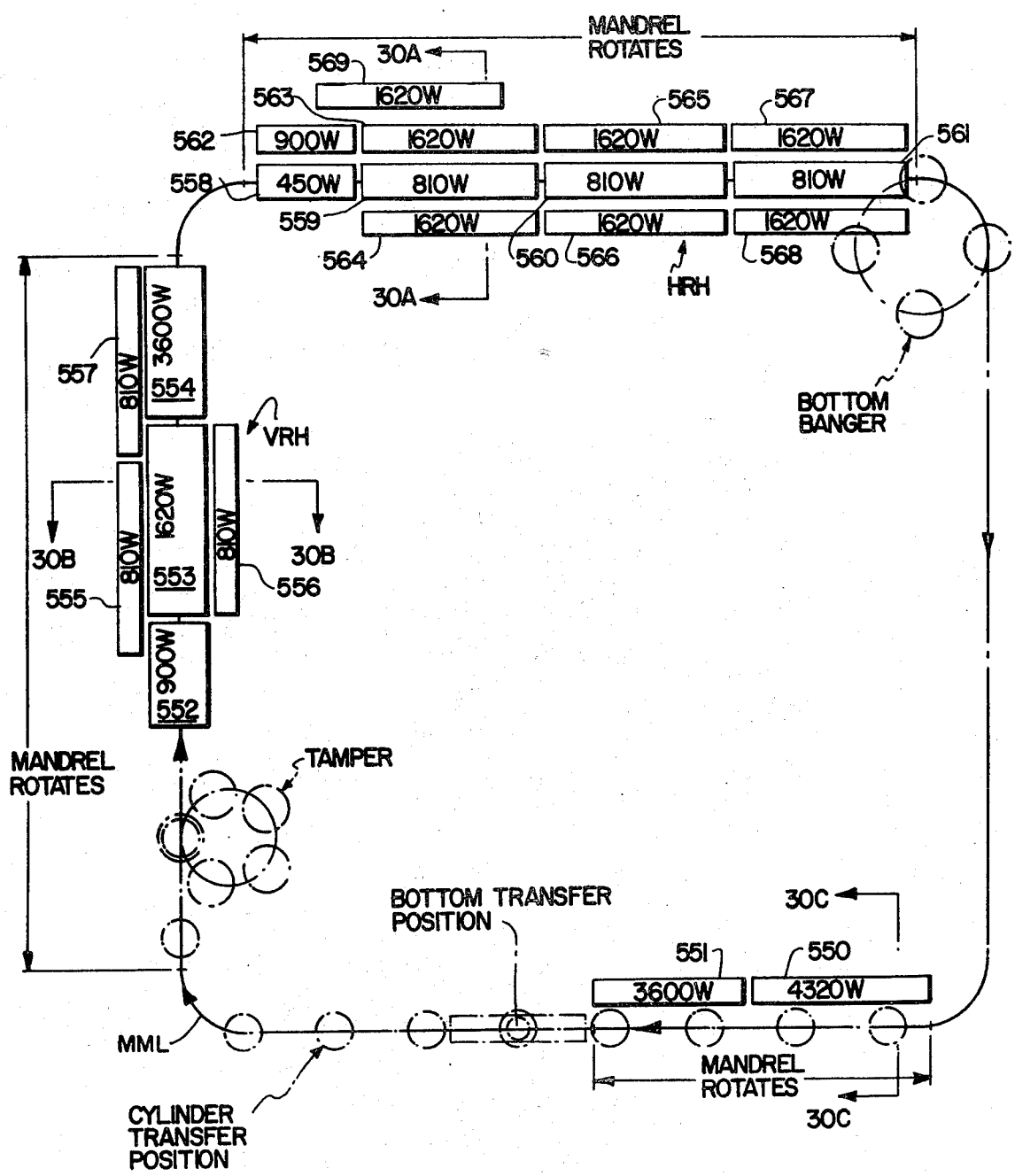
FIG. 30 is a schematic of the complete cup making apparatus of FIG. 29 which illustrates the placement of a preferred embodiment of the shrink oven which utilizes a plurality of radiant panel heaters.

Referring to FIGS. 29 and 30, there is illustrated a detailed preferred embodiment of the complete cup making apparatus for producing completed foam plastic containers from rectangular blanks of longitudinally stretch oriented foam sheet material.

Rather than use the arcuately disposed heat tunnel HT of FIG. 7, the preferred embodiment of FIG. 29 utilizes radiant panel heaters which are not covered by a sheet metal tunnel. As shown in FIG. 30, first and second shrink mandrel heaters 550, 551 are used to preheat the mandrel FM or DTM of the present invention. As is the case with all the heaters used in the preferred embodiment and shown in FIG. 30, the shrink mandrel preheaters 550, 551 have their wattage ratings noted on the drawing. As shown in FIG. 30, the mandrel FM or DTM rotates as it passes the first and second shrink mandrel preheaters 550, 551. This rotation is due to the interaction between the mandrel rotation surface 320 of the frustro-conical mandrel DTM and a mandrel rotation track 322 which is provided along the length of the first and second shrink mandrel preheaters 550, 551.

Referring to FIG. 30, the first and second shrink mandrel radiant preheaters 550, 551 are illustrated as separated from the frustro-conical mandrel FM or DTM at a distance of approximately 1".

A plurality of vertical run radiant heaters VRH are disposed along a left vertical run of the mandrel movement line MML. The vertical run radiant heaters VRH include a first, a second and a third bottom heaters 552-554 and a first, a second and a third sidewall heaters 555-557. In the schematic cross sectional view of FIG. 30, the separation between the first and third sidewall heaters, the second bottom heater, and the mandrel DTM is shown. In the preferred embodiment, both the bottom heaters 552-554 and sidewall heaters 555-557 are separated from the mandrel DTM at a distance of approximately 1.5".

A set of horizontal radiant heaters HRH includes a first, a second, a third, and a fourth horizontal run bottom heaters 558, 559, 560, 561 and a first through a seventh horizontal run sidewall heaters 562-568. In the schematic cross sectional view of FIG. 30A, the second and third sidewall heaters 563, 564 are separated from the mandrel DTM at about approximately 1.5". Similarly, the second horizontal run bottom heater 559 is also separated from the mandrel at approximately 1.5".

Throughout the vertical rise of the mandrels, DTM, a mandrel rotation track 322 is provided to rotate each mandrel DTM using the mandrel rotation surface 320. Similarly, throughout the horizontal travel of the mandrel through the horizontal run radiant heaters HRH, the mandrel rotation track 322 is also provided to engage the mandrel rotation surface 320 to rotate the mandrel DTM. This rotation is performed at all points where heat is applied to the mandrel to more evenly heat the mandrel and the cylindrical blank mounted thereon. The first, second and third bottom heaters of the vertical run radiant heaters VRH must be set to soften the bottom stock with a temperature that will not distort, shrink or curl it from its true round shape. At this point, the bottom is being held onto the mandrel bottom 350 by a vacuum applied to the cup bottom vacuum passages 348. The first three sidewall heaters 555-557 of the vertical run radiant heaters VRH must soften the cylindrical clank slightly, but not enough to curl it inward and cover the bottom disk BD. If the bottom disk BD is covered, the bottom will not fuse or heat seal bottom ironing turret BIT.

The horizontal run radiant heaters HRH are set at progressively higher temperatures with the last ones very high in order to finish the shrinkage and post expansion. These temperatures may need to be "tuned in" or adjusted slightly to suit the particular polystyrene foam sheet being run. Observation of the finished container 100 will inform one of ordinary skill in the art which of the heaters should be slightly raised and lowered in heat to obtain a container that has good shrinkage appearance, but is not overheated or burned.

A sheet metal baffle 570 is provided over the horizontal run radiant heaters and on one side thereof to prevent cold drafts from blowing onto the mandrels DTM.

The mandrels are preheated by the first and second shrink mandrel preheaters 550, 551 in order to keep the surface temperature of the mandrels at the 170°-180° F. temperature necessary for the proper operation of the cup making process.

Referring to FIG. 29, the placement of the various assemblies already discussed into the completed cup making apparatus of the present invention if further illustrated. An endless mandrel chain EMC carries the mandrels along the mandrel movement line MML which is formed subtantially in the shape of a square. In the approximate center of the bottom of the square formed by the mandrel movement line MML, after each mandrel DTM is preheated, the bottom blank BD is placed on the mandrel bottom 350 and held there by the cup bottom vacuum passages 348. This bottom blank BD is formed by the bottom blank forming station BBF which forms this bottom blank BD and applies it to the mandrel bottom 350 is already discussed in relation to FIGS. 16-18. As shown in FIGS. 1 and 3, the mandrel DTM then moves to the cylindrical blank forming station CBF which receives the rectangular blanks 10A from the rectangular blank cutting station RBC which feeds the rectangular blanks 10A to the cylindrical blank forming station CBF. The cylindrical blank forming station places the cylindrical blank onto the mandrel DTM.

The mandrel then moves along the endless mandrel carrier chain ECM until the cylindrical blank tamper assembly CTA is reached. The cylindrical blank tamper assembly discussed in relation to FIGS. 21 and 22, securely fastens the cylindrical blank onto the mandrel DTM. The mandrel with its associated cylindrical blank 10A and bottom blank BD is then transferred to the vertical run radiant heaters VRH and the horizontal run radiant heaters HRH which shrink the blanks to form a finished container 100. The bottom ironer assembly BIT then seals the seam between the bottom blank BD and the already shrunk cylindrical blank 10A. The mandrel DTM with its associated finished container 100 then proceeds to a finished container pickoff point where the finished container 100 is removed from the mandrel DTM and deposited into a curling pot CP as already discussed.

The curling pots CP travel along a curling pot drive chain CPD which circles endlessly between the pickoff point from the endless mandrel chain drive EMC and the curling apparatus CCA. Each curling pot CP disposed on the curling pot drive CPD then passes a curling oil applicator COA which functions as already discussed in relation to FIGS. 26-28. The curling pots CP are then received by the curling apparatus CCA which puts the top curl on the finished container 100 which is then ejected from the curling pot along the upper length of the curling pot drive chain CPD. Thereafter the finished containers are packaged for distribution.

Figure 31:
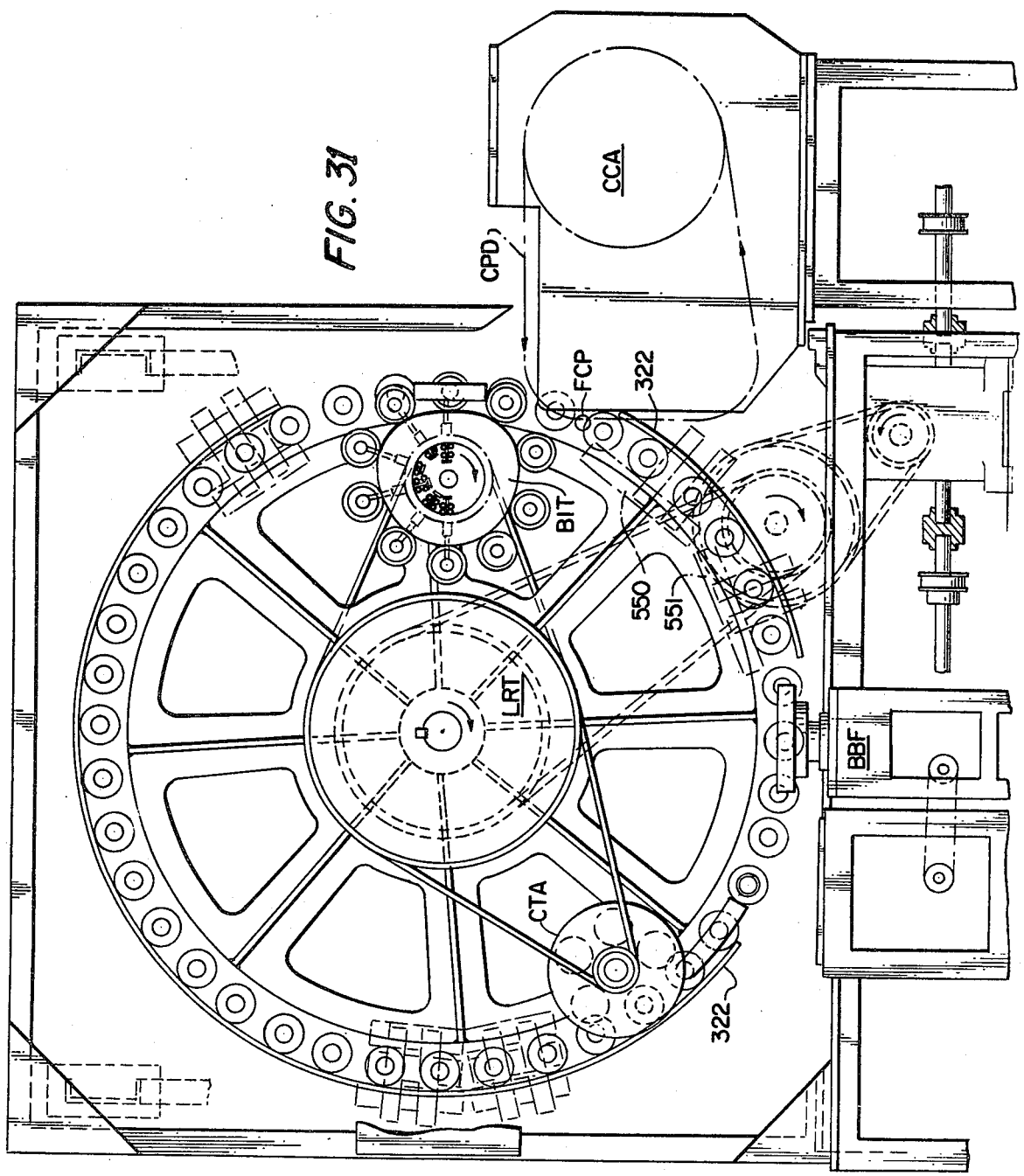
FIG. 31 is a front plan view of an alternate large rotating turret embodiment of the completed cup making apparatus of the present invention.
Figure 32:
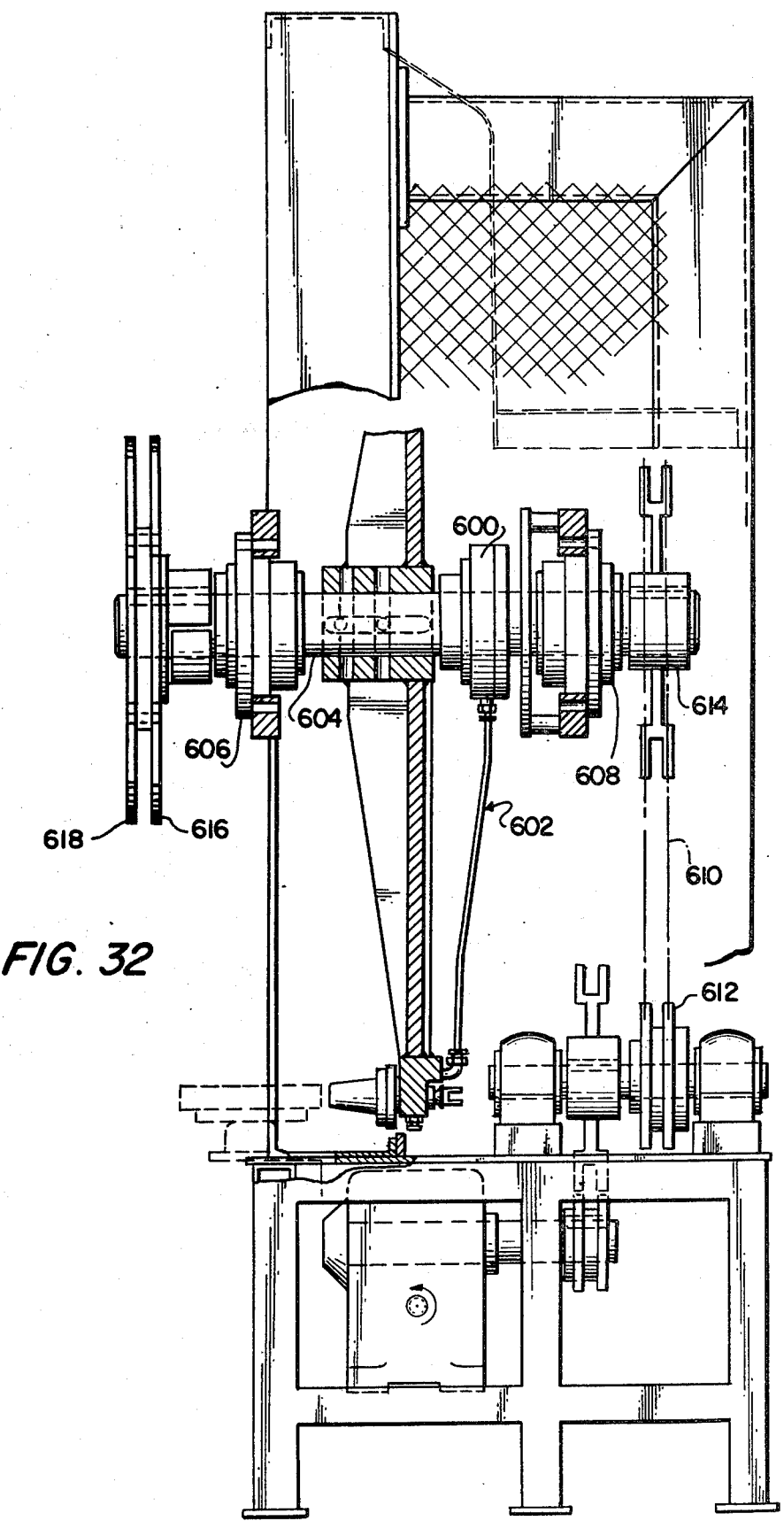
FIG. 32 is a side plan view of the alternate large rotating turret embodiment of the completed cup making apparatus of the present invention.

FIGS. 31 and 32 show an alternate preferred embodiment of the cup making apparatus and method of the present invention. This alternate embodiment is similar to the embodiment previously discussed except that a rotating turret is substituted for the roller chain previously used to carry the mandrels DTM.

Referring to FIGS. 31 and 32, a large rotating turrent LRT is used in the place of an endless mandrel carrying chain EMC and forty (40) mandrels DTM are disposed along the periphery of the said large rotating turret. The mandrel assembly is substantially the same as that of previous embodiments except for its mounting structure on the rotating turret LRT. Because of the change from the endless mandrel carrier chain EMC to the large rotating turret LRT, the vacuum lines necessary to apply vacuum and the air lines necessary to apply air to the mandrel DTM have been modified. Both the vacuum and air lines now distribute the vacuum and air from an air and vacuum distributor 600. This air and vacuum distributor 600 distributes air to the individual mandrels DTM through rigid air and vacuum lines, for example, a vacuum line 602.

The large rotating turret LRT rotates on a turret shaft 604 which revolves in a first and a second turret bearings 606, 608. The turret is driven by a turret drive chain 610 which transfers power from a drive turret timing sprocket 612 to a turret power transfer sprocket 614. A cup tamper timing sprocket 616 and a bottom ironer timing sprocket 618 are provided on one end of the turret shaft 604 to transmit power and to synchronize the movement of the bottom ironer BIT and the cup tamper assembly CTA.

Other than the above described modifications, the apparatus of FIGS. 31 and 32 functions in a manner identical to that of the previous embodiments.

As each mandrel passes the first and second shrink mandrel preheaters 550, 551 a mandrel rotation track 322 engages the mandrel rotation surface 320 of each mandrel DTM and rotates each mandrel DTM for even preheating. When the mandrel reaches the bottom blank forming apparatus BBF, a bottom disk BD is transferred to the mandrel bottom 350 where it is held by the cup bottom vacuum passages 348. The mandrel DTM then moves to the cylindrical blank transfer point where a cylindrical blank is placed on the mandrel DTM. The cylindrical tamper assembly CTA then securely fastens the cylindrical blank to the mandrel DTM. During approximately 174° of the rotation of the large rotating turret LRT, the cylindrical blank and bottom disk are heated in a manner similar to previous embodiments. During this entire process, the mandrel is rotated by the interaction between the mandrel rotation surface 320 and a mandrel rotation track 322. As the mandrel and finished container 100 exit the oven section of the container-forming apparatus of this embodiment, a bottom ironer BIT seals the seam between the bottom disk BD and the already shrunk cylindrical blank 10A to form the finished container 100.

This finished container is passed to the curling pot drive chain CPD at a finished container transfer point FCP. The finished container 100 then has its top edge portion 100A lubricated by the curling oil applicator COA and the curl is formed by the curling apparatus CCA. Thus, it can be seen that the embodiment of the present invention illustrated in FIGS. 31 and 32 functions in a manner virtually identical to that of the previous embodiment.

The Synchronization Control

Figure 33:
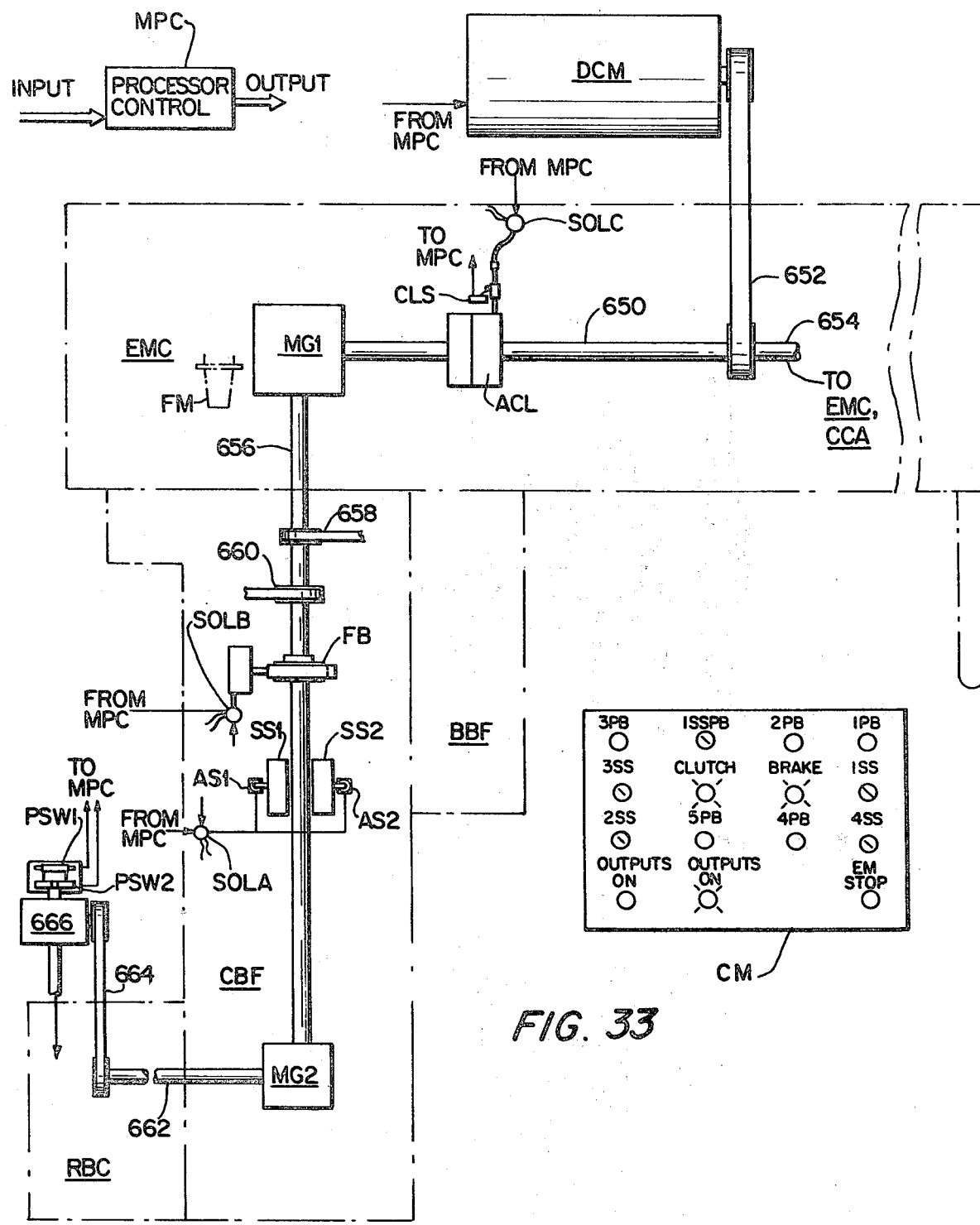
FIG. 33 is a diagrammatic top view of the drive and control system for driving the apparatus of the present invention.

Referring to FIGS. 33 and 34, the synchronization control of the system of the present invention will now be described. The apparatus for forming foam plastic containers of the present invention is driven by a DC main drive motor DCM which is continuously driven to power the apparatus of the present invention. The DC main drive motor DCM powers a power take-off shaft 650 via a power transfer belt 652. When viewing FIG. 33, power is applied to the curling apparatus CCA and mandrel carrier chain EMC via the right end 654 of the power take-off shaft 650. As the DC main drive motor DCM continuously rotates, so does the curling apparatus CCA and mandrel carrier chain EMC. The main drive motor DCM further drives the bottom blank forming station BBF, cylindrical blank forming station CBF and rectangular blank cutting station RBC via an air clutch ACL mounted intermediate between the power transfer belt 652 and a first miter gear box MG1 on the power take-off shaft 650. The air clutch ACL is a single position five ball clutch which locks only when the respective clutch faces are uniquely rotationally aligned. In the preferred embodiment, a Horton Manufacturing Company "Air-Champ" single position clutch is used, although it should be understood that other forms of single position clutches could be used in the present invention.

The first miter gear box MG1 transmits the power from power take-off shaft 650 to a module drive shaft 656 which extends perpendicularly from the power take-off shaft 650. A bottom blank forming power transfer belt 658 and a sidewall blank transfer drive power transfer belt 660 apply power to their respective assemblies. At the opposite end of the module drive shaft 656 from the first miter gear box MG1, a second miter gear box MG2 is provided. The second miter gear box MG2 redirects power to a rectantular blank cutting station RBC from the rectantular blank cutting station drive shaft 662 via a rectangular blank cutter power transfer belt 664 and rectangular blank cutter feed reducer 666. Proximity switch assembly PSA is driven by the speed reducer 666 prior to feed reduction. Thus, the proximity switch assembly PSA revolves at a speed higher than the speed of the sidewall blanking drive produced by speed reducer 666.

A friction brake FB is mounted on the module drive shaft 656 and is pneumatically actuated and controlled by a brake solenoid valve SOLB. The air clutch ACL it also air operated and controlled by a clutch solenoid valve SOLC.

The air clutch ACL is further provided with a pressure operated limited switch CLS which detects whether the air clutch ACL has been positively actuated so that all of the clutch balls are in position. If all clutch balls are not in position, a pressure fluctuation is detected by pressure operated limit switch CLS to thereby forward a signal to the control circuitry and abort the drive connection provided by the air clutch ACL.

FIG. 33 also illustrates the relative location of a pair of side seam heaters SS1, SS2 in the cylindrical blank forming station CBF. These side seam heaters are selectively retracted by a first air cylinder AS1 and a second air cylinder AS2. The first and second air cylinders AS1, AS2 are controlled via air cylinder solenoid valve SOLA. The operation of the first and second air solenoids AS1, AS2 can be best seen in FIG. 33B.

The proximity switch assembly PSA of FIG. 33 includes a first proximity switch PSW1 and a second proximity switch PSW2 which are used to synchronize the rectangular blank cutting station RBC, cylindrical blank forming station CBF, and bottom blank forming station BBF with the mandrels arranged on endless mandrel carrier chain EMC. These switches are connected to the machine control MPC associated with the device of the present invention to be later discussed. A further pair of switches, a first oven switch OSW1 and a second oven switch OSW2 are mounted to rotate in synchronism with the movement of the mandrel carrier chain EMC. These oven switches serve to monitor the position of the mandrels on the endless mandrel carrier chain EMC so that the bottom blank forming station BBF and cylindrical blank forming station CBF may be synchronized thereto.

In order to control the synchronization of this system of the present invention, a machine processor control MPC is provided for monitoring the various inputs of the synchronization system and for controlling the various outputs. The inputs monitored by the machine processor control include pressure operated limit switch CLS, first and second oven switches OSW1 and OSW2, first and second proximity switches PSW1 and PSW2 as well as various operator controlled inputs on the control module switchboard CM. Outputs from the processor control MPC includes the power control of the DC main drive motor DCM, clutch solenoid valve SOLC, air cylinder solenoid valve SOLA and brake solenoid valve SOLB. In the preferred embodiment, the processor control MPC is a ITC-300 manufactured by Industrial Solid State Controls, Inc. of York, Pa.

Description of Operation of the Synchronization Control

The operation of the synchronization system of the present invention will be described with reference to FIGS. 33-34.

In FIG. 33, the drive and synchronization system of the present invention functions as follows. The DC drive motor DCM continuously turns in order to drive the apparatus of the present invention. This drive is transferred to a power take-off shaft 650 drives the endless mandrel carrier chain EMC and top curler TC (not shown). Power from the power take-off shaft 650 is further applied to the first miter gear box MG1 via air clutch ACL. The power is then transferred to the module drive shaft 656 which applies power to the bottom blank forming station BBF via bottom blank forming power transfer belt 658. Power is further transferred in order to drive the cylindrical blank forming station CBF by sidewall blank transfer drive power transfer belt 660. Power is also transferred to a second miter gear box MG2 and then to a rectangular blank cutting station drive shaft 662 and its respective transfer belt 664 to the rectangular blank cutting station speed reducing gear box 666 for application to the rectangular blank cutter RBC.

When in operation with all of the sub-assemblies of the cup forming machine of the present invention fully synchronized, the friction brake FB remains de-energized while the air clutch ACL remains actuated. When it is desired to disconnect the bottom blank forming station BBF, cylindrical blank forming station CBF and rectangular blank cutting station RBC from the remainder of the cup-making machine, the push bottom 1PB located on the control module switchboard CM is actuated by the operator. This will cause the air clutch ACL to be released by de-energizing clutch solenoid SOLC via command from the machine processor control MPC. This disengagement of the air clutch ACL does not occur immediately, however. Instead, the air clutch disengages only when the proximity sensing oven switch OSW1 senses the presence of its associated rotating sensor mounted on the endless mandrel carrier chain shaft. Thus, the air clutch ACL will disengage to cause the bottom blank forming station BBF, cylindrical blank forming station CBF, and rectangular blank cutting station RBC to come to rest in the same relative position each time the equipment is stopped so long as the speed remains constant. When the bottom blank forming station BBF, cylindrical blank forming station CBF, and rectangular blank cutting station RBC are stopped, the top curler TC (not shown) and endless mandrel chain EMC continue to be driven by the DC drive motor DCM in order to prevent the cups located on the mandrels along the endless mandrel chain EMC from stopping under the oven heaters and becoming damaged due to the application of excessive heat. Thus, it is extremely important to keep the endless mandrel chain EMC moving when the various forming modules are stopped.

When the various forming stations are disconnected from the endless mandrel carrier chain EMC via air clutch ACL, the friction brake FB is simultaneously applied to stop the forming station drive at a precise predetermined point where the sensor of the proximity sensing switch PSW1 is precisely aligned with its rotating target. The respective forming section modules may be again synchronized properly with the endless mandrel carrier chain, during startup when the forming section modules are aligned during startup with the position of oven proximity switch OSW1 with its respective target.

When the forming modules are stopped, the processor control MPC further delivers a signal to the air cylinder solenoid valve SOLA to apply air to the first and second air solenoids AS1 and AS2 to retract the first and second side seam heaters SS1, SS2 from the cylindrical blank forming section CBF in order to prevent heat damage to any blanks disposed therein. Upon start-up of the cylindrical blank forming station CBF, the solenoid valve SOLA is closed in order to vent air from the first and second air solenoids AS1, AS2 and place the first and second side seam heaters in their operational positions.

The bottom blank forming station BBF, cylindrical blank forming station CBF, and rectangular blank cutting station RBC are restarted and synchronized to the movement of the endless mandrel carrier chain EMC as follows. When the respective forming sub-stations are stopped, the endless mandrel carrier chain EMC continues to be driven by the DC drive motor DCM in order to prevent the vertical and horizontal run radiant heaters VRH and HRH from over-heating previously formed finish containers 100 arranged on the forming mandrels FM spaced along the endless mandrel carrier chain EMC.

To energize the bottom blank forming station BBF, cylindrical blank forming station CBF and rectangular blank cutting station RBC, the friction brake FB is maintained in its energized state by the application of air controlled by the brake solenoid valve SOLB. The clutch solenoid valve SOLC is opened in order to apply air to the single position air clutch ACL. Because the ball-type clutch used may be engaged in only one position, this clutch engages when the endless mandrel carrier chain EMC is synchronized to the position of the bottom blank and cylindrical clank forming station BBF, CBF and rectangular blank cutting station RBC. While only one out of a number of rotations of the driven side of the air clutch ACL might properly synchronize the respective mandrels to the endless mandrel carrier chain EMC, the positions sensed by the proximity switches PSW1 and OSW2 and oven switches OW1, OW2 are used to insure that both sides of the air clutch ACL are on the proper rotation. The DC drive motor DCM is allowed to stall for a period of time sufficient to ensure the secure engagement of the air clutch, typically, 1.5 seconds. This period of time is insufficient to damage DC drive motor DCM but is sufficient to ensure the complete engagement of the air clutch ACL. The pressure operated limit switch CLS functions to monitor the engagement of the air clutch ACL and transmit a signal to the processor control MPC if the balls of the air clutch ACL are not in position and thus the clutch is not completely engaged. When the processor control MPC receives this signal, the processor control MPC aborts the drive by closing solenoid valve SOLC and bleeding the air pressure from air clutch ACL.

When the drive is aborted, after a predetermined time period encompassing at least one full rotation of the power take-off shaft 650, the air clutch is again engaged. After the temporary stalling of the DC drive motor DCM, the processor control MPC opens the brake solenoid valve SOLB in order to disengage the friction brake FB and allow the bottom blank forming station BBF, cylindrical blank forming station CBF and rectangular blank cutting station RBC to be driven in synchronism with the endless mandrel carrier chain EMC.

Thus, it can be seen that the respective forming stations, the bottom blank forming station BBF, rectangular blank cutting station RBC and cylindrical blank forming station CBF may be synchronized to the endless mandrel carrier chain EMC at any time in order to maintain machine synchronization but may be disengaged to enable the operator to stop the respective forming stations, when necessary, in order to clear jams or for other assorted purposes.

The invention thus described, it is apparent that the invention may be modified as would occur to one of ordinary skill in the art without departing from the spirit and scope of this invention.

What is claimed is:

1. Means forming containers from rectangular sidewall blanks of shrinkable longitudinally oriented thermoplastic sheet material and disc shaped bottom blanks comprising:
   cylindrical blank forming means for producing finished cylindrical blanks having a longitudinal side seam and with said orientation directed circumferentially of each said blank;
   a plurality of forming mandrels;
   mandrel movement means for sequentially indexing said mandrels into coaxial position with one end of said cylindrical mandrel means;
   transfer means transferring said cylindrical blanks from said blank forming means to said forming mandrels in synchronism with the indexing of the letter with the former;
   supply means for providing a plurality of disc shaped bottom blanks for said containers sequentially indexed with said forming mandrels to supply bottom blanks thereto;
   means retaining said bottom blanks on said bottom portion of said forming mandrels;
   heating means for heating said cylindrical blanks to a temperature sufficient to shrink said cylindrical blanks into conformed engagement with said sidewall portion and over the peripheries of said bottom blanks to form said dual tapered containers;
   said mandrel movement means moving said mandrels past said heating means along a predetermined path;
   bottom ironing means downstream of said heating means for compressing the overlapped portions of said sidewall and bottom blank to seal the bottom of said container;
   discharge means ejecting said container from said mandrels downstream of said bottom ironing means;
   drive means for continuously driving said means forming containers; and
   means for selectively disconnecting said cylindrical blank forming means from said drive means to stop the operation thereof, said means for selectively disconnecting including means for connecting said cylindrical blank forming means to said drive means so as to retain synchronism between said cylindrical blank forming means and said mandrel movement means.

2. The means of claim 1 wherein said means for selectively disconnecting also disconnects said transfer means.

3. The means of claim 2 wherein said means for selectively disconnecting also disconnects said supply means.

4. The invention of claim 3 further comprising tamping means for securely pressing said cylindrical blanks onto said mandrels to prevent possible slippage when said blanks are heated by said means.

5. The invention of claim 4 further comprising top curl forming means forming an annular rim configuration on a top rim portion of said containers to define mouths of said containers.

6. The invention of claim 5 further comprising lube means for applying a coating of lubricant to said top rim portion of said containers prior to the formation of an annular rim configuration by said top curl forming means.

7. The invention of claim 3 wherein said mandrels each include equally spaced scalloped indentations formed in said tapered lower mandrel portion;
   said mandrel further including means for applying vacuum to said scalloped indentations to conform said blanks to the contour of said indentations.

8. The invention of claim 6 wherein said heating means comprises a plurality of radiant heaters.

9. The invention of claim 8 wherein said mandrel movement means also rotates said mandrels as they pass said heating means to provide even heat distribution.

10. The invention of claim 9 wherein said mandrel movement means comprises an endless conveyor.

11. The invention of claim 9 wherein said mandrel movement means comprises a rotating turret.

12. The invention of claim 11 wherein at least some of said radiant heaters are disposed along a substantially horizontal portion of said predetermined path;
   said heating means further comprising baffle means for blocking undesired drafts.

13. The invention of claim 12 wherein the radiant heaters along said predetermined path are set at progressively higher temperatures as their location nears the downstream end of said heating means.

14. Means forming containers from rectangular sidewall blanks of shrinkable longitudinally oriented thermoplastic sheet material and disc shaped bottom blanks comprising:
   conveyor means feeding a plurality of longitudinally stretch oriented rectangular blanks along a predetermined path transversely of the longitudinal dimension thereof;
   cylindrical mandrel means positioned parallel with said predetermined path adjacent said conveyor means;
   folding means adjacent said mandrel means over a portion of the length of the latter engaging and progressively folding said blank about said mandrel means while feeding said blank along said path to overlap the ends thereof on said mandrel in the provision of a lapped seam;
   first heating means adjacent said path for progressively applying heat to the ends of said blank to prepare said blank for heat sealing of said lapped seam;
   sealing means adjacent said mandrel downstream of said folding means for pressing said heated ends of said blank together to heat seal said lapped seam to provide a cylindrical blank on said mandrel;

a plurality of forming mandrels;

mandrel movement means for sequentially indexing said mandrels into coaxial position with one end of said cylindrical mandrel means;

transfer means transferring said cylindrical blanks from said blank forming means to said forming mandrels in syncronism with the indexing of the latter with the former;

tamping means for securely pressing said cylindrical blanks onto said mandrels to prevent possible slippage when said blanks are heated by said heating means;

supply means for providing a plurality of disc-shaped bottom blanks for said containers sequentially indexed with said forming mandrels to supply bottom blanks thereto;

said final forming mandrels each including at least a sidewall and a bottom portion, respectively;

means retaining said bottom blanks on said bottom portions of said forming mandrels;

second heating means for heating said cylindrical blanks to a temperature sufficient to strink said cylindrical blanks into conformal engagement with said sidewall portions and over the peripheries of said bottom blanks to form said containers;

said mandrel movement means moving said mandrels past said heating means along a predetermined path;

bottom ironing means downstream of said second heating means for compressing the overlapped portions of said sidewall and bottom blank to seal the bottom of said container; and discharge means ejecting said container from said mandrels downstream of said bottom ironing means;

drive means for continuously driving said means forming containers; and means for selectively disconnecting said conveyor means, folding means, sealing means, transfer means and supply means from said drive means to stop the operation thereof, said means for selectively disconnecting including means for synchronously connecting said conveyor means, folding means, sealing means, transfer means and supply means to said drive means so as to retain synchronism between elements of said means forming containers.

15. The means of claim 14 further comprising retraction means responsive to the operation of said means for selective disconnecting for retracting said first heating means away from said path.

16. The invention of claim 15 further comprising top curl forming means forming an annular rim configuration on a top rim portion of said containers to define mouths of said containers.

17. The invention of claim 16 further comprising lube means for applying a coating of lubricant to said top rim portion of said containers prior to the formation of an annular rim configuration by said top curl forming means.

18. The invention of claim 17 wherein said mandrels are frusto-conical and dual tapered, said mandrels having an upper tapered portion and a lower tapered portion having a taper greater than that of said upper tapered portion.

19. The invention of claim 18 wherein said mandrels each include equally spaced scalloped indentations formed in said tapered lower mandrel portion;

said mandrel further including means for applying vacuum to said scalloped indentations to conform said blanks to the contour of said indentations.

20. The invention of claim 17 wherein said heating means comprises a plurality of radiant heaters.

21. The invention of claim 20 wherein said mandrel movement means also rotates said mandrels as they pass said heating means to provide even heat distribution.

22. The invention of claim 20 wherein said mandrel movement means comprises an endless conveyor.

23. The invention of claim 20 wherein said mandrel movement means comprises a rotating turret.

24. The invention of claim 20 wherein at least some of said radiant heaters are disposed along a substantially horizontal portion of said predetermined path;

said heating means further comprising baffle means for blocking undesired drafts.

25. The invention of claim 24 wherein the radiant heaters along said predetermined path are set at progressively higher temperatures as their location nears the downstream end of said heating means.

26. A synchronizing system for a container making machine including a plurality of mandrels, means for moving said mandrels, means for transferring container blanks to said mandrels, and means for driving said means for moving and means for transferring, said system comprising:

means for selectively connecting and disconnecting said means for transferring with said means for moving and said means for driving to stop the operation thereof; said means for selectively connecting and disconnecting including means for synchronizing the connection of said means for transferring with the movement of said mandrels by said means for moving so that said container blanks may be transferred to said mandrels.

27. The system of claim 26 wherein said means for driving includes, station drive means for driving said means for transferring, and main drive means for driving said station drive means and said means for moving;

said means for selectively disconnecting including, single position engagement means for positively engaging said main drive means to said station drive means in a unique angular relationship to synchronize said means for transferring to said means for moving.

28. The system of claim 27 wherein first means for sensing the movement of said means for moving and for producing an output in response thereto;

second means for sensing the movement of said means for transferring and producing an output in response thereto;

means for monitoring the outputs of said first and second means for sensing so as to anticipate the synchronization of said means for moving and means for transferring; and means responsive to said means for monitoring actuating said engagement means to synchronize said means for transferring to said means for moving.

29. The system of claim 28 wherein said means for selectively connecting and disconnecting includes brake means operatively associated with said station drive means for stopping said means for transferring when disconnected from said main drive means, said brake means be responsive to said means for monitoring and said first means for sensing to ensure that said means for transferring will always stop at a predetermined point in its cycle.

30. The system of claim 29 wherein said brake means is actuated during connection of said station drive means to said main drive means in order to retain said means for transferring at said predetermined point and ensure that said engagement means is positively connected.

31. The system of claim 30 wherein said means for monitoring includes a central processing unit (CPU).

32. The sytem of claim 30 wherein said drive means includes a D.C. drive motor, said motor being stalled by the collective actuation of said single position engagement means and brake means for a short period of time.

33. The system of claim 30 wherein said single position engagement means includes a single position clutch, and means for sensing whether said clutch is positively engaged and, when not, providing said means for monitoring with a signal indicative of improper engagement;

said means for monitoring disengaging said clutch upon receipt of said improper engagement signal.

34. The system of claim 30 wherein container making machine further includes means for forming said container blanks, said means for forming being driven by said station drive means and further including heat seaming means for seaming said blanks;

said heat seaming means being retracted from proximity to said container blanks when said station drive means is disconnected from said main drive means.

* * * * *

UNITED STATES PATENT AND TRADEMARK OFFICE
CERTIFICATE OF CORRECTION

PATENT NO. : 4,453,998

DATED : June 12, 1984

INVENTOR(S) : Allan K. Cress and Charles E. Busse

It is certified that error appears in the above-identified patent and that said Letters Patent is hereby corrected as shown below:

Column 11, line 34, correct the spelling of "schematically".

Column 22, line 66, "387" should be -- 378 --.

Signed and Sealed this

Twenty-sixth Day of November 1985

[SEAL]

Attest:

DONALD J. QUIGG

Attesting Officer

Commissioner of Patents and Trademarks